US010503172B2

United States Patent
Englard et al.

(10) Patent No.: US 10,503,172 B2
(45) Date of Patent: Dec. 10, 2019

(54) CONTROLLING AN AUTONOMOUS VEHICLE BASED ON INDEPENDENT DRIVING DECISIONS

(71) Applicant: LUMINAR TECHNOLOGIES, INC., Orlando, FL (US)

(72) Inventors: Benjamin Englard, Palo Alto, CA (US); Joseph Augenbraun, San Mateo, CA (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/149,219

(22) Filed: Oct. 2, 2018

(65) Prior Publication Data

US 2019/0113918 A1 Apr. 18, 2019

Related U.S. Application Data

(60) Provisional application No. 62/573,795, filed on Oct. 18, 2017.

(51) Int. Cl.
*B60W 50/08* (2012.01)
*G06N 5/02* (2006.01)
(Continued)

(52) U.S. Cl.
CPC ....... *G05D 1/0088* (2013.01); *G01C 21/3492* (2013.01); *G01C 21/3691* (2013.01);
(Continued)

(58) Field of Classification Search
CPC .......... G05D 1/0088; G05D 1/02; G05D 1/00; G01C 21/32; G01C 22/00; G01C 21/34;
(Continued)

(56) References Cited

U.S. PATENT DOCUMENTS 7,272,474 B1    9/2007  Stentz et al.
9,176,500 B1 *  11/2015 Teller .................. G05D 1/0088
(Continued)

FOREIGN PATENT DOCUMENTS

WO    WO-2017079219 A1 *  5/2017
WO    2017/120336          7/2017
WO    WO-2017120336 A2 *  7/2017

OTHER PUBLICATIONS

Deb K., "Multi-objective Optimisation Using Evolutionary Algorithms: An Introduction". In: Wang L. Ng A., Deb K. (eds) "Multi-objective Evolutionary Optimisation for Product Design and Manufacturing", Springer, London, 2011.
(Continued)

*Primary Examiner* — Yuri Kan

(57) ABSTRACT

A computer-readable medium stores instructions executable by one or more processors to implement an aggregate self-driving control architecture (SDCA) for controlling an autonomous vehicle. The aggregate SDCA includes a plurality of SDCAs each including a different motion planner. Each motion planner is configured to receive signals descriptive of a current state of an environment through which the autonomous vehicle is moving, and each SDCA is configured to generate candidate decisions for controlling the autonomous vehicle by using the respective motion planner to process the received signals. The aggregate SDCA also includes a decision arbiter configured to receive the candidate decisions generated by the SDCAs, generate decisions for controlling the autonomous vehicle by processing the candidate decisions, and provide signals indicative of the generated decisions to one or more operational subsystems of the vehicle to effectuate maneuvering of the vehicle.

29 Claims, 21 Drawing Sheets

(51) Int. Cl.
- *G05D 1/00* (2006.01)
- *G05D 1/02* (2006.01)
- *G06F 16/28* (2019.01)
- *G01C 21/34* (2006.01)
- *G06N 3/08* (2006.01)
- *G01C 21/36* (2006.01)

(52) U.S. Cl.
CPC .......... *G05D 1/027* (2013.01); *G05D 1/0212* (2013.01); *G05D 1/0217* (2013.01); *G05D 1/0221* (2013.01); *G05D 1/0231* (2013.01); *G05D 1/0257* (2013.01); *G05D 1/0278* (2013.01); *G06F 16/285* (2019.01); *G06N 3/08* (2013.01); *G06N 5/022* (2013.01); *G05D 2201/0213* (2013.01)

(58) Field of Classification Search
CPC .......... G06N 5/02; B60Q 1/00; B60W 30/12; B60W 50/08; B60W 30/09; B60W 40/04; B60W 10/00
See application file for complete search history.

(56) References Cited

U.S. PATENT DOCUMENTS

| | | | |
|---|---|---|---|
| 9,600,768 B1 * | 3/2017 | Ferguson | G06N 5/02 |
| 9,834,212 B2 * | 12/2017 | Park | B60W 30/12 |
| 9,988,046 B2 * | 6/2018 | Trombley | B60W 10/184 |
| 10,077,056 B1 | 9/2018 | Fields et al. | |
| 2011/0028235 A1 | 2/2011 | Nakano | |
| 2011/0029235 A1 | 2/2011 | Berry | |
| 2011/0098886 A1 * | 4/2011 | Deng | B60W 10/04 701/41 |
| 2013/0120125 A1 * | 5/2013 | Wu | G08G 1/167 340/439 |
| 2013/0253793 A1 | 9/2013 | Lee et al. | |
| 2016/0375912 A1 * | 12/2016 | Christensen | B60W 50/0097 701/25 |
| 2017/0097640 A1 * | 4/2017 | Wang | G06N 7/005 |
| 2017/0123429 A1 | 5/2017 | Levinson et al. | |
| 2017/0168488 A1 * | 6/2017 | Wierzynski | G05D 1/0061 |
| 2017/0248964 A1 * | 8/2017 | Kentley | G01S 17/023 |
| 2017/0357267 A1 | 12/2017 | Foster et al. | |
| 2018/0089563 A1 | 3/2018 | Redding et al. | |
| 2018/0292830 A1 | 10/2018 | Kazemi et al. | |
| 2018/0339710 A1 * | 11/2018 | Hashimoto | G06N 3/0445 |

OTHER PUBLICATIONS

Non-Final Office Action dated Jan. 10, 2019 for U.S. Appl. No. 16/149,223.
Final Office Action dated Jul. 15, 2019 for U.S. Appl. No. 16/149,223.
Non-Final Office Action dated Dec. 20, 2018 for U.S. Appl. No. 16/149,225.
Final Office Action dated Jun. 7, 2019 for U.S. Appl. No. 16/149,225.
International Search Report and Written Opinion dated Oct. 18, 2018 for PCT/US2018/056407.

\* cited by examiner

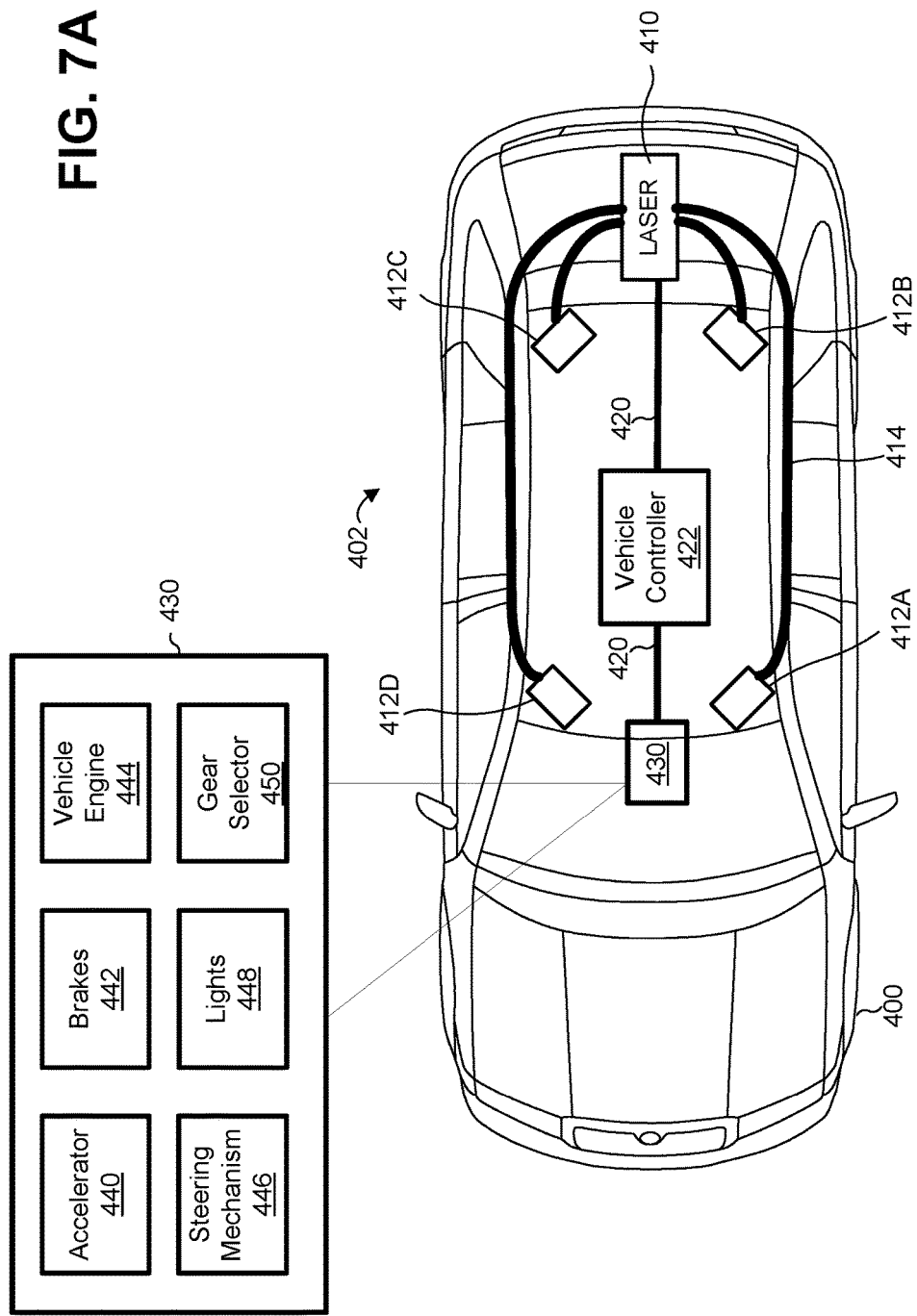

CONTROLLING AN AUTONOMOUS VEHICLE BASED ON INDEPENDENT DRIVING DECISIONS

CROSS-REFERENCE TO RELATED APPLICATION

This claims the benefit of U.S. Provisional Patent Application No. 62/573,795, filed on Oct. 18, 2017 and entitled "Software Systems and Methods for Controlling an Autonomous Vehicle," the disclosure of which is hereby incorporated herein by reference in its entirety.

FIELD OF TECHNOLOGY

This disclosure generally relates to autonomous vehicles and, more particularly, to software-based techniques for controlling autonomous vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ sensors, such as light detection and ranging (lidar) devices, to detect or "see" the surrounding environment as the vehicles move toward their destinations. Such vehicles include self-driving control systems that process the sensor data and, based on both the sensed environment and the desired destination, determine which maneuvers and operational states (e.g., speed, braking force, steering direction) are most appropriate on a more or less continuous basis throughout the trip. Accomplishing this task can be extremely challenging, due in large part to the virtually infinite number of different scenarios that such vehicles may encounter, as well as stringent safety requirements with respect to both the autonomous vehicle passengers and any individuals who may be in the general vicinity of the autonomous vehicles.

SUMMARY

One example embodiment of the techniques of this disclosure is a non-transitory computer-readable medium storing instructions. The instructions are executable by one or more processors to implement an aggregate self-driving control architecture for controlling an autonomous vehicle. The aggregate self-driving control architecture includes a plurality of self-driving control architectures each including a different one of a plurality of motion planners. Each of the motion planners is configured to receive signals descriptive of a current state of an environment through which the autonomous vehicle is moving, and each of the plurality of self-driving control architectures is configured to generate candidate decisions for controlling the autonomous vehicle by using the respective motion planner to process the received signals. The aggregate self-driving control architecture also includes a decision arbiter configured to (1) receive the candidate decisions generated by the self-driving control architectures, (2) generate decisions for controlling the autonomous vehicle by processing the received candidate decisions, and (3) provide signals indicative of the generated decisions to one or more operational subsystems of the autonomous vehicle to effectuate maneuvering of the autonomous vehicle in accordance with the generated decisions.

Another example embodiment of the techniques of this disclosure is a method of controlling an autonomous vehicle. The method includes generating, using a plurality of self-driving control architectures each of which includes a different one of a plurality of motion planners, a plurality of candidate decisions for controlling the autonomous vehicle. Each of the candidate decisions is generated by a different one of the motion planners processing signals descriptive of a current state of an environment through which the autonomous vehicle is moving. The method also includes generating, by processing the candidate decisions, a decision for controlling the autonomous vehicle, and providing signals indicative of the generated decision to one or more operational subsystems of the autonomous vehicle to effectuate maneuvering of the autonomous vehicle in accordance with the generated decision.

Another example embodiment of the techniques of this disclosure is a non-transitory computer-readable medium storing instructions. The instructions are executable by one or more processors to implement an aggregate self-driving control architecture for controlling an autonomous vehicle. The aggregate self-driving control architecture includes a plurality of self-driving control architectures each including a different one of a plurality of motion planners. Each of the motion planners is configured to receive signals descriptive of a current state of an environment through which the autonomous vehicle is moving, and each of the plurality of self-driving control architectures is configured to generate candidate decisions for controlling the autonomous vehicle by using the respective motion planner to process the received signals. The aggregate self-driving control architecture also includes a decision arbiter configured to (i) receive the candidate decisions output by the self-driving control architectures, (ii) generate decisions for controlling the autonomous vehicle by dynamically selecting from among the received candidate decisions based on a current state of a desired mode signal, and (iii) provide signals indicative of the generated decisions to one or more operational subsystems of the autonomous vehicle to effectuate maneuvering of the autonomous vehicle in accordance with the generated decisions.

Another example embodiment of the techniques of this disclosure is a method of controlling an autonomous vehicle. The method includes generating, using a plurality of self-driving control architectures each of which includes a different one of a plurality of motion planners, a plurality of candidate decisions for controlling the autonomous vehicle. Each of the candidate decisions is generated by a different one of the motion planners processing signals descriptive of a current state of an environment through which the autonomous vehicle is moving. The method also includes generating, by dynamically selecting from among the candidate decisions based on a current state of a desired mode signal, a decision for controlling the autonomous vehicle, and providing signals indicative of the generated decision to one or more operational subsystems of the autonomous vehicle to effectuate maneuvering of the autonomous vehicle in accordance with the generated decision.

Another example embodiment of the techniques of this disclosure is a non-transitory computer-readable medium storing instructions. The instructions are executable by one or more processors to implement a self-driving control architecture for controlling an autonomous vehicle. The self-driving control architecture includes a perception and prediction component configured to receive sensor data and, based on the received sensor data, generate (1) an observed occupancy grid indicative of which cells are currently occupied in a two-dimensional representation of an environment through which the autonomous vehicle is moving and (2) one or more predicted occupancy grids indicative of which cells are currently expected to be occupied at one or more future instances of time in the two-dimensional representation of the environment. The self-driving control architecture also includes a mapping component configured to provide navigation data for guiding the autonomous vehicle through the environment toward a destination, and a motion planner configured to generate, based on the observed occupancy grid, the one or more predicted occupancy grids, and the navigation data, and using a machine learning (ML) model trained using reinforcement learning, decisions for maneuvering the autonomous vehicle toward the destination.

Another example embodiment of the techniques of this disclosure is a method of controlling an autonomous vehicle. The method includes receiving sensor data and generating, based on the received sensor data, (1) an observed occupancy grid indicative of which cells are currently occupied in a two-dimensional representation of an environment through which the autonomous vehicle is moving and (2) one or more predicted occupancy grids indicative of which cells are currently expected to be occupied at one or more future instances of time in the two-dimensional representation of the environment. The method also includes receiving navigation data configured to guide the autonomous vehicle through the environment toward a destination, and generating, based on the observed occupancy grid, the one or more predicted occupancy grids, and the navigation data, and using an ML model trained using reinforcement learning, decisions for maneuvering the autonomous vehicle toward the destination.

Another example embodiment of the techniques of this disclosure is an autonomous vehicle. The autonomous vehicle includes one or more operational subsystems configured to maneuver the autonomous vehicle. The operational subsystems collectively control at least speed and direction of the autonomous vehicle. The autonomous vehicle also includes a sensor system including one or more sensor types and configured to generate sensor data, and a computing system. The computing system is configured to receive the sensor data from the sensor system, and generate, based on the received sensor data, (1) an observed occupancy grid indicative of which cells are currently occupied in a two-dimensional representation of an environment through which the autonomous vehicle is moving and (2) one or more predicted occupancy grids indicative of which cells are currently expected to be occupied at one or more future instances of time in the two-dimensional representation of the environment. The computing system is also configured to receive navigation data configured to guide the autonomous vehicle through the environment toward a destination, and generate, based on the observed occupancy grid, the one or more predicted occupancy grids, and the navigation data, and using an ML model trained using reinforcement learning, decisions for maneuvering the autonomous vehicle toward the destination. The computing system is further configured to provide the generated decisions to the one or more operational subsystems to effectuate maneuvering of the autonomous vehicle in accordance with the generated decisions.

Another example embodiment of the techniques of this disclosure is a non-transitory computer-readable medium storing instructions. The instructions are executable by one or more processors to implement a self-driving control architecture for controlling an autonomous vehicle. The self-driving control architecture includes a perception and prediction component configured to receive sensor data and, based on the received sensor data, generate (1) an observed occupancy grid indicative of which cells are currently occupied in a two-dimensional representation of an environment through which the autonomous vehicle is moving and (2) one or more predicted occupancy grids indicative of which cells are currently expected to be occupied at one or more future instances in time in the two-dimensional representation of the environment. The self-driving control architecture also includes a mapping component configured to provide navigation data for guiding the autonomous vehicle through the environment toward a destination, and a cost map generation component configured to generate, based on the observed occupancy grid, the one or more predicted occupancy grids, and the navigation data, a plurality of cost maps. Each cost map specifies numerical values representing a cost, at a respective instance of time, of occupying certain cells in a two-dimensional representation of the environment. The self-driving control architecture further includes a motion planner configured to generate, based on the plurality of cost maps and using an A* planning technique, a grid path through the environment, and to generate decisions for maneuvering the autonomous vehicle toward the destination based on the grid path.

Another example embodiment of the techniques of this disclosure is a method of controlling an autonomous vehicle. The method includes receiving sensor data and generating, based on the received sensor data, (1) an observed occupancy grid indicative of which cells are currently occupied in a two-dimensional representation of an environment through which the autonomous vehicle is moving and (2) one or more predicted occupancy grids indicative of which cells are currently expected to be occupied at one or more future instances of time in the two-dimensional representation of the environment. The method also includes receiving navigation data configured to guide the autonomous vehicle through the environment toward a destination, and generating, based on the observed occupancy grid, the one or more predicted occupancy grids, and the navigation data, a plurality of cost maps. Each cost map specifies numerical values representing a cost, at a respective instance of time, of occupying certain cells in a two-dimensional representation of the environment. The method further includes generating, based on the plurality of cost maps and using an A* planning technique, a grid path through the environment, and generating decisions for maneuvering the autonomous vehicle toward the destination based on the grid path.

Another example embodiment of the techniques of this disclosure is an autonomous vehicle. The autonomous vehicle includes one or more operational subsystems configured to maneuver the autonomous vehicle. The operational subsystems collectively control at least speed and direction of the autonomous vehicle. The autonomous vehicle also includes a sensor system including one or more sensor types and configured to generate sensor data, and a computing system. The computing system is configured to receive the sensor data from the sensor system, and generate, based on the received sensor data, (1) an observed occupancy grid indicative of which cells are currently occupied in a two-dimensional representation of an environment through which the autonomous vehicle is moving and (2)

one or more predicted occupancy grids indicative of which cells are currently expected to be occupied at one or more future instances of time in the two-dimensional representation of the environment. The computing system is also configured to receive navigation data configured to guide the autonomous vehicle through the environment toward a destination, and generate, based on the observed occupancy grid, the one or more predicted occupancy grids, and the navigation data, a plurality of cost maps. Each cost map specifies numerical values representing a cost, at a respective instance of time, of occupying certain cells in a two-dimensional representation of the environment. The computing system is further configured to generate, based on the plurality of cost maps and using an A* planning technique, a grid path through the environment, generate decisions for maneuvering the autonomous vehicle toward the destination based on the grid path, and provide the generated decisions to the one or more operational subsystems to effectuate maneuvering of the autonomous vehicle in accordance with the generated decisions.

Another example embodiment of the techniques of this disclosure is a non-transitory computer-readable medium storing instructions. The instructions are executable by one or more processors to implement a self-driving control architecture for controlling an autonomous vehicle. The self-driving control architecture includes a perception component configured to receive sensor data and, based on the received sensor data, generate signals descriptive of a current state of an environment through which the autonomous vehicle is moving. The self-driving control architecture also includes a prediction component configured to generate, based on the signals descriptive of the current state of the environment, signals descriptive of one or more predicted future states of the environment. The self-driving control architecture further includes a motion planner configured to generate decisions for maneuvering the autonomous vehicle toward the destination. Generating the decisions for maneuvering the autonomous vehicle includes using the signals descriptive of the current state of the environment and the signals descriptive of the one or more predicted future states of the environment to set values of one or more independent variables in an objective equation. The objective equation includes a plurality of terms that each correspond to a different one of a plurality of driving objectives over a finite time horizon. Generating the decisions for maneuvering the autonomous vehicle also includes determining values of one or more dependent variables in the objective equation by solving the objective equation subject to a set of constraints, and using the determined values of the dependent variables to generate the decisions for maneuvering the autonomous vehicle toward the destination.

Another example embodiment of the techniques of this disclosure is a method of controlling an autonomous vehicle. The method includes receiving sensor data and generating, based on the received sensor data, signals descriptive of a current state of an environment through which the autonomous vehicle is moving. The method also includes generating, based on the signals descriptive of the current state of the environment, signals descriptive of one or more predicted future states of the environment, and using the signals descriptive of the current state of the environment and the signals descriptive of the one or more predicted future states of the environment to set values of one or more independent variables in an objective equation. The objective equation includes a plurality of terms that each correspond to a different one of a plurality of driving objectives over a finite time horizon. The method further includes determining values of one or more dependent variables in the objective equation by solving the objective equation subject to a set of constraints, and using the determined values of the dependent variables to generate the decisions for maneuvering the autonomous vehicle toward the destination.

Another example embodiment of the techniques of this disclosure is an autonomous vehicle. The autonomous vehicle includes one or more operational subsystems configured to maneuver the autonomous vehicle. The operational subsystems collectively control at least speed and direction of the autonomous vehicle. The autonomous vehicle also includes a sensor system including one or more sensor types and configured to generate sensor data, and a computing system. The computing system is configured to receive the sensor data from the sensor system and generate, based on the received sensor data, signals descriptive of a current state of an environment through which the autonomous vehicle is moving. The computing system is also configured to generate, based on the signals descriptive of the current state of the environment, signals descriptive of one or more predicted future states of the environment, and use the signals descriptive of the current state of the environment and the signals descriptive of the one or more predicted future states of the environment to set values of one or more independent variables in an objective equation. The objective equation includes a plurality of terms that each correspond to a different one of a plurality of driving objectives over a finite time horizon. The computing system is further configured to determine values of one or more dependent variables in the objective equation by solving the objective equation subject to a set of constraints, use the determined values of the dependent variables to generate decisions for maneuvering the autonomous vehicle toward the destination, and provide the decisions for maneuvering the autonomous vehicle toward the destination to the one or more operational subsystems of the autonomous vehicle to effectuate maneuvering of the autonomous vehicle in accordance with the generated decisions.

BRIEF DESCRIPTION OF THE DRAWINGS

FIG. 7A illustrates an example vehicle in which the lidar system of FIG. 5 may operate;

DETAILED DESCRIPTION

Overview

Figure 1:
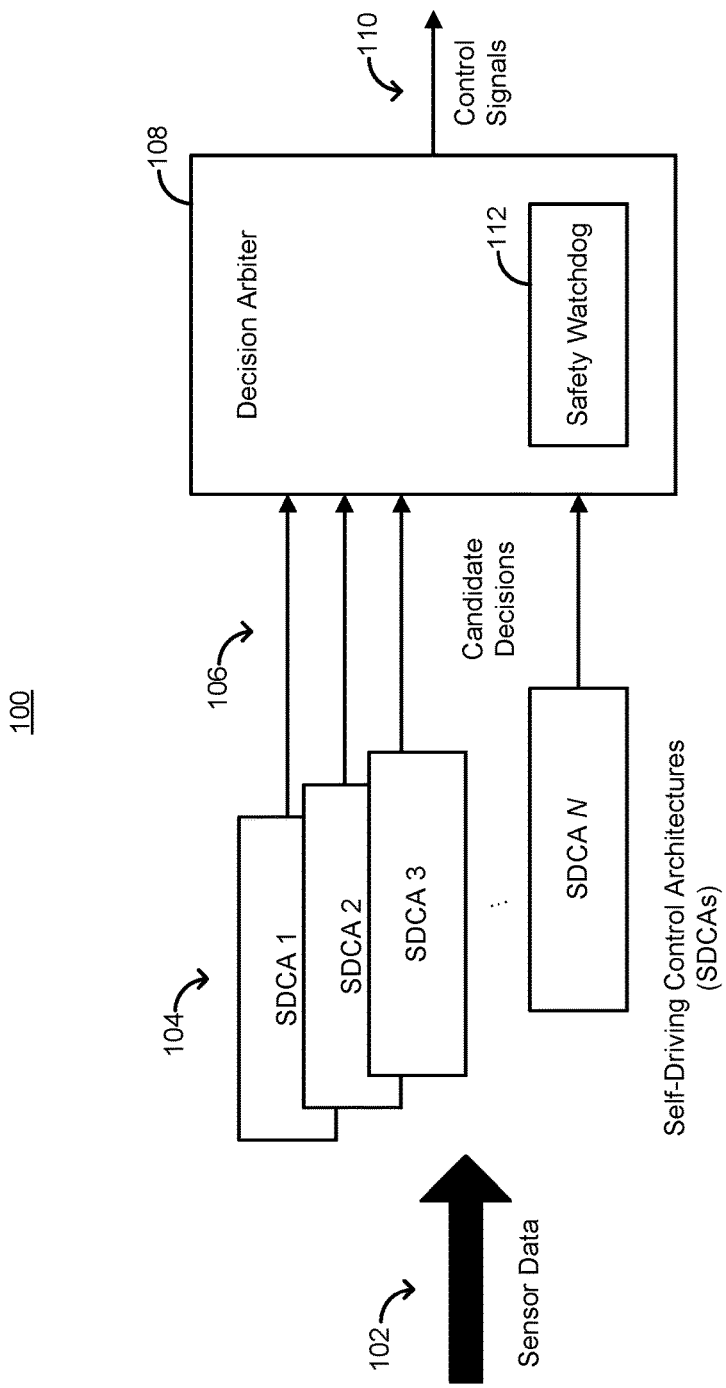
FIG. 1 is a block diagram of an example aggregate self-driving control architecture for controlling an autonomous vehicle.

A software architecture of this disclosure generates signals for controlling a self-driving or "autonomous" vehicle. In some embodiments, an aggregate self-driving control architecture ("SDCA") includes multiple SDCAs that independently generate candidate decisions for controlling operation of the autonomous vehicle. A "decision arbiter" dynamically selects specific candidate decisions, and/or analyzes or otherwise utilizes concurrent candidate decisions from a number of different self-driving control architectures, in order to generate final decisions that cause the autonomous vehicle to maneuver accordingly. The decision arbiter may include a relatively simple safety processor or "watchdog" that can, in certain situations, overrule the candidate decisions of all of the SDCAs.

In some embodiments, the decision arbiter selects and/or utilizes candidate decisions based on the candidate decisions themselves. For example, the decision arbiter may tally candidate maneuvers that are output by different SDCAs, and select the maneuver having the highest vote count. As another example, the decision arbiter may perform mathematical operations (e.g., calculate a geometric mean, arithmetic mean, median, or weighted average) on operational parameters (e.g., speed, acceleration, steering, braking, etc.) that are output by different SDCAs, and use the results to control the autonomous vehicle. The candidate decisions or the operational parameters may also include confidence values (corresponding to the confidence or likelihood that the associated decision or parameter is correct), and the decision arbiter may combine candidate decisions or operational parameters by performing a weighted average based on the confidence values. As still another example, the decision arbiter may discard candidate decisions that are determined to be "outliers" relative to the other candidate decisions.

Alternatively, or in addition, the decision arbiter may select and/or utilize candidate decisions based on a priori knowledge of the SDCAs. For example, the decision arbiter may have been trained or otherwise programmed to recognize which SDCAs operate best in various different circumstances (e.g., when driving in different weather conditions, when performing different maneuvers, etc.). The criteria for "best" performance may vary depending on the embodiment. For example, the decision arbiter may have been trained to recognize which SDCAs most closely approximate expert human driving in various different circumstances. Once trained or otherwise programmed, the decision arbiter may select (or increase the weight of, etc.) candidate decisions of specific SDCAs based on the current or expected circumstances. As another example, a particular driving style may be pre-selected (e.g., by a passenger of the autonomous vehicle), and the decision arbiter may select (or increase the weight of, etc.) candidate decisions from the SDCA or SDCAs that was/were specifically trained or otherwise programmed to drive according to the selected style.

Regardless of the precise design or functionality of the decision arbiter, the performance (e.g., safety, efficiency, etc.) of the autonomous vehicle may be improved if the candidate decisions generated by the SDCAs reflect a greater level of diversity. One form of diversity may be achieved by utilizing SDCAs that generate different types of candidate decisions. For example, some SDCAs may output candidate maneuvers (e.g., switch to right lane, turn left, execute a U-turn, take upcoming exit ramp, avoid an obstacle in the lane, brake gradually or rapidly, accelerate gradually or rapidly, maintain current speed, etc.) and/or operational parameters (e.g., a specific speed and/or direction, or a change thereto), other SDCAs may output candidate sets or ranges of allowable maneuvers and/or operational parameters, and still other SDCAs may output candidate sets or ranges of disallowed maneuvers and/or operational parameters.

While different SDCAs may, in some embodiments, have particular components, or general types of components, in common (e.g., a perception component that identifies, classifies and tracks objects in the autonomous vehicle's environment), a second form of diversity may be achieved if the SDCAs have architectures that differ in key respects, such as the type of motion planning system (or "motion planner," or simply "planner") that is utilized. For example, one or more SDCAs may use "learning based" planners (e.g., planners trained using supervised learning or reinforcement learning), one or more other SDCAs may use "search based" planners (e.g., A* planners), one or more other SDCAs may use "sampling based" planners, and one or more other SDCAs may use "predictive control based" planners (e.g., model predictive control planners). Moreover, the SDCAs may also, or instead, vary in other ways, such as utilizing perception components that employ different techniques for identifying, classifying and/or tracking objects, and/or prediction components that employ different techniques for predicting future positions of objects, etc.

Still another form of diversity may be achieved by utilizing SDCAs that operate on different types of input data indicative of the current environment of the autonomous vehicle. For example, some SDCAs may operate on lidar data, other SDCAs may operate on camera data, and still other SDCAs may operate on a combination of lidar, camera, and thermal imaging data. As another example, some SDCAs may operate on data obtained from a source other than the autonomous vehicle, such as data obtained from other vehicles and/or infrastructure components.

Figure 2:
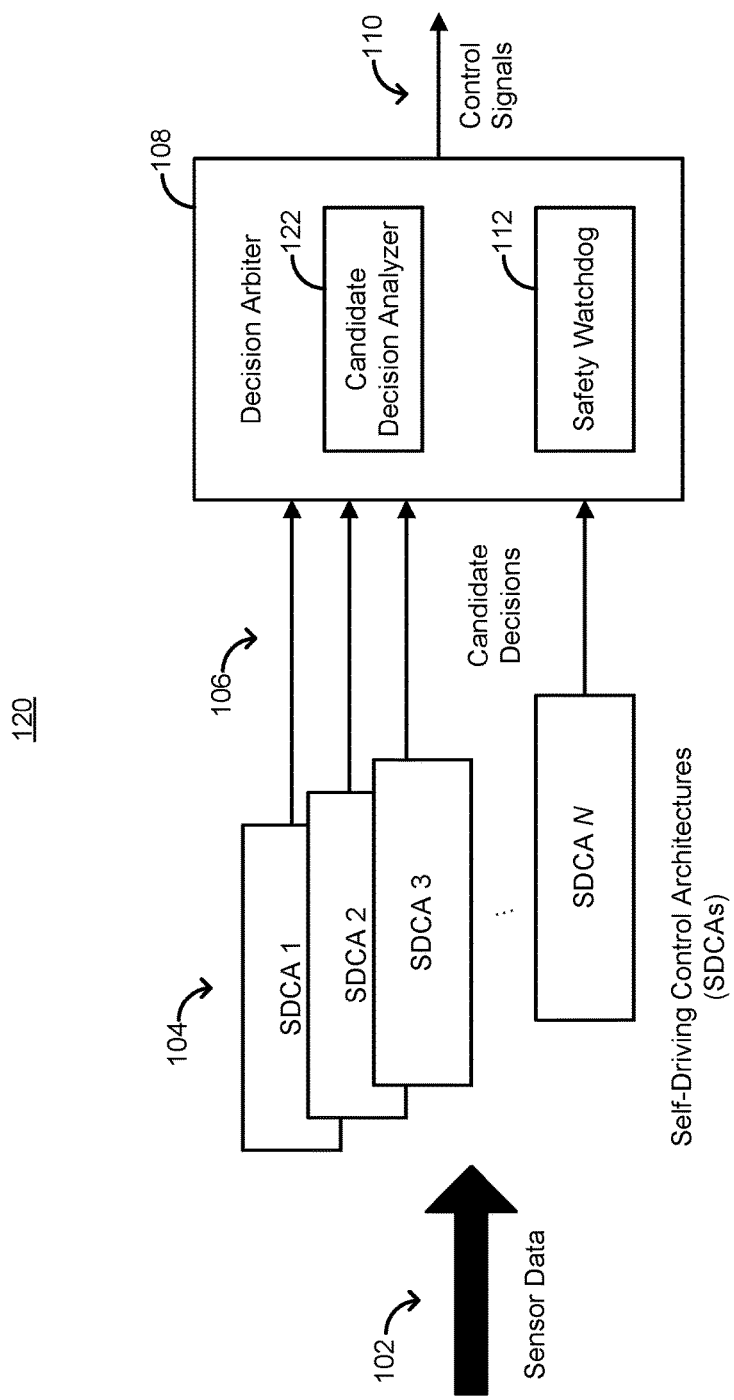
FIG. 2 is a block diagram of an example aggregate self-driving control architecture that analyzes candidate decisions from multiple self-driving control architectures.
Figure 3:
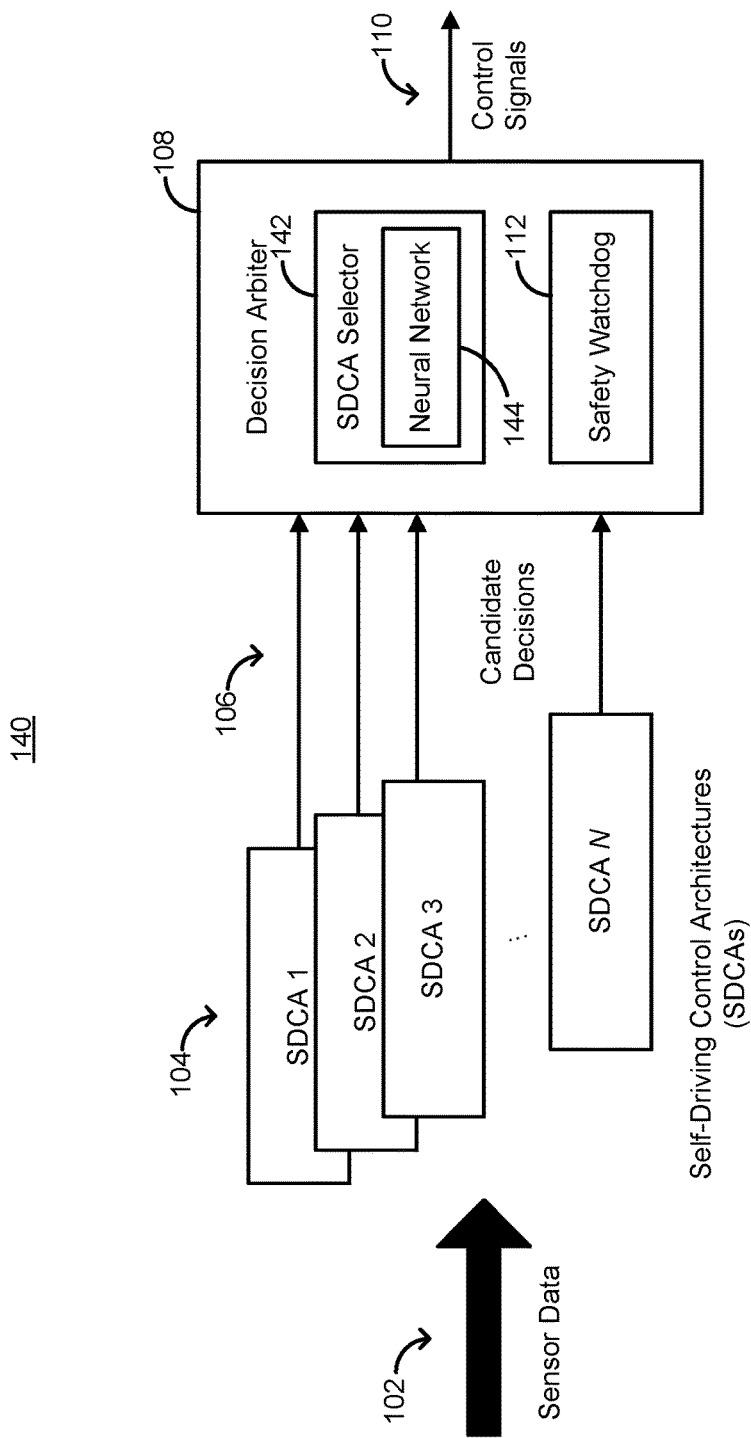
FIG. 3 is a block diagram of an example aggregate self-driving control architecture that selects the candidate decisions of particular self-driving control architectures based on observed or expected circumstances of the autonomous vehicle.

Examples of aggregate SDCAs in which the above techniques can be implemented are considered first with reference to FIGS. 1-3, followed by a discussion of individual SDCAs (including potential sources of sensor data for such architectures) with reference to FIGS. 4-13. An example computing system capable of implementing one or more of the software architectures described herein is then discussed with reference to FIG. 14. Finally, example methods corresponding to particular software architectures described herein are discussed with reference to the flow diagrams of FIGS. 15-19.

Example Aggregate Self-Driving Control Architecture

FIG. 1 illustrates an example, software-based, "aggregate" SDCA 100 for controlling an autonomous vehicle. As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, forklift, robot, delivery robot, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

The aggregate SDCA 100 receives sensor data 102 as input, which is processed by N different SDCAs 104 (N being any suitable integer greater than one, such as 2, 3, 5, 10, 20, etc.). The sensor data 102 may include data that is generated by or derived from one or more sensors of the autonomous vehicle (e.g., a single lidar device, four lidar devices with different viewing perspectives, etc.), and by one or more different types of sensors (e.g., a combination of one or more lidar devices, cameras, thermal imaging devices, sonar devices, radar devices, etc.). Each of the sensors may sense the environment of the autonomous vehicle by physically interacting with the environment in some way, such as transmitting and receiving pulses of light that reflect off of objects in the environment (e.g., for a lidar device), transmitting and receiving microwaves that reflect off of objects in the environment (e.g., for a radar device), simply receiving light waves generated or reflected from different areas of the environment (e.g., for a camera), transmitting and receiving acoustic signals that reflect off of objects in the environment (e.g., for an acoustic or ultrasonic sensor), and so on. In some embodiments, however, the sensor data 102 also includes data from sensors that do not interact with the environment in such a manner, such as an inertial measurement unit (IMU) or a global positioning system (GPS) unit. The environment of an autonomous vehicle can include the location and motion of other vehicles, traffic conditions, lighting conditions (e.g., daytime, nighttime), road type (e.g., highway, urban, rural, or residential), and weather.

In some embodiments, the sensor data 102 instead, or also, includes data that is generated by or derived from sensors that are not associated with the autonomous vehicle. For example, the sensor data 102 may include data obtained from other, nearby vehicles (e.g., data specifying the locations of those vehicles), data that is obtained from infrastructure components (e.g., data specifying or depicting a road configuration, locations of cars on the road, etc.), and/or data that is received from a remote server (e.g., road conditions from a server supporting a weather service, etc.).

Different SDCAs 104 may process different portions of the sensor data 102, possibly with certain portions of the sensor data 102 being shared among two or more of the SDCAs 104. For example, one of the SDCAs 104 may process data from four lidar devices and data from two cameras, while another of the SDCAs 104 may process data from the same two cameras, as well as data from two thermal imaging devices. Alternatively, all of the SDCAs 104 may share/process all of the sensor data 102.

Each of the SDCAs 104 processes its corresponding portion of the sensor data 102, possibly along with map or navigation data (as discussed further below), to generate "candidate" decisions 106 for maneuvering/operating the autonomous vehicle. Each of the SDCAs 104 may be implemented/run on a different physical processor (e.g., a particular, programmable microprocessor that executes software instructions) or on a different set of physical processors. Alternatively, two or more (e.g., all) of the SDCAs 104 may be implemented/run on a single physical processor or a single set of physical processors.

The candidate decisions 106 may be produced simultaneously by the SDCAs 104, such that a number of independent driving-related decisions are generated for a given driving environment or scenario. For example, in one particular driving scenario, one of the SDCAs 104 may generate a decision to increase the vehicle's speed by 5 mph and steer 7 degrees to the left, while another of the SDCAs 104 may generate a decision to maintain the vehicle's current speed and steer 2 degrees to the left. As another example, one of the SDCAs 104 may generate a decision to move to the left lane, while another of the SDCAs 104 may generate a decision to stay in the current lane. The various candidate decisions 106 are analyzed, and/or particular ones of the candidate decisions 106 are selected, by a decision arbiter 108, as discussed below.

Depending on the embodiment, the candidate decisions 106 may take any suitable form. For instance, and as seen from the above examples, each of the candidate decisions 106 may indicate a respective set of one or more operational parameters, or may indicate a respective maneuver. Generally, as used herein, an "operational parameter" refers to a controllable parameter or setting associated with a particular driving subsystem (e.g., acceleration, braking and steering), while a "maneuver" or "driving maneuver" refers to a higher-level driving action (or set of actions) that may require a sequence of operational parameter settings in order to be completed (e.g., "move one lane to left," "turn right," "swerve right," etc., or a still higher-level maneuver such as "take next exit" or "move to right lane then exit," etc.). In some scenarios, however, certain maneuvers do not require changes to any operational parameters. For example, a "stay in lane" maneuver may or may not require any change to speed or direction.

In some embodiments, the SDCAs 104 collectively provide a number of different decision types. For example, some of the candidate decisions 106 may specify what should be done, some may specify what should not be done, and/or some may specify ranges of allowed or disallowed parameters or actions. By increasing the diversity of candidate decision types, the amount of overlap or redundancy between different SDCAs may be lessened, which may in turn cause safety and/or other performance-related aspects of the autonomous vehicle to be enhanced. For example, one or more of the SDCAs 104 may output specific velocity and direction parameters (e.g., absolute speed and direction, or changes from current speed and direction), others may output allowed ranges of velocity and direction parameters, and others may output disallowed ranges of velocity and direction parameters. Direction parameters may include a steering angle (e.g., the angle of the vehicle's steering wheel), a yaw rate of the vehicle (e.g., turn left at a yaw rate of one degree per second), or an angle of the vehicle's tires (e.g., front tires angled at 10 degrees left with respect to the longitudinal axis of the vehicle). As another example, one or more of the SDCAs 104 may output specific driving maneuvers, others may output sets of allowed maneuvers, and others may output sets of disallowed maneuvers.

To generate the candidate decisions 106, each of the SDCAs 104 may include various components. For example, each of the SDCAs 104 may include a perception component to identify, classify and track objects in the environment of the autonomous vehicle (based on its corresponding portion of the sensor data 102), and a motion planner to make driving decisions based on the current state of the environment, predicted states of the environment, and/or map/navigation data. Various possible architectures for the individual SDCAs 104 are discussed in further detail below, in connection with FIGS. 4, 9, 11 and 13, though other suitable architectures may also (or instead) be used. While each of the SDCAs 104 may generate its candidate decisions 106 independently of the other SDCAs 104, some or all of the SDCAs 104 may, in some embodiments, share certain components. For example, two or more of the SDCAs 104 may share the same perception component, or a portion thereof (e.g., a single unit or module for identifying distinct objects for some or all of the sensor data 102). In other embodiments, no component is shared by any two of the SDCAs 104.

The decision arbiter 108 processes the candidate decisions 106 to generate control signals 110 that may reflect "final" decisions. The SDCAs 104 and the decision arbiter 108 may output decisions on any suitable time basis. For example, the SDCAs 104 may output candidate decisions once every T seconds (e.g., every 0.1 seconds, every 0.25 seconds, etc.), or different SDCAs 104 may output their candidate decisions at different intervals (e.g., a first one of the SDCAs 104 generating a new set of operational parameters every 0.25 seconds, while a second one of the SDCAs 104 generates a new range of allowed or disallowed operational parameter ranges every 2 seconds). In other embodiments, some or all of the SDCAs 104 may generate new outputs asynchronously, with the decision arbiter 108 sampling the candidate decisions 106 (and providing a final decision reflecting in the control signals 110) on a suitable periodic basis (e.g., every 0.5 seconds, etc.).

In particular embodiments and/or circumstances, the decision arbiter 108 may, for a given instant of time or a given time window, analyze the candidate decisions 106 from two or more (e.g., all) of the SDCAs 104 in order to generate a final decision that is reflected in the control signals 110. In other embodiments and/or circumstances, the decision arbiter 108 may, for a given time instant or a given time window, select a single decision from among the candidate decisions 106 based on a priori knowledge of characteristics of the different SDCAs 104, without necessarily even considering or analyzing any other of the candidate decisions 106. Example implementations of the former approach will be described below with reference to FIG. 2, while example implementations of the latter approach will be described below with reference to FIG. 3.

The control signals 110 may be provided to one or more operational subsystems of the autonomous vehicle (not shown in FIG. 1) in order to effectuate maneuvering of the autonomous vehicle through the environment. The operational subsystems may include, for example, a steering subsystem for controlling the direction of movement of the autonomous vehicle, an acceleration subsystem for controlling positive acceleration of the autonomous vehicle, and a braking subsystem for controlling negative acceleration of the autonomous vehicle. Each of the operational subsystems may include a proportional-integral-derivative (PID) control loop, for example, and may interface with the appropriate mechanical components or subsystems of the autonomous vehicle.

In other embodiments, the aggregate SDCA 100 includes one or more intermediate stages (not shown in FIG. 1) that reside between the decision arbiter 108 and any subsequent operational subsystem(s). If some or all of the candidate decisions 106 output by the SDCAs 104 specify candidate driving maneuvers (rather than candidate operational parameters), for example, an intermediate stage may process the output of the decision arbiter 108 to convert each final/selected maneuver to an ordered sequence of operational parameter settings that will cause the autonomous vehicle to carry out the maneuver.

It is also understood that more complex architectures may be utilized for the aggregate SDCA 100 using the principles disclosed herein. For example, the SDCAs 104 may provide the decision arbiter 108 with candidate decisions 106 that indicate maneuvers (which are then converted to operational parameters by a stage or components not shown in FIG. 1), while another set of SDCAs may provide a second, different decision arbiter with candidate decisions that indicate operational parameters. A third decision arbiter may then select the (converted) output of the decision arbiter 108 or the output of the second decision arbiter as the final output, or process the two outputs to generate a final output (e.g., in a decision-making process similar to any of the embodiments described above with respect to the decision arbiter 108). Larger hierarchies of decision arbiters (e.g., more hierarchy layers, and/or more decision arbiters in a given layer) are also possible.

The decision arbiter 108 may also include a safety watchdog 112. Alternatively, the safety watchdog 112 may be arranged as an $(N+1)^{th}$ SDCA of the SDCAs 104, with an output that is provided to the decision arbiter 108, or as a stage that is subsequent to the decision arbiter 108, etc. The safety watchdog 112 acts as a check on the SDCAs 104 and/or the decision arbiter 108, and may provide a higher degree of confidence that the autonomous vehicle will not be commanded to perform maneuvers that are particularly dangerous in view of the present circumstances. In some embodiments, the safety watchdog 112 analyzes at least a portion of the sensor data 102, and applies relatively simple rules or algorithms to determine allowed and/or disallowed maneuvers and/or states of the autonomous vehicle. For example, the safety watchdog 112 may require that the autonomous vehicle maintain at least a distance of x meters between itself and an object in or near the path of the autonomous vehicle, where x is calculated by a fixed equation that accounts for the current speed and direction of the autonomous vehicle relative to the object. In some embodiments, any of the candidate decisions 106 that do not satisfy the current restrictions (e.g., allowed and/or disallowed maneuvers or operational parameters) indicated by the safety watchdog 112 are discarded, and/or the output of the decision arbiter 108 is forced to satisfy the current restrictions by other suitable means. The safety watchdog 112 may execute on a separate physical processor, a processor that executes the functions of one or more of the SDCAs 104, or a processor that executes the decision arbiter 108 (and/or other portions of the aggregate SDCA 100), for example. In some embodiments, the aggregate SDCA 100 does not include a safety watchdog.

FIG. 2 illustrates an aggregate SDCA 120, which may correspond to the SDCA 100 of FIG. 1. As seen in FIG. 2, however, the decision arbiter 108 of the aggregate SDCA 120 includes a candidate decision analyzer 122, which processes the candidate decisions 106 according to a suitable technique in order to generate final decisions reflected in the control signals 110 (or, in the manner discussed above, to generate final decisions that are converted to the control signals 110 by one or more intermediate stages not depicted in FIG. 2). That is, at least in some circumstances, the candidate decision analyzer 122 "looks at" all of the candidate decisions 106 before making a final decision for any given time or time window. In some embodiments, however, outputs of the safety watchdog 112 or other factors may cause the candidate decision analyzer 122 (or the decision arbiter 108 generally) to bypass analysis of some or all of the candidate decisions 106 in certain scenarios.

In one embodiment where the candidate decisions 106 reflect maneuver-level decisions, the candidate decision analyzer 122 may utilize one or more hand-coded truth tables to determine which maneuver is most appropriate. For example, in a highly simplified embodiment and scenario where there are only three SDCAs 104 and only two possible maneuvers (M="move to the other lane" and S="stay in the current lane"), the following truth table may be employed:

TABLE 1

Decision Arbiter Truth Table

| SDCA 1 Output | SDCA 2 Output | SDCA 3 Output | Decision Arbiter Output |
|---|---|---|---|
| M | M | M | M |
| M | M | S | M |
| M | S | M | S |
| M | S | S | S |
| S | M | M | M |
| S | M | S | S |
| S | S | M | S |
| S | S | S | S |

In the above example, the decision arbiter 108 selects the maneuver that is indicated by the most SDCAs 104, with the exception that the decision arbiter 108 decides to stay in the current lane any time that "SDCA 2" decides to do so, regardless of the majority decision. This may be desired if testing had shown that "SDCA 1" and "SDCA 3" are more likely than "SDCA 2" to make imprudent decisions to move to another lane, for example.

In some embodiments, the decision arbiter 108 has local access to a number of truth tables, each of which corresponds to a situation in which a different subset of maneuvers is currently possible. In other embodiments, the decision arbiter 108 accesses a single, larger truth table that accounts for a large or global collection of maneuver decisions, regardless of whether any given maneuver is currently possible (e.g., including the maneuver "move one lane to the right" even in situations where there are currently no lanes to the right of the autonomous vehicle).

In some embodiments, one, some or all of the truth tables employed by the decision arbiter 108 reflect a pure voting technique, or a vote tally may be recorded in place of a truth table. In pure voting embodiments such as these, the maneuver indicated by more of the SDCAs 104 than any other maneuver "wins" (i.e., is selected by the decision arbiter 108 as the final output, possibly subject to overrule by the safety watchdog 112). In some embodiments, however, certain ones of the SDCAs 104 may be given weighted votes (e.g., two votes), at least in certain situations, to reflect a higher degree of confidence in its decisions. The truth table (or other rules, if no truth table is used) may specify the winner of "tie breaker" scenarios by giving priority to one or more of the SDCAs 104 in various situations, or using other suitable tie break rules.

In some embodiments, the decision arbiter 108 instead assigns a score to each maneuver that is output by at least one of the SDCAs 104. As a simple example, which may be identical or similar to the voting example above, the decision arbiter 108 simply adds a fixed quantity (e.g., one) to the score for a particular maneuver for each of the candidate decisions 106 that specifies that maneuver, and selects the maneuver with the highest score. As another example, which may operate in a manner identical or similar to the weighted voting example above, the decision arbiter 108 weighs the quantity added to a score differently based on which of the SDCAs 104 specified the maneuver. In any of these "scoring" techniques, any suitable tie-break techniques, rules or algorithms may be used.

In one embodiment where the candidate decisions 106 instead specify particular operational parameters, the candidate decision analyzer 122 may apply one or more mathematical formulas or functions to determine which operational parameters to specify within the control signals 110. For example, the candidate decision analyzer 122 may calculate the geometric mean of speed changes indicated in the candidate decisions 106, and/or the geometric mean of direction changes indicated in the candidate decisions 106, and use the geometric mean(s) as final outputs reflected in the control signals 110. Of course, many other mathematical operations or functions, or rules/algorithms that include such operations/functions, may be utilized (e.g., arithmetic mean, medium, weighted average).

In some embodiments, the candidate decision analyzer 122 discards or ignores certain ones of the candidate decisions 106 in particular situations. For example, the candidate decision analyzer 122 may discard any "outliers" among the candidate decisions 106. In embodiments where the candidate decisions 106 indicate maneuvers, ignoring outlier decisions may inherently occur due to use of a truth table, a voting technique, or a scoring technique, as discussed above. In embodiments where the candidate decisions 106 indicate operational parameters, however, the candidate decision analyzer 122 may identify outliers using mathematical formulas or other techniques, and exclude the outliers from whatever formula (e.g., geometric mean) is used to generate the control signals 110. Outliers may be identified on a per-SDCA/decision basis, rather than a per-operational parameter basis. For example, if each of the candidate decisions 106 specifies both a speed change and a direction change, a particular one of the candidate decisions 106 may be identified as an outlier and discarded only if the combination of both speed and direction indicates an anomalous decision (e.g., by calculating a vector distance from an average speed/direction vector).

It is understood that the candidate decision analyzer 122 may use any of the above techniques, a combination of two or more of the above techniques (e.g., voting to identify the "top" two maneuvers, and then using scoring techniques to identify a "winner" from among those two maneuvers, etc.), and/or any other suitable techniques.

FIG. 3 illustrates an aggregate SDCA 140, which also may correspond to the SDCA 100 of FIG. 1. As seen in FIG. 3, however, the decision arbiter 108 of the aggregate SDCA 140 includes an SDCA selector 142, which generally uses a priori knowledge of characteristics (e.g., strengths and weaknesses) of the different SCDAs 104 in order to select, at any given time, a particular one of the candidate decisions 106 as the final decision reflected in the control signals 110 (or, in the manner discussed above, the final decision that is converted to the control signals 110 by one or more intermediate stages not depicted in FIG. 3). That is, at least in some circumstances, the SDCA selector 142 selects a single one of the candidate decisions 106 without even analyzing or considering the remaining candidate decisions 106. In some embodiments, however, outputs of the safety watchdog 112 or other factors may cause the SDCA selector 142 (or the decision arbiter 108 generally) to bypass selection of any of the candidate decisions 106 in certain circumstances.

In the embodiment shown in FIG. 3, the SDCA selector 142 includes a neural network 144 that inherently learns the necessary a priori knowledge using appropriate learning techniques, such as supervised learning, reinforcement learning, or evolutionary algorithms. Training of the neural network 144 is discussed in further detail below, according to various embodiments. Alternatively, the SDCA selector 144 does not include the neural network 144. For example, the SDCA selector 144 may select from among the candidate decisions 106 using fixed rules and/or heuristic techniques.

In some embodiments, the SDCA selector 142 selects a particular one of the candidate decisions 106 based on a priori knowledge of which of the SDCAs 104 operate "best" in certain conditions or situations. For example, the neural network 144 may be trained using a supervised learning technique to determine which of the SDCAs 104 operate best in particular weather conditions (e.g., snow, ice, rain, etc.), which of the SDCAs 104 operate best on particular types of roads (e.g., gravel roads, highways, etc.), which of the SDCAs 104 are best able to execute particular maneuvers (e.g., U-turns, passing vehicles, etc.), and so on.

Because the blocks of FIGS. 1-3 (and various other figures) depict software architectures rather than physical components, it is understood that, when any reference is made herein to a particular neural network or other software architecture component depicted in the figures being "trained," or to the role of any software architecture component (e.g., SDCAs 104) in conducting such training, the operations or procedures described may have occurred on a different computing system (e.g., using specialized development software). Thus, for example, the neural network 144 may have been trained, and/or the SDCAs 104 may have been trained or otherwise designed, on a different computer system before being implemented within any vehicle. Put differently, the SDCAs 104, decision arbiter 108, etc., may be included in the software architectures of a "final" product within a given autonomous vehicle, without that vehicle or its physical components (processors, etc.) necessarily having been used for any training processes.

The criteria for "best" performance may vary depending on the embodiment, and may generally be determined by the data and/or technique used to train the neural network 144. If "best" performance is viewed as the performance that most closely approximates an expert human driver, for example, the neural network 144 may be trained using data that is generated as qualified human drivers drive in various real and/or simulated environments. In particular, decisions made by the human drivers (e.g., decisions to execute particular maneuvers, and/or to change speed, direction, and/or other operational parameters) in specific conditions and/or situations may be compared to the decisions output by some or all of the SDCAs 104 in the same conditions/situations, and indicators of the decisions from the SDCAs 104 that are most similar to the human drivers' decisions (as determined by human analysis, or automated algorithms, etc.) may be used as labels, weights, or scores for a supervised training process. For example, the differences between decisions output from SDCAs and decisions made by human drivers may be determined, and weights or scores for each of the SDCAs may be determined based on those differences. An SDCA that provides decisions that closely approximate the human drivers' decisions may be assigned a higher weight or score than an SDCA that provides less accurate decisions.

To ensure the SDCAs 104 are making decisions with respect to the same conditions/situations as the human drivers, real or simulated sensor data (e.g., lidar data, camera data, etc.) generated during the human drivers' real or virtual trips may be used as inputs to the SDCAs 104 during the training process. Alternatively, higher level data generated during or after the human drivers' trips may be used as inputs to the SDCAs 104 (or as inputs to some portion of each of the SDCAs 104). For example, perception data generated using the human drivers' real or virtual trips (e.g., data indicating positions of objects in the environment over time, classifications of those objects, and possibly predictions of those objects' future positions) may be used as inputs to motion planners within the SDCAs 104 in order to ensure that the same conditions/situations are being considered for decision making. Once trained, the neural network 144 may be well equipped to intelligently determine which of the SDCAs 104 will probably make decisions most like an expert human driver in arbitrary conditions and/or situations, even if those conditions/situations were not specifically encountered during the training process.

In other embodiments, "best" performance may be viewed as the performance that most closely resembles a particular driving style (e.g., "slow and smooth," "fast/aggressive and less smooth," etc.). Similar to the expert human driver example above, labels for such training may be generated by comparing decisions made by human drivers that attempt to drive (or naturally drive) according to a certain style. For example, a first set of training data may correspond to a human driver who drives in a more patient manner with relatively few abrupt movements, and a second set of training data may correspond to a human driver who drives more aggressively to reach a destination in a significantly shorter amount of time. Alternatively, driving style labels for supervised learning may be generated by human reviewers (or an automated review software module) analyzing other factors, such as the amount of G-forces experienced as a result of various driving decisions made by the different SDCAs 104, for example.

In other embodiments, reinforcement learning is used to train the neural network 144 to select particular ones of the SDCAs 104 in particular conditions and/or situations. With reinforcement learning, at each of a number of different times (e.g., periodically, or on another suitable time basis), the neural network 144 observes the candidate decisions 106, decides to take an action (e.g., select a particular candidate decision), and potentially receives or recognizes a "reward" based on "results" of that action. Generally, the neural network 144 seeks to learn a mapping of states to actions (e.g., a mapping of candidate decision sets to final decisions) that maximizes the rewards over some suitable time interval or intervals.

To accomplish the training, learning parameters may be manually set to define a number of positive/desired results/goals, and a number of associated rewards. The positive results may be defined by a developer as any specific, suitable outcomes related to near-term or long-term driving goals, such as avoiding safety violations (e.g., crashing), achieving certain metrics (e.g., having an average or maximum G-force below a predefined threshold), and so on. In general, the reward that is defined for a particular result may determine how heavily that result is weighed in the training process. For a given set of learning parameters, the training data may include candidate decisions generated as a virtual autonomous vehicle moves through a large number of different, virtual environments, with a reward being indicated/granted (or not indicated/granted) based on whether the results defined by the learning parameters are achieved by the neural network 144 in specific simulated scenarios. In other embodiments, the training data instead, or also, includes real-world data, e.g., generated by a real-world autonomous vehicle that includes the neural network 144. In either case, the training process generally causes the neural network 144 to learn to make decisions that maximize its rewards.

In still other embodiments, the SDCA selector 142 does not include the neural network 144, and selects particular ones of the candidate decisions 106 using rules based models or heuristic models reflecting known qualities of various SDCAs 104. For example, different ones of the SDCAs 104 may include different neural networks (e.g., for perception and/or motion planning, as discussed further below) that were specifically trained for driving in certain conditions (e.g., in certain weather and/or road conditions, or on certain types of roads) and/or in certain situations (e.g., using an on-ramp to a highway, parallel parking, etc.). Alternatively, the SDCAs 104 may have been subjected to performance testing, with various metrics indicating their respective level of performance in different conditions and/or situations. In either case, the SDCA selector 142 may implement a rules-based or heuristic model to select the decisions 106 of the appropriate SDCAs 104 when the corresponding conditions and/or situations are detected (e.g., based on sensor data and perception functions). As a more specific example, the SDCA selector 142 may select the candidate decisions 106 of a first one of the SDCAs 104 that performs well on wet roads at night when those conditions are detected, instead select the candidate decisions 106 of a second one of the SDCAs 104 that performs well on dry roads on overcast days when those conditions are detected, and so on.

As seen from the above examples, the selection of one of the SDCAs 104 by the SDCA selector 142 may, at any given time, be based on current conditions and/or situations. In some embodiments and/or scenarios, however, the selection may instead (or also) be based on certain conditions and/or situations that are expected in the future. For example, the SDCA selector 142 may select a particular one of the SDCAs 104 that is well-suited for performing evasive maneuvers if the SDCA selector 142 determines or learns that a dangerous situation is developing or imminent, and that evasive maneuvers may soon become necessary.

In some embodiments, human input can be used to affect which of the SDCAs 104 is selected for a particular time period. For example, a passenger may activate a physical control within the vehicle (e.g., a button, switch, etc.) to indicate a desired driving style (e.g., "smooth" for a more sedate riding experience that is more amenable to work, reading, etc., or "aggressive" to arrive at your destination more quickly, etc.), and the SDCA selector 142 may select the candidate decisions 106 of one of the SDCAs 104 that is trained (or otherwise well-suited) to drive in the selected manner (e.g., as discussed above). Alternatively, a user (e.g., passenger) may select the desired driving style by activating a virtual control. For example, the user may select a virtual button or other control shown on the display of a head unit within the vehicle, and the head unit may communicate the selection to a system implementing the SDCA selector 142 (e.g., via a CAN bus or other network). As another example, the user may select a virtual button or other control shown on a graphical user interface (GUI) of the user's smartphone, smart watch, tablet, or other personal mobile device, and the mobile device may communicate the selection to a system implementing the SDCA selector 142 via one or more networks (e.g., Bluetooth to communicate with a head unit of the vehicle, plus a CAN bus or other network to communicate the selection from the head unit to the subsystem implementing the SDCA selector 142).

In some embodiments and/or scenarios, for safety or other reasons, a user selection of a driving style can be preempted by particular SDCAs 104, or by the safety watchdog 112. For example, an SDCA (of the SDCAs 104) that corresponds to a user-selected driving style may be "overruled" if a threshold number of the other SDCAs 104 agree on a different maneuver, or if the decisions of the other SDCAs 104 show that the selected SDCA is generating an outlier decision, etc. As another example, the SDCA selector 142 may be trained (e.g., using reinforcement learning) to identify conditions and/or situations in which it would be more appropriate to select the candidate decisions 106 of SDCAs 104 that do not correspond to the user selection.

While the aggregate SDCA 120 of FIG. 2 and the aggregate SDCA 140 of FIG. 3 are shown as distinct architectures, some embodiments utilize a combination of both. In particular, the decision arbiter 108 may generate final decisions by performing functions of the candidate decision analyzer 122 in some scenarios, and instead performing the functions of the SDCA selector 142 in other scenarios. Alternatively, the decision arbiter 108 may generate final decisions by performing hybrid functions that combine aspects of the candidate decision analyzer 122 with aspects of the SDCA selector 142. For example, the decision arbiter 108 may select the candidate decisions 106 of a particular subset of the SDCAs 104 based on both a priori knowledge of the SDCAs 104 and detected conditions and/or situations, and then analyze all candidate decisions 106 from that subset to generate final decisions (e.g., by calculating the geometric means of operational parameters indicated by the candidate decisions 106 of the subset, or by voting, etc.). As another example, the decision arbiter 108 may weigh the candidate decisions 106 of particular SDCAs 104 based on both a priori knowledge of the SDCAs 104 and detected conditions and/or situations, and then calculate weighted scores or tally weighted votes to generate final decisions.

Example Individual Self-Driving Control Architecture

Figure 4:
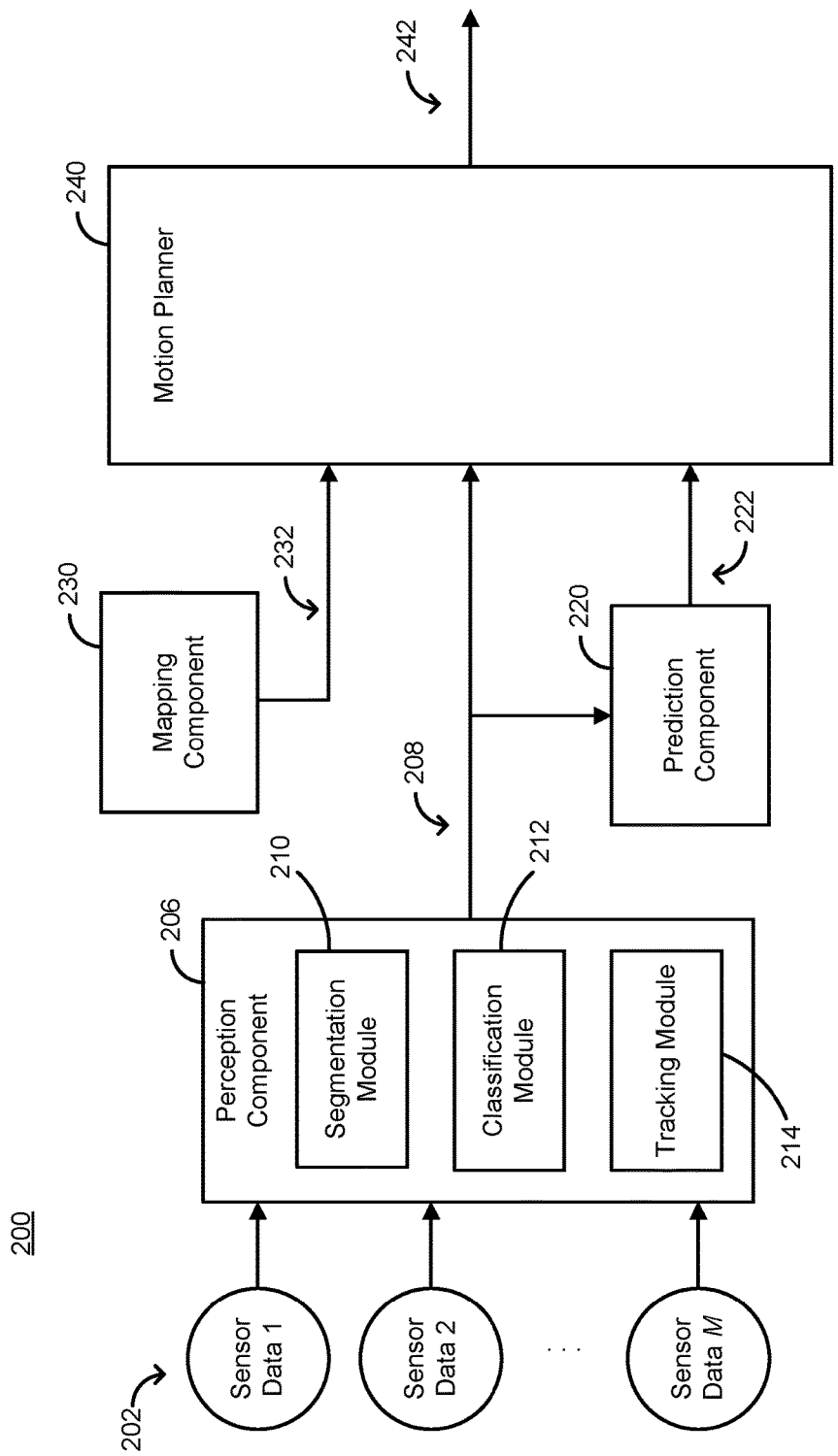
FIG. 4 is a block diagram of an example self-driving control architecture that may be used in the aggregate self-driving control architecture of FIG. 1, 2 or 3.

FIG. 4 illustrates an example SDCA 200, which may be utilized as one of the SDCAs 104 in the aggregate SDCA 100, 120 or 140 of FIG. 1, 2 or 3, respectively, as a stand-alone SDCA, or in another suitable software architecture. The SDCA 200 receives as input M sets of sensor data 202 generated by M different sensors, with M being any suitable integer equal to or greater than one. The sensor data 202 may correspond to a portion, or all, of the sensor data 102 of FIG. 1, 2 or 3. As just one example, "sensor data 1" may include frames of point cloud data generated by a first lidar device, "sensor data 2" may include frames of point cloud data generated by a second lidar device, "sensor data 3" (not shown in FIG. 4) may include frames of digital images generated by a camera, and so on. As discussed above in connection with FIG. 1, the sensors may include one or more lidar devices, cameras, radar devices, thermal imaging units, IMUs, GPS units, and/or other sensor types.

The sensor data 202 is input to a perception component 206 of the SDCA 200, and is processed by the perception component 206 to generate perception signals 208 descriptive of a current state of the autonomous vehicle's environment. It is understood that the term "current" may actually refer to a very short time prior to the generation of any given perception signals 208, e.g., due to the short processing delay introduced by the perception component 206 and other factors. To generate the perception signals, the perception component may include a segmentation module 210, a classification module 212 and a tracking module 214.

The segmentation module 210 is generally configured to identify distinct objects within the sensor data representing the sensed environment. Depending on the embodiment and/or scenario, the segmentation task may be performed separately for each of a number of different types of sensor data, or may be performed jointly on a fusion of multiple types of sensor data or data from multiple sensors of the same type (e.g., two cameras having different focal lengths or resolutions). In some embodiments where lidar devices are used, the segmentation module 210 analyzes point cloud frames to identify subsets of points within each frame that correspond to probable physical objects in the environment. In other embodiments, the segmentation module 210 jointly analyzes lidar point cloud frames in conjunction with camera image frames to identify objects in the environment. Other suitable techniques, and/or data from other suitable sensor types, may also be used to identify objects. It is noted that, as used herein, references to different or distinct "objects" may encompass physical things that are entirely disconnected (e.g., with two vehicles being two different "objects"), as well as physical things that are connected or partially connected (e.g., with a vehicle being a first "object" and the vehicle's hitched trailer being a second "object").

The segmentation module 210 may use predetermined rules or algorithms to identify objects. For example, the segmentation module 210 may identify as distinct objects, within a point cloud, any clusters of points that meet certain criteria (e.g., having no more than a certain maximum distance between all points in the cluster, etc.). Alternatively, the segmentation module 210 may utilize a neural network that has been trained to identify distinct objects within the environment (e.g., using supervised learning with manually generated labels for different objects within test data point clouds, etc.), or another type of machine learning based model. Example operation of the segmentation module 210 is discussed in more detail below in FIG. 8B, for an embodiment in which the perception component 206 processes point cloud data.

The classification module 212 is generally configured to determine classes (labels, categories, etc.) for different objects that have been identified by the segmentation module 210. Like the segmentation module 210, the classification module 212 may perform classification separately for different sets of the sensor data 202, or may classify objects based on data from multiple sensors, etc. Moreover, and also similar to the segmentation module 210, the classification module 212 may execute predetermined rules or algorithms to classify objects, or may utilize a neural network or other machine learning based model to classify objects. Example operation of the classification module 212 is discussed in more detail below in FIG. 8B, for an embodiment in which the perception component 206 processes point cloud data.

The tracking module 214 is generally configured to track distinct objects over time (e.g., across multiple lidar point cloud or camera image frames). The tracked objects are generally objects that have been identified by the segmentation module 210, but may or may not be objects that were classified by the classification module 212, depending on the embodiment and/or scenario. The segmentation module 210 may assign identifiers to identified objects, and the tracking module 214 may associate existing identifiers with specific objects where appropriate (e.g., for lidar data, by associating the same identifier with different clusters of points, at different locations, in successive point cloud frames). Like the segmentation module 210 and the classification module 212, the tracking module 214 may perform separate object tracking based on different sets of the sensor data 202, or may track objects based on data from multiple sensors. Moreover, and also similar to the segmentation module 210 and the classification module 212, the tracking module 214 may execute predetermined rules or algorithms to track objects, and/or may utilize a neural network or other machine learning model to track objects. A road or a lane marking may be tracked by tracking a geometric property (e.g., a shape, curvature, direction, or slope) of the road or lane marking over time.

The SDCA 200 also includes a prediction component 220, which processes the perception signals 208 to generate prediction signals 222 descriptive of one or more predicted future states of the autonomous vehicle's environment. For a given object, for example, the prediction component 220 may analyze the type/class of the object (as determined by the classification module 212) along with the recent tracked movement of the object (as determined by the tracking module 214) to predict one or more future positions of the object. As a relatively simple example, the prediction component 220 may assume that any moving objects will continue to travel on their current direction and with their current speed, possibly taking into account first- or higher-order derivatives to better track objects that have continuously changing directions, objects that are accelerating, and so on. In some embodiments, the prediction component 220 also predicts movement of objects based on more complex behaviors. For example, the prediction component 220 may assume that an object that has been classified as another vehicle will follow rules of the road (e.g., stop when approaching a red light), and will react in a certain way to other dynamic objects (e.g., attempt to maintain some safe distance from other vehicles). The prediction component 220 may inherently account for such behaviors by utilizing a neural network or other machine learning model, for example. The prediction component 220 may be omitted from the SDCA 200, in some embodiments.

In some embodiments, the perception signals 208 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 214, possibly with an "unknown" class for certain pixels that were not successfully classified. Similarly, the prediction signals 222 may include, for each such grid generated by the perception component 206, one or more "future occupancy grids" that indicate predicted object positions, boundaries and/or orientations at one or more future times (e.g., 1, 2 and 5 seconds ahead). Occupancy grids are discussed further below in connection with FIGS. 9 and 10.

A mapping component 230 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 232. In some embodiments, the mapping and navigation signals 232 include other map- or location-related information, such as speed limits, traffic indicators, and so on. The signals 232 may be obtained from a remote server (e.g., via a cellular or other communication network of the autonomous vehicle, or of a smartphone coupled to the autonomous vehicle, etc.), and/or may be locally stored in a persistent memory of the autonomous vehicle, and/or may be generated live in the autonomous vehicle, and/or may have been previously recorded by the autonomous vehicle.

A motion planner 240 processes the perception signals 208, the prediction signals 222, and the mapping and navigation signals 232 to generate decisions 242 regarding the next movements of the autonomous vehicle. Depending on the type of the motion planner 240, the decisions 242 may be operational parameters (e.g., braking, speed and steering parameters) or particular maneuvers (e.g., turn left, move to right lane, move onto shoulder of road, etc.). In embodiments where the SDCA 200 is one of the SDCAs 104 of FIG. 1, 2 or 3, the decisions 242 may correspond to one of the candidate decisions 106. In embodiments where the SDCA 200 is a stand-alone architecture, the decisions 242 may be provided to one or more operational subsystems of the autonomous vehicle (e.g., if the decisions 242 indicate specific operational parameters), or may be provided to one or more intermediate stages that convert the decisions 242 to operational parameters (e.g., if the decisions indicate specific maneuvers).

The motion planner 240 may utilize any suitable type(s) of rules, algorithms, heuristic models, machine learning models, or other suitable techniques to make driving decisions based on the perception signals 208, prediction signals 222, and mapping and navigation signals 232. For example, the motion planner 240 may be a "learning based" planner (e.g., a planner that is trained using supervised learning or reinforcement learning), a "search based" planner (e.g., an A* planner), a "sampling based" planner (e.g., a planner that performs random searches in a space that represents a universe of possible decisions), a "predictive control based" planner (e.g., a model predictive control (MPC) planner), and so on. SDCAs that include variousdifferent types of motion planners, while not reflecting an exhaustive set of possible planner types, are discussed below in connection with FIGS. 9, 11 and 13.

Referring for a moment back to FIG. 1, the SDCAs 104 may collectively include a number of different motion planner types in order to provide a more diverse set of mechanisms for generating driving decisions. Similar to the diversity of decision types (e.g., operational parameters output by one SDCA, disallowed parameter ranges output by another SDCA, etc.), and/or the diversity of types of sensor data for different ones of the SDCAs 104 (e.g., lidar data input to one SDCA, lidar plus camera data input to another SDCA, etc.), the diversity of motion planner types may provide for improved safety and/or other performance aspects of the autonomous vehicle. In particular embodiments, the SDCAs 104 may include SDCAs with two, three, four, or more different motion planner types from among the group consisting of learning based planners, search based planners, sampling based planners, predictive control based planners, and any other suitable type of motion planner.

Example Lidar Systems

As seen from various examples provided above, sensor data collected by an autonomous vehicle may in some embodiments include point cloud data that is generated by one or more lidar devices or, more generally, a lidar system. To provide a better understanding of the types of data that may be generated by lidar systems, and of the manner in which lidar systems and devices may function, example lidar systems and point clouds will now be described with reference to FIGS. 5-8.

Figure 5:
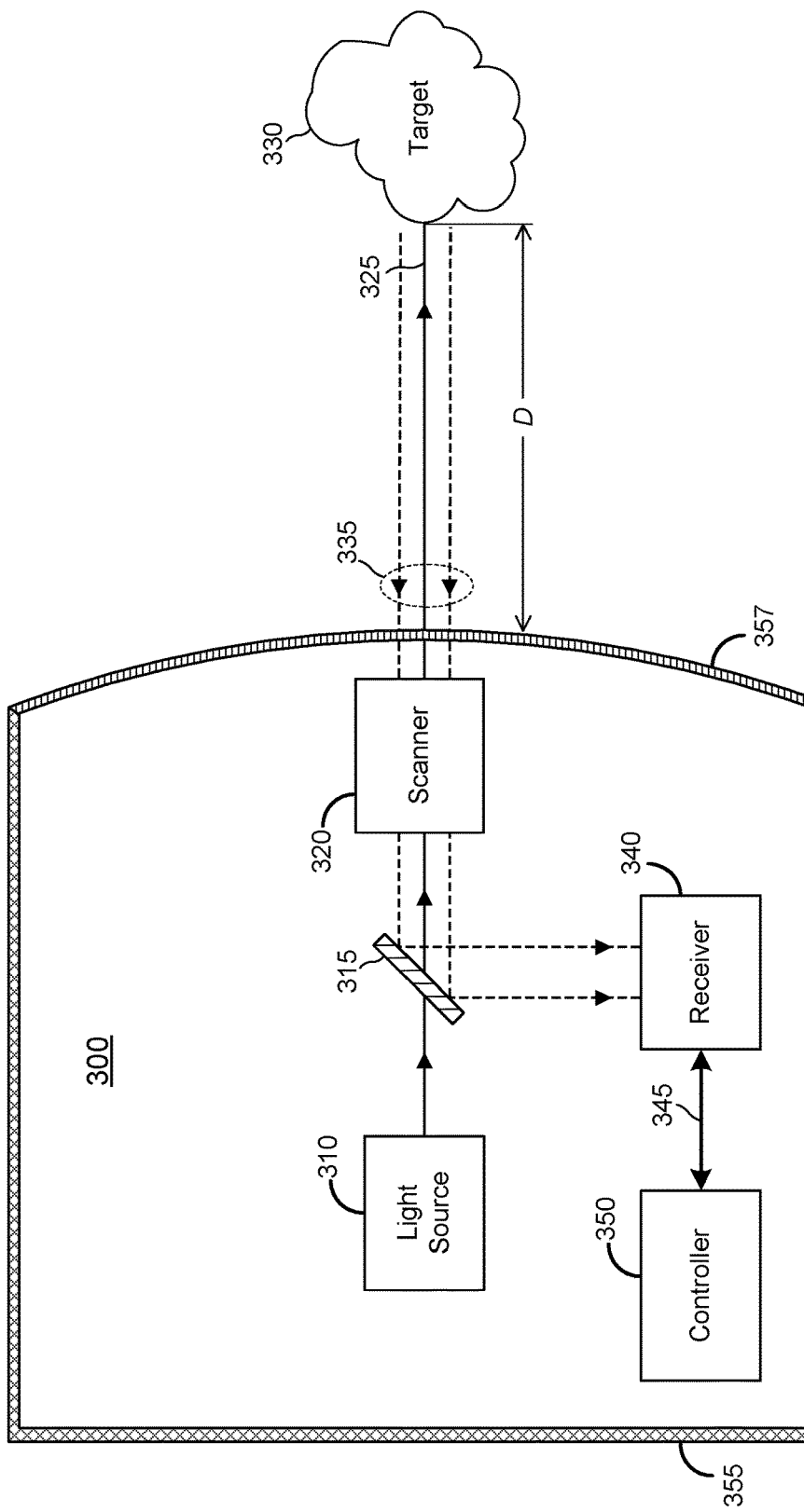
FIG. 5 is a block diagram of an example light detection and ranging (lidar) system that may be used to provide sensor data to the self-driving control architecture(s) of FIG. 1 or 4.

Referring first to FIG. 5, a lidar system 300 may be used to provide at least a portion of the sensor data 102 of FIG. 1, 2 or 3, or at least a portion of the sensor data 202 of FIG. 4, for example. While various lidar system components and characteristics are described herein, it is understood that any suitable lidar device(s) or system(s), and/or any other suitable types of sensors, may provide sensor data for processing using the software architectures described herein.

The example lidar system 300 may include a light source 310, a mirror 315, a scanner 320, a receiver 340, and a controller 350. The light source 310 may be, for example, a laser (e.g., a laser diode) that emits light having a particular operating wavelength in the infrared, visible, or ultraviolet portions of the electromagnetic spectrum. In operation, the light source 310 emits an output beam of light 325 which may be continuous-wave, pulsed, or modulated in any suitable manner for a given application. The output beam of light 325 is directed downrange toward a remote target 330 located a distance D from the lidar system 300 and at least partially contained within a field of regard of the system 300.

Once the output beam 325 reaches the downrange target 330, the target 330 may scatter or, in some cases, reflect at least a portion of light from the output beam 325, and some of the scattered or reflected light may return toward the lidar system 300. In the example of FIG. 5, the scattered or reflected light is represented by input beam 335, which passes through the scanner 320, which may be referred to as a beam scanner, optical scanner, or laser scanner. The input beam 335 passes through the scanner 320 to the mirror 315, which may be referred to as an overlap mirror, superposition mirror, or beam-combiner mirror. The mirror 315 in turn directs the input beam 335 to the receiver 340.

The input beam 335 may include light from the output beam 325 that is scattered by the target 330, light from the output beam 325 that is reflected by the target 330, or a combination of scattered and reflected light from target 330. According to some implementations, the lidar system 300 can include an "eye-safe" laser that present little or no possibility of causing damage to a person's eyes. The input beam 335 may contain only a relatively small fraction of the light from the output beam 325.

The receiver 340 may receive or detect photons from the input beam 335 and generate one or more representative signals. For example, the receiver 340 may generate an output electrical signal 345 that is representative of the input beam 335. The receiver may send the electrical signal 345 to the controller 350. Depending on the implementation, the controller 350 may include one or more instruction-executing processors, an application-specific integrated circuit (ASIC), a field-programmable gate array (FPGA), and/or other suitable circuitry configured to analyze one or more characteristics of the electrical signal 345 in order to determine one or more characteristics of the target 330, such as its distance downrange from the lidar system 300. More particularly, the controller 350 may analyze the time of flight or phase modulation for the beam of light 325 transmitted by the light source 310. If the lidar system 300 measures a time of flight of T (e.g., T representing a round-trip time of flight for an emitted pulse of light to travel from the lidar system 300 to the target 330 and back to the lidar system 300), then the distance D from the target 330 to the lidar system 300 may be expressed as D=c·T/2, where c is the speed of light (approximately $3.0 \times 10^8$ m/s).

The distance D from the lidar system 300 is less than or equal to a maximum range $R_{MAX}$ of the lidar system 300. The maximum range $R_{MAX}$ (which also may be referred to as a maximum distance) of a lidar system 300 may correspond to the maximum distance over which the lidar system 300 is configured to sense or identify targets that appear in a field of regard of the lidar system 300. The maximum range of lidar system 300 may be any suitable distance, such as 50 m, 200 m, 500 m, or 1 km, for example.

In some implementations, the light source 310, the scanner 320, and the receiver 340 may be packaged together within a single housing 355, which may be a box, case, or enclosure that holds or contains all or part of the lidar system 300. The housing 355 includes a window 357 through which the beams 325 and 335 pass. The controller 350 may reside within the same housing 355 as the components 310, 320, and 340, or the controller 350 may reside outside of the housing 355. In one embodiment, for example, the controller 350 may instead reside within, or partially within, the perception component 206 of the SDCA 200 shown in FIG. 4. In some implementations, the housing 355 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

With continued reference to FIG. 5, the output beam 325 and input beam 335 may be substantially coaxial. In other words, the output beam 325 and input beam 335 may at least partially overlap or share a common propagation axis, so that the input beam 335 and the output beam 325 travel along substantially the same optical path (albeit in opposite directions). As the lidar system 300 scans the output beam 325 across a field of regard, the input beam 335 may follow along with the output beam 325, so that the coaxial relationship between the two beams is maintained.

Generally speaking, the scanner 320 steers the output beam 325 in one or more directions downrange. To accomplish this, the scanner 320 may include one or more scanning mirrors and one or more actuators driving the mirrors to rotate, tilt, pivot, or move the mirrors in an angular manner about one or more axes, for example. While FIG. 5 depicts only a single mirror 315, the lidar system 300 may include any suitable number of flat or curved mirrors (e.g., concave, convex, or parabolic mirrors) to steer or focus the output beam 325 or the input beam 335. For example, the first mirror of the scanner may scan the output beam 325 along a first direction, and the second mirror may scan the output beam 325 along a second direction that is substantially orthogonal to the first direction.

A "field of regard" of the lidar system 300 may refer to an area, region, or angular range over which the lidar system 300 may be configured to scan or capture distance information. When the lidar system 300 scans the output beam 325 within a 30-degree scanning range, for example, the lidar system 300 may be referred to as having a 30-degree angular field of regard. The scanner 320 may be configured to scan the output beam 325 horizontally and vertically, and the field of regard of the lidar system 300 may have a particular angular width along the horizontal direction and another particular angular width along the vertical direction. For example, the lidar system 300 may have a horizontal field of regard of 10° to 120° and a vertical field of regard of 2° to 45°.

The one or more scanning mirrors of the scanner 320 may be communicatively coupled to the controller 350, which may control the scanning mirror(s) so as to guide the output beam 325 in a desired direction downrange or along a desired scan pattern. In general, a scan (or scan line) pattern may refer to a pattern or path along which the output beam 325 is directed. The lidar system 300 can use the scan pattern to generate a point cloud with points or "pixels" that substantially cover the field of regard. The pixels may be approximately evenly distributed across the field of regard, or distributed according to a particular non-uniform distribution.

In operation, the light source 310 may emit pulses of light which the scanner 320 scans across a field of regard of the lidar system 300. The target 330 may scatter one or more of the emitted pulses, and the receiver 340 may detect at least a portion of the pulses of light scattered by the target 330. The receiver 340 may receive or detect at least a portion of the input beam 335 and produce an electrical signal that corresponds to the input beam 335. The controller 350 may be electrically coupled or otherwise communicatively coupled to one or more of the light source 310, the scanner 320, and the receiver 340. The controller 350 may provide instructions, a control signal, or a trigger signal to the light source 310 indicating when the light source 310 should produce optical pulses, and possibly characteristics (e.g., duration, period, peak power, wavelength, etc.) of the pulses. The controller 350 may also determine a time-of-flight value for an optical pulse based on timing information associated with when the pulse was emitted by light source 310 and when a portion of the pulse (e.g., the input beam 335) was detected or received by the receiver 340.

As indicated above, the lidar system 300 may be used to determine the distance to one or more downrange targets 330. By scanning the lidar system 300 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 300 may be configured to repeatedly capture or generate point clouds of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 300 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 300 can overlap, encompass, or enclose at least a portion of the target 330, which may include all or part of an object that is moving or stationary relative to lidar system 300. For example, the target 330 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 6:
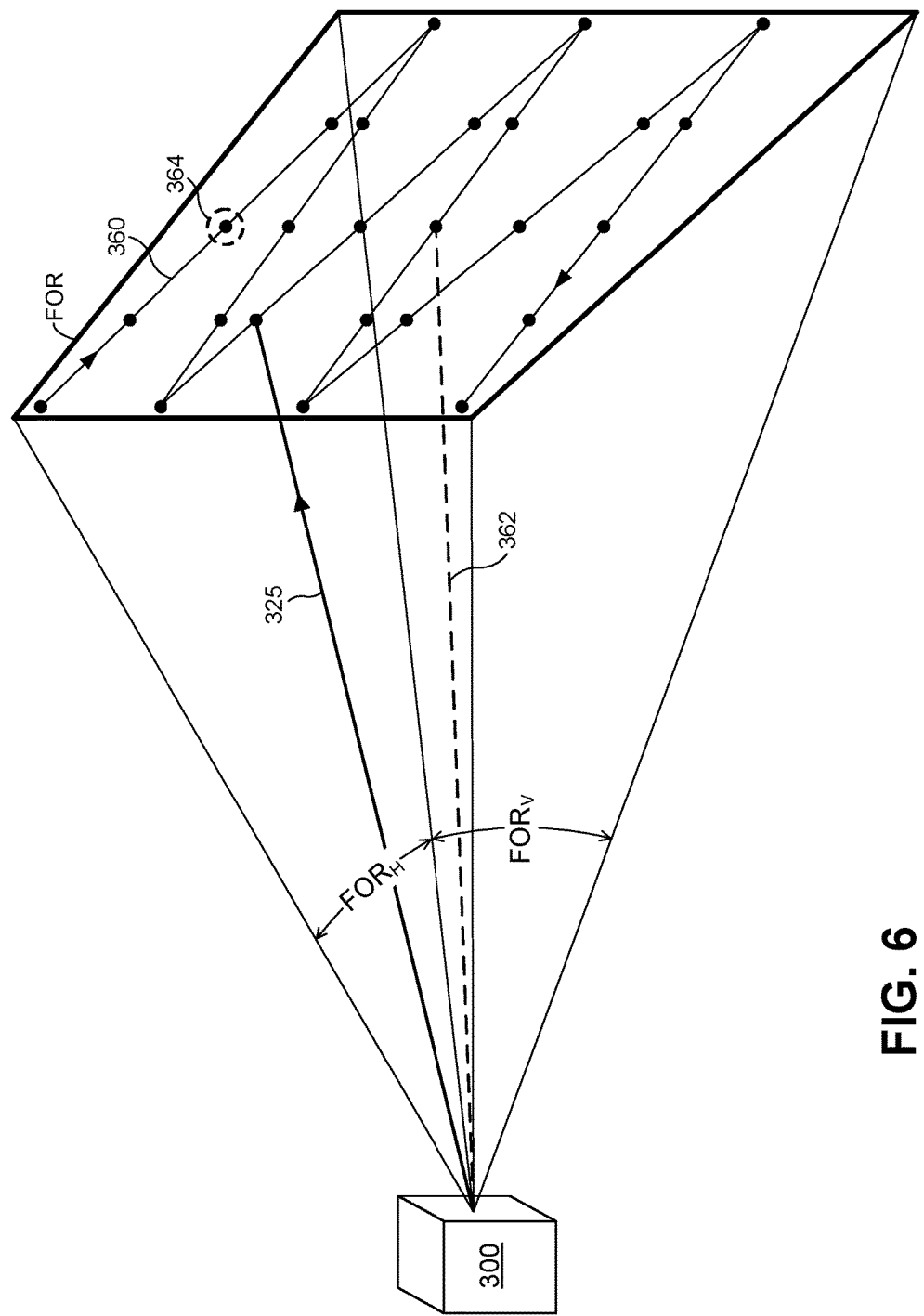
FIG. 6 illustrates an example scan pattern which the lidar system of FIG. 5 can produce when identifying targets within a field of regard.

FIG. 6 illustrates an example scan pattern 360 which the lidar system 300 of FIG. 5 may produce. In particular, the lidar system 300 may be configured to scan the output optical beam 325 along the scan pattern 360. In some implementations, the scan pattern 360 corresponds to a scan across any suitable field of regard having any suitable horizontal field of regard ($FOR_H$) and any suitable vertical field of regard ($FOR_V$). For example, a certain scan pattern may have a field of regard represented by angular dimensions (e.g., $FOR_H \times FOR_V$) 40°×30°, 90°×40°, or 60°×15°. While FIG. 6 depicts a "zig-zag" pattern 360, other implementations may instead employ other patterns (e.g., parallel, horizontal scan lines), and/or other patterns may be employed in specific circumstances.

In the example implementation and/or scenario of FIG. 6, reference line 362 represents a center of the field of regard of scan pattern 360. In FIG. 6, if the scan pattern 360 has a 60°×15° field of regard, then the scan pattern 360 covers a ±30° horizontal range with respect to reference line 362 and a ±7.5° vertical range with respect to reference line 362. An azimuth (which may be referred to as an azimuth angle) may represent a horizontal angle with respect to the reference line 362, and an altitude (which may be referred to as an altitude angle, elevation, or elevation angle) may represent a vertical angle with respect to the reference line 362.

The scan pattern 360 may include multiple points or pixels 364, and each pixel 364 may be associated with one or more laser pulses and one or more corresponding distance measurements. A cycle of scan pattern 360 may include a total of $P_x \times P_y$ pixels 364 (e.g., a two-dimensional distribution of $P_x$ by $P_y$ pixels). The number of pixels 364 along a horizontal direction may be referred to as a horizontal resolution of the scan pattern 360, and the number of pixels 364 along a vertical direction may be referred to as a vertical resolution of the scan pattern 360.

Each pixel 364 may be associated with a distance (e.g., a distance to a portion of a target 330 from which the corresponding laser pulse was scattered) or one or more angular values. As an example, the pixel 364 may be associated with a distance value and two angular values (e.g., an azimuth and altitude) that represent the angular location of the pixel 364 with respect to the lidar system 300. A distance to a portion of the target 330 may be determined based at least in part on a time-of-flight measurement for a corresponding pulse. An angular value (e.g., an azimuth or altitude) may correspond to an angle (e.g., relative to reference line 362) of the output beam 325 (e.g., when a corresponding pulse is emitted from lidar system 300) or an angle of the input beam 335 (e.g., when an input signal is received by lidar system 300). In some implementations, the lidar system 300 determines an angular value based at least in part on a position of a component of the scanner 320. For example, an azimuth or altitude value associated with the pixel 364 may be determined from an angular position of one or more corresponding scanning mirrors of the scanner 320.

FIG. 7A illustrates an example vehicle 400 with a lidar system 402. The lidar system 402 includes a laser 410 with multiple sensor heads 412A-D coupled to the laser 410 via multiple laser-sensor links 414. Each of the sensor heads 412 may include some or all of the components of the lidar system 300 illustrated in FIG. 5.

Each of the laser-sensor links 414 may include one or more optical links and/or one or more electrical links. The sensor heads 412 in FIG. 7A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 412 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 7A, four sensor heads 412 are positioned at or near the four corners of the vehicle (e.g., each of the sensor heads 412 may be incorporated into a light assembly, side panel, bumper, or fender), and the laser 410 may be located within the vehicle 400 (e.g., in or near the trunk). The four sensor heads 412 may each provide a 90° to 120° horizontal field of regard (FOR), and the four sensor heads 412 may be oriented so that together they provide a complete 360-degree view around the vehicle. As another example, the lidar system 402 may include six sensor heads 412 positioned on or around the vehicle 400, where each of the sensor heads 412 provides a 60° to 90° horizontal FOR. As another example, the lidar system 402 may include eight sensor heads 412, and each of the sensor heads 412 may provide a 45° to 60° horizontal FOR. As yet another example, the lidar system 402 may include six sensor heads 412, where each of the sensor heads 412 provides a 70° horizontal FOR with an overlap between adjacent FORs of approximately 10°. As another example, the lidar system 402 may include two sensor heads 412 which together provide a forward-facing horizontal FOR of greater than or equal to 30°.

Data from each of the sensor heads 412 may be combined or stitched together to generate a point cloud that covers a greater than or equal to 30-degree horizontal view around a vehicle. For example, the laser 410 may include a controller or processor that receives data from each of the sensor heads 412 (e.g., via a corresponding electrical link 420) and processes the received data to construct a point cloud covering a 360-degree horizontal view around a vehicle or to determine distances to one or more targets. The point cloud or information from the point cloud may be provided to a vehicle controller 422 via a corresponding electrical, optical, or radio link 420. The vehicle controller 422 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 412 at a controller included within the laser 410, and is provided to the vehicle controller 422. In other implementations, each of the sensor heads 412 includes a controller or processor that constructs a point cloud for a portion of the 360-degree horizontal view around the vehicle and provides the respective point cloud to the vehicle controller 422. The vehicle controller 422 then combines or stitches together the points clouds from the respective sensor heads 412 to construct a combined point cloud covering a 360-degree horizontal view. Still further, the vehicle controller 422 in some implementations communicates with a remote server to process point cloud data.

In any event, the vehicle 400 may be an autonomous vehicle where the vehicle controller 422 provides control signals to various components 430 within the vehicle 450 to maneuver and otherwise control operation of the vehicle 450. The components 430 are depicted in an expanded view in FIG. 7A for ease of illustration only. The components 430 may include an accelerator 440, brakes 442, a vehicle engine 444, a steering mechanism 446, lights 448 such as brake lights, head lights, reverse lights, emergency lights, turn signals, etc., a gear selector 450, and/or other suitable components that effectuate and control movement, signaling, or operation of the vehicle 400. The gear selector 450 may include the park, reverse, neutral, drive gears, etc. Each of the components 430 may include an interface via which the component receives commands from the vehicle controller 422 such as "increase speed," "decrease speed," "turn left 5 degrees," "activate left turn signal," etc. and, in some cases, provides feedback to the vehicle controller 422.

In some implementations, the vehicle controller 422 receives point cloud data from the sensor heads 412 via the link 420 and analyzes the received point cloud data, using any one or more of the aggregate or individual SDCAs disclosed herein, to sense or identify targets 330 (see FIG. 5) and their respective locations, distances, speeds, shapes, sizes, type of target (e.g., vehicle, human, tree, animal), etc. The vehicle controller 422 then provides control signals via the link 420 to the components 430 to control operation of the vehicle based on the analyzed information. One, some or all of the components 430 may be the operational subsystems, or may be included within the operational subsystems, that receive the control signals 110 of any one of FIGS. 1-3, or receive the decisions 242 of FIG. 4, for example.

In addition to the lidar system 402, the vehicle 400 may also be equipped with other sensors such a camera, a thermal imager, a conventional radar (none illustrated to avoid clutter), etc. The sensors can provide additional data to the vehicle controller 422 via wired or wireless communication links. Further, the vehicle 400 in an example implementation includes a microphone array operating as a part of an acoustic source localization system configured to determine sources of sounds.

Figure 7B:
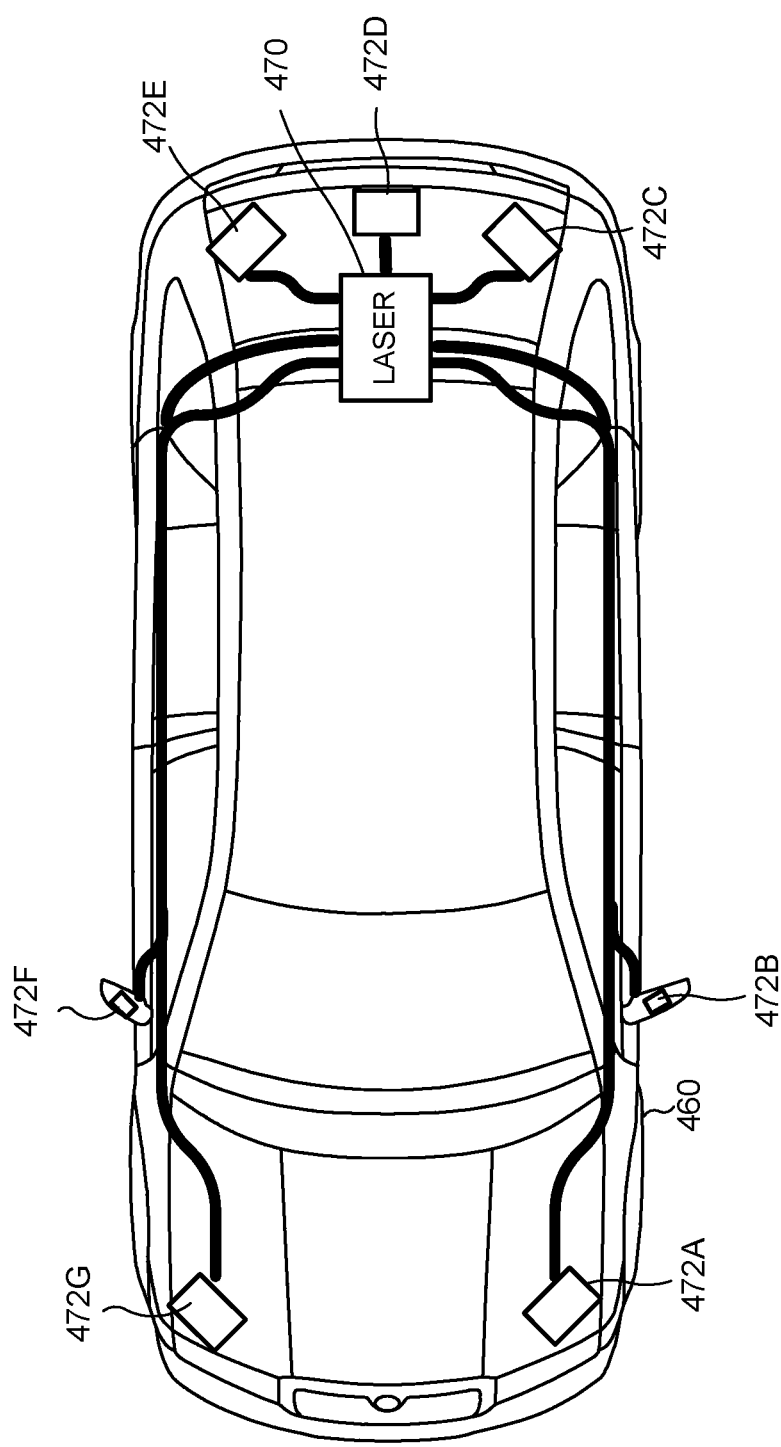
FIG. 7B illustrates another example vehicle in which the lidar system of FIG. 5 may operate.

As another example, FIG. 7B illustrates a vehicle 460 in which a laser 470 is optically coupled to six sensor heads 472, each of which may be similar to one of the sensor heads 412 of FIG. 7A. The sensor heads 472A and 472G are disposed at the front of the hood, the sensor heads 472B and 472F are disposed in the side view mirrors, and the sensor heads 472C-E are disposed on the trunk. In particular, the sensor head 472D is oriented to face backward relative to the orientation of the vehicle 460, and the sensor heads 472C-E are oriented at approximately 45 degrees relative to the axis of orientation of the sensor head 472D.

Figure 8A:
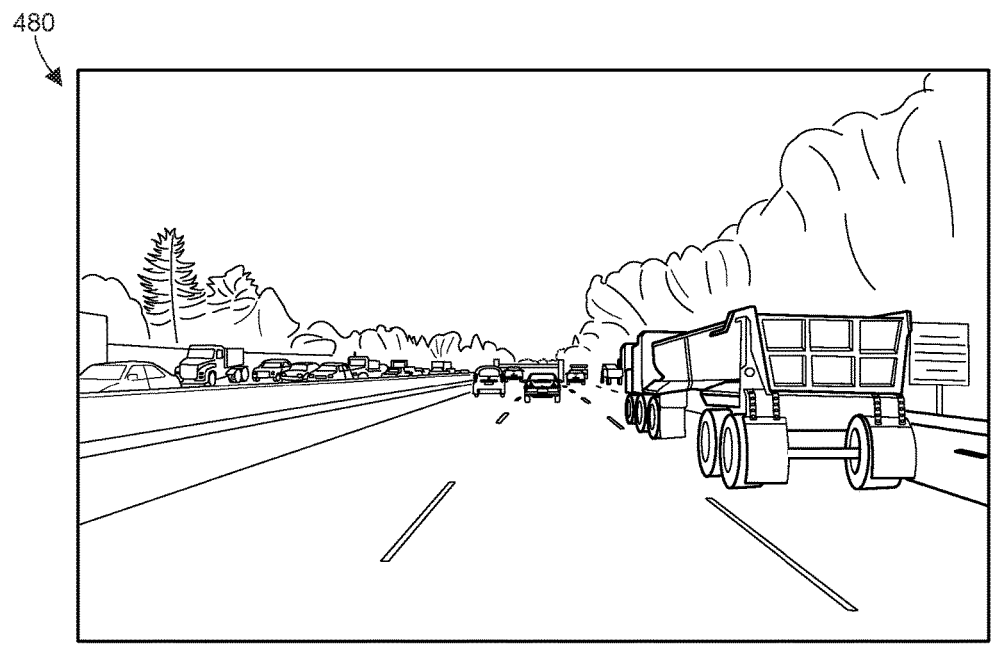
FIG. 8A illustrates an example environment in the direction of travel of an autonomous vehicle.
Figure 8B:
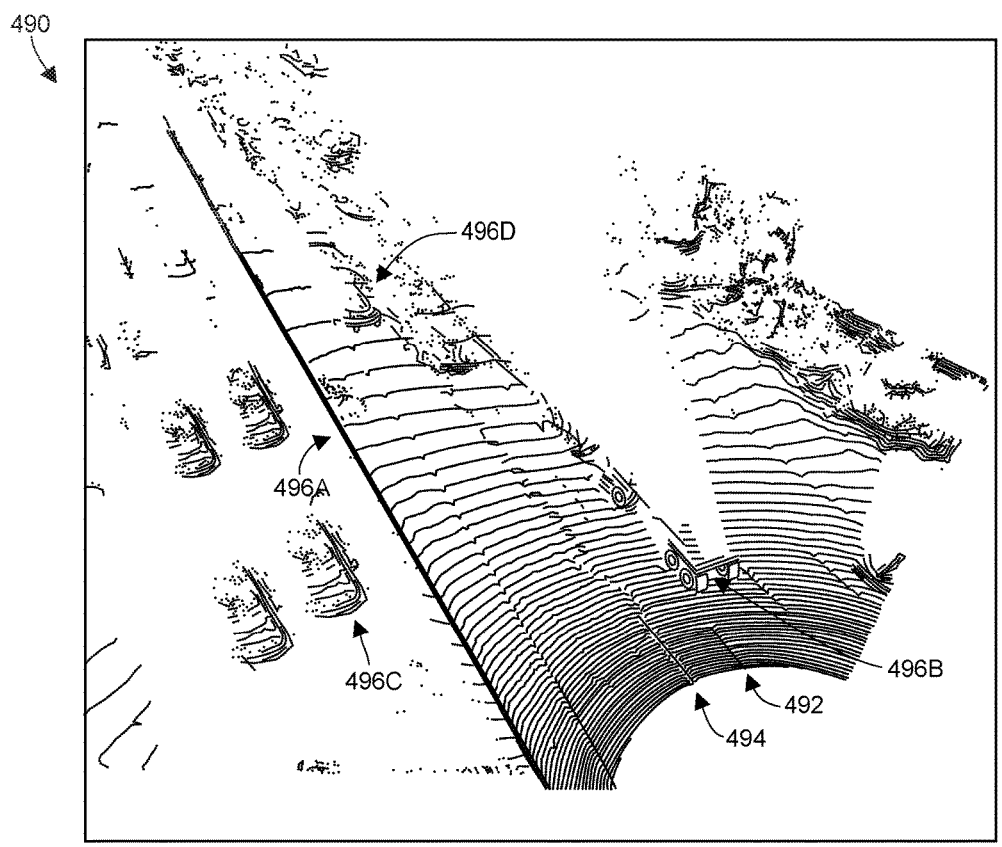
FIG. 8B illustrates an example point cloud that may be generated for the environment of FIG. 8A.

FIG. 8A depicts an example real-world driving environment 480, and FIG. 8B depicts an example point cloud 490 that is generated by a lidar system scanning the environment 480 (e.g., the lidar system 300 of FIGS. 5 and 6 or the lidar system 402 of FIG. 7A). As seen in FIG. 8A, the environment 480 includes a highway with a median wall that divides the two directions of traffic, with multiple lanes in each direction. The point cloud 490 of FIG. 8B corresponds to an example embodiment in which two lidar devices each capture a roughly 60 degree horizontal field of regard, and in which the two fields of regard have a small overlap 492 (e.g., two or three degrees of overlap). The point cloud 490 may have been generated using the sensor heads 412A and 412D of FIG. 7A, or the sensor heads 472A and 472G of FIG. 7B, for example. While depicted as a visual image in FIG. 8B, it is understood that, in some embodiments, the point cloud 490 is not actually rendered or displayed at any time.

As seen in FIG. 8B, the point cloud 490 depicts a ground plane 494 (here, the road surface) as a number of substantially continuous scan lines, and also depicts, above the ground plane 494, a number of objects 496. For clarity, only a small number of the objects shown in FIG. 8B are labeled with a reference number. Referring back to FIG. 4, distinct ones of the objects 494 within the point cloud 490 may be identified by the segmentation module 210. For example, the segmentation module 210 may detect substantial gaps and/or other discontinuities in the scan lines of the ground plane 494, and identify groups of points in the vicinity of those discontinuities as discrete objects. The segmentation module 210 may determine which points belong to the same object using any suitable rules, algorithms or models. Once the objects 494 are identified, the classification module 212 may attempt to classify the objects, and the tracking module 214 may attempt to track the classified objects (and, in some embodiments/scenarios, unclassified objects) across future point clouds similar to point cloud 490 (i.e., across multiple point cloud frames).

For various reasons, it may be more difficult for the segmentation module 210 to identify certain objects 496, and/or for the classification module 212 to classify certain objects 496, within the point cloud 490. As can also be seen in FIG. 8B, for example, a median wall 496A may be relativity easy to identify and classify due to the high density of points as well as the "shadow" (i.e., absence or relative scarcity of points) that the wall 496A creates. A truck 496B may also be relatively easy to identify as an object, due to the high density of points (and possibly the shape of its shadow), but may not be as easy to classify due to the fact that large portions of the truck 496B are hidden within the lidar shadow. The vehicle 496C may be relatively easy to identify as an object, but more difficult to classify due to the lack of points within the lidar shadow created by the median wall 496A (i.e., along the lower portions of the vehicle 496C). The vehicle 496D may be more difficult to identify as a distinct object due to the scarcity of points at the greater distance from the autonomous vehicle, as well as the close proximity between the points corresponding to the vehicle 496D and points of other, nearby objects. Still other objects may be difficult to identify, classify and/or track due to their small size and/or low profile and/or their distance away from the lidar system. For example, while not shown in FIG. 8B, the segmentation module 210 may identify (and the classification module 212 may classify) lane markings within the point cloud 490. The lane markings may appear as small but abrupt deviations in the path of the scan lines, for example, with those deviations collectively forming a line pattern that aligns with the direction of travel of the autonomous vehicle (e.g., approximately normal to the curve of the scan lines). The lane markings may be classified according to type (e.g., broken white line, broken yellow line, solid yellow line, double solid yellow line, etc.).

Despite such difficulties, the segmentation module 210, classification module 212 and/or tracking module 214 may use techniques that make object identification, classification and/or tracking highly accurate across a very wide range of scenarios, with scarce or otherwise suboptimal point cloud representations of objects. For example, as discussed above in connection with FIG. 4, the segmentation module 210, classification module 212 and/or tracking module 214 may include neural networks that were trained using data (e.g., manually labeled scenes) corresponding to a very large number of diverse environments/scenarios (e.g., with various types of objects at different distances, in different orientations, with different degrees of concealment, in different weather and/or lighting conditions, and so on).

Example Learning Based Self-Driving Control Architecture

Whereas a somewhat generalized SDCA 200 was described above with reference to FIG. 4, FIG. 9 illustrates an example SDCA 500 that utilizes a specific type of learning based motion planner, i.e., a reinforcement learning motion planner. The SDCA 500 may be utilized as one of the SDCAs 104 in the aggregate SDCA 100, 120 or 140 of FIG. 1, 2 or 3, respectively, as a stand-alone SDCA, or in another suitable software architecture.

Figure 9:
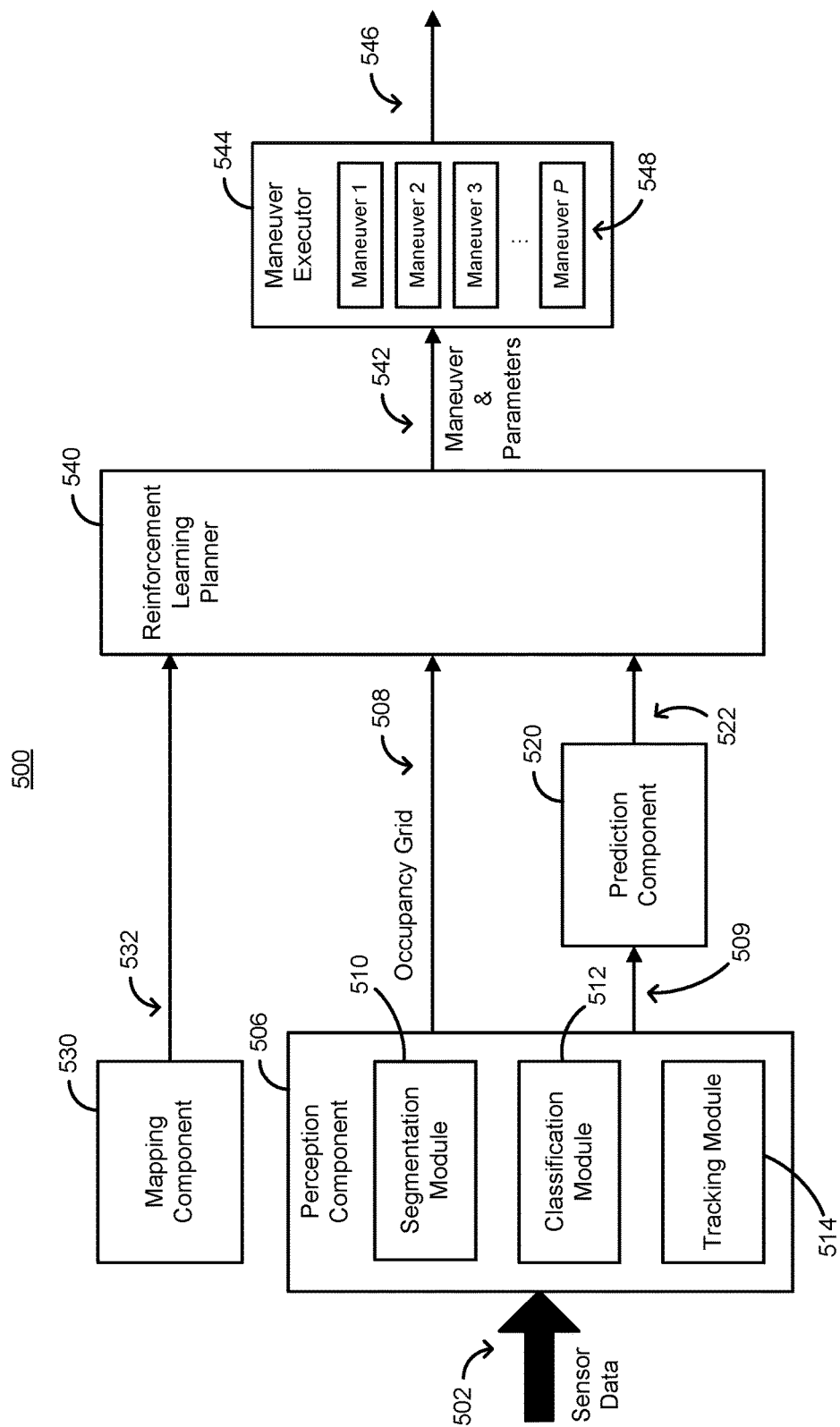
FIG. 9 is a block diagram of an example self-driving control architecture using a motion planner that is trained with reinforcement learning.

The sensor data 502, perception component 506 (with segmentation module 510, classification module 512, and tracking module 514), prediction component 520, mapping component 530, and/or mapping and navigation signals 532 of FIG. 9 may be the same as, or similar to, the perception component 206 (with segmentation module 210, classification module 212, and tracking module 214), prediction component 220, mapping component 230, and/or mapping and navigation signals 232, respectively, described above in connection with FIG. 4.

In the example SDCA 500, however, the perception component 506 may output a certain kind of data within perception signals 508. In particular, the perception signals 508 may include an "occupancy grid" having states or frames that are updated by the perception component 506 over time (e.g., periodically, such as every 0.1 seconds, or every 0.5 seconds, etc.). The occupancy grid may generally indicate which grid cells are currently occupied in a two-dimensional (e.g., overhead) representation of an environment through which the autonomous vehicle is moving, thereby providing a snapshot of the positions of other objects relative to the autonomous vehicle. The occupancy grid may cover an area that does not exceed the range of at least one sensor (e.g., lidar device and/or camera) of the autonomous vehicle. The resolution, or real-world distance represented by a single cell, of the occupancy grid may vary depending on the embodiment (and possibly also based on the scenario). In one embodiment, for example, the occupancy grid represents roughly a 200 m×200 m area, with each cell representing roughly a 0.5 m×0.5 m area such that the grid includes 160,000 cells. The occupancy grid may be centered on the autonomous vehicle, or may be offset (e.g., starting immediately in front of the autonomous vehicle, or 1 m in front, etc.), for example.

In some embodiments, the occupancy grid can include data that represents more than just the presence or absence of objects. For example, each cell may be associated with one or more values. One such value may correspond to a classification (determined by classification module 512). If a cell is within an area of the occupancy grid that corresponds to an object that has been classified as a pedestrian, for example, the cell (and all other cells corresponding to that same pedestrian) may be associated with the class "pedestrian." In some embodiments, each such cell is associated with data that uniquely identifies a particular instance within the determined class (e.g., the data string "PED01" to uniquely identify a specific pedestrian within the sensed environment). Cells for which no classification was obtained, and/or cells that do not include any identified object (e.g., due to a low density of points in a particular area of a lidar point cloud), may have special indicators, such as "CLASS?" or "N/A," for example.

In addition, or alternatively, each cell may be associated with a value indicating a height or elevation of the object (e.g., above the level of the road directly beneath the autonomous vehicle, or relative to another reference height). In some embodiments, a single cell of the occupation grid may be associated with multiple objects/classes/heights, to account for scenarios in which there is an overlap of objects relative to the overhead view.

Figure 10:
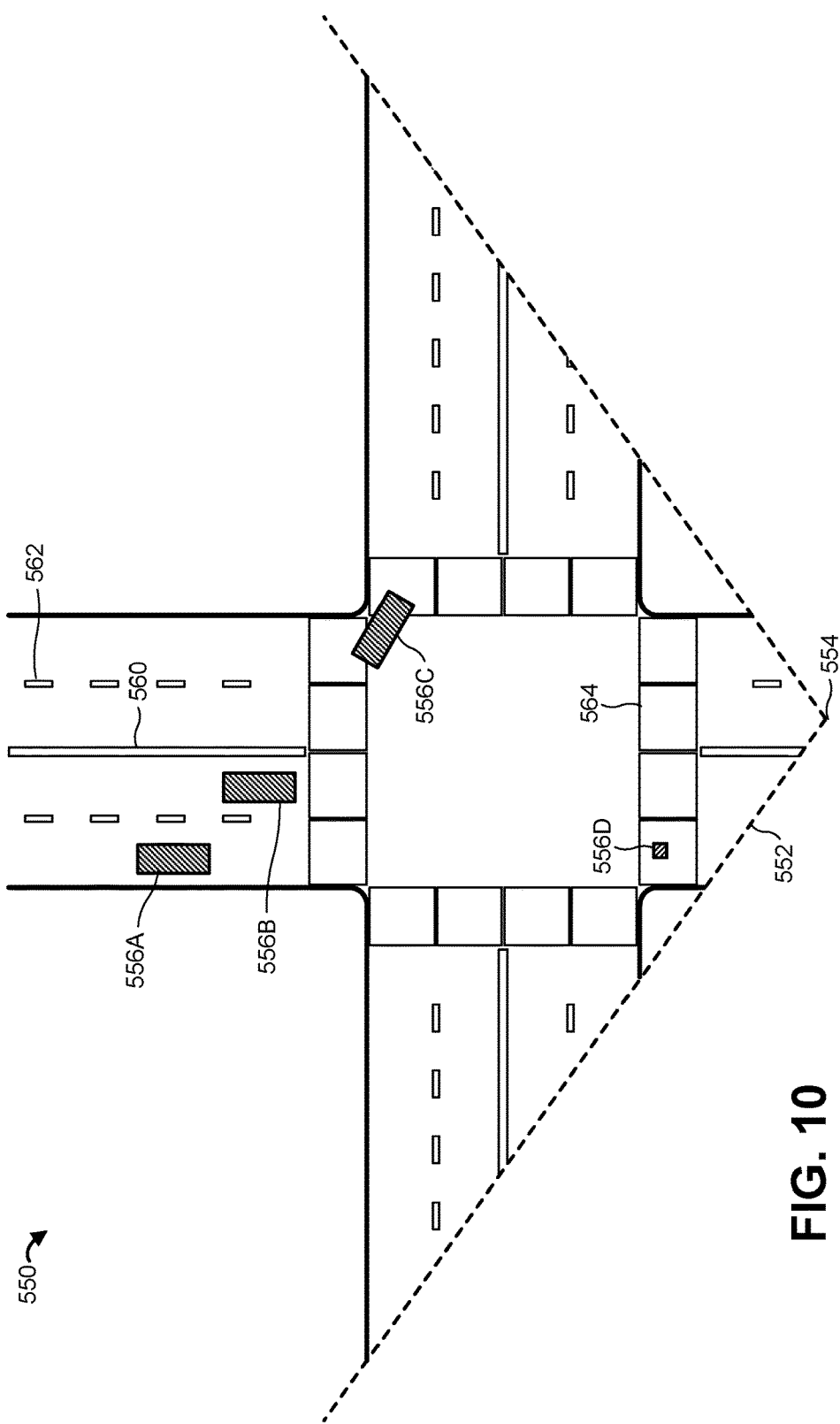
FIG. 10 illustrates an example occupancy grid that may be generated by the perception component of FIG. 9.

An example embodiment and scenario of an occupancy grid 550 that may be generated by the perception component 506 is shown in FIG. 10. While depicted as a visual image in FIG. 10, it is understood that, in some embodiments, the occupancy grid 550 is not actually rendered or displayed at any time. The occupancy grid 550 of FIG. 10 corresponds to an embodiment in which the physical area represented by the occupancy grid 550 (i.e., the area within a particular azimuthal angle and partially bounded by the dashed lines 552) is coextensive with at least the horizontal field of regard of one or more sensors of the autonomous vehicle, with the sensor(s) and autonomous vehicle currently being positioned at location 554. In other embodiments, however, the area represented by the occupancy grid 550 is smaller than, or otherwise not coextensive with, the field of regard. Moreover, in some embodiments, the perimeter of the occupancy grid 550 may be a rectangle, circle, or other shape that encompasses the current location 554 of the autonomous vehicle (e.g., with the location 554 being at the center of the rectangle or circle).

In the example scenario of FIG. 10, the occupancy grid 550 includes (i.e., includes representations of) a number of objects, and areas associated with objects, including: a road 555, dynamic objects 556A-D (i.e., vehicles 556A-C and a pedestrian 556D), lane markings 560, 562, and traffic light areas 564. The example occupancy grid 550 may include data representing each of the object/area positions, as well as data representing the object/area types (e.g., including classification data that is generated by, or is derived from data generated by, the classification module 512).

Object classes/types may be indicated at a relatively high level of generality (e.g., with each of objects 556A-C having the class "vehicle," each of objects 560, 562 having the class "lane marker," etc.), or with more specificity (e.g., with object 556A having the class "sport utility vehicle" and object 556B having the class "sedan," and/or with objects 560 having the class "lane marker: solid" and objects 562 having the class "lane marker: dashed," etc.). Globally or locally unique identifiers may also be specified by the occupancy grid 550 (e.g., "VEH001" through "VEH003" for vehicles 556A through 556C, respectively, and "PED001" for pedestrian 556D, etc.). Depending on the embodiment, the occupancy grid 550 may also be associated with state data, such as a current direction and/or speed of some or all depicted objects. In other embodiments, however, the state of each object or area is not embedded in the occupancy grid 550, and the occupancy grid 550 only includes data representing a stateless snapshot in time. For example, the prediction component 520 may infer the speed, direction, and/or other state parameters of dynamic objects using the unique identifiers of specific objects, and the change in the positions of those objects within a succession of occupancy grids over time.

In some embodiments, the occupancy grid 550 only associates certain types of objects and/or types of areas with current states. For each of the 16 different traffic light areas 564 (e.g., each corresponding to an area in which vehicles are expected to stop when the light is red), for example, the traffic occupancy grid 550 may include not only data specifying the location of the traffic light position 564, but also data indicating whether the traffic light associated with that area 564 is currently red, yellow or green (or possibly whether the traffic light is blinking, an arrow versus a circle, etc.).

Referring again to FIG. 9, the perception component 506 generates perception signals 509 that are provided to the prediction component 520. In some embodiments, the perception signals 509 are the same as the perception signals 508, or at least include data representing the same occupancy grid as the signals 508. In other embodiments, however, the prediction component 520 operates on inputs that do not include occupancy grids.

The prediction component 520 outputs prediction signals 522, which in some embodiments include predicted/expected occupancy grids corresponding to one or more future times (e.g., one grid corresponding to 3 seconds in the future, or three grids corresponding to 1, 2, and 5 seconds in the future, etc.). The prediction component 520 may predict object positions for the future occupancy grid(s) using any of the techniques discussed above in connection with the prediction component 220 of FIG. 4, for example (e.g., assuming that moving objects continue to travel at the current speed and direction, taking into account first- or higher-order derivatives, predicting object movement based on more complex/expected behaviors of particular object classes, etc.).

In the SDCA 500, a motion planner 540 processes the perception signals 508 (i.e., including the occupancy grid at time t0), the prediction signals 522 (possibly including one or more future occupancy grids at times t1, t2, t3, etc.), and the mapping and navigation signals 532 to generate decisions 542 that comprise vehicle maneuvers, and possibly also various parameters indicative of how those maneuvers are to be executed. At a given time, for example, the motion planner 540 may output data indicating the maneuver "move left one lane" along with parameters indicating a time limit for executing the maneuver, and/or whether to pull ahead of or behind a vehicle currently in the left lane, etc. Alternatively, or in addition, the parameters may be indicative of other characteristics of the maneuver, such as how much speed is to be attained before changing the direction of the autonomous vehicle, etc. As discussed further below, the motion planner 540 is trained using reinforcement learning.

The decisions 542 may be input to a maneuver executor 544. The maneuver executor 544 may determine a particular sequence of operational parameters (e.g., speed, braking, direction) over a certain span of time to execute the maneuver selected by the motion planner 540, with the operational parameters being provided as control signals 546 to the appropriate operational subsystems of the autonomous vehicle (e.g., accelerator 440, brakes 442, and steering mechanism 446 of FIG. 7A), or to a decision arbiter or other intermediate stage (e.g., in an aggregate SDCA, such as one of those shown in FIGS. 1-3). In some embodiments, the maneuver executor 544 includes a number of modules 548, each of which determines operational parameter sequences for a different maneuver. For example, the motion planner 540 may be able to choose from among P (e.g., 50, 100, 1000, etc.) maneuvers, and the maneuver executor may include P corresponding modules 548.

Each of the modules 548, or the maneuver executor 544 generally, may determine the appropriate sequence of operational parameters for a given maneuver in any suitable manner. For example, complex rules, algorithms or heuristic models may be used to determine the appropriate sequence for a given maneuver, where the rules, algorithms, etc. are conditioned on the parameters from the motion planner 540. In other embodiments, and as discussed further below, the individual modules 548, or the maneuver executor 544 generally, may implement other techniques, e.g., by including a suitable machine learning model.

As noted above and shown in FIG. 9, the motion planner 540 of the SDCA 500 may have been trained using reinforcement learning. With reinforcement learning, at each of a number of different times (e.g., periodically, or on another suitable time basis), the motion planner 540 observes the state of the vehicle environment, decides to take an action (e.g., a particular maneuver), and potentially receives or recognizes a reward based on results of that action. The motion planner 540 may seek to learn a mapping of states to actions (e.g., a mapping of environments to maneuvers) that maximizes the rewards over some suitable time interval or intervals.

The state at any given time may be represented by the occupancy grid in the perception signals 508 (and possibly, in some embodiments, by one or more future occupancy grids in the prediction signals 522), as well as the mapping and navigation signals 532. Thus, the state space can be very large, and may in some embodiments be treated as a continuous state space. The action space, representing potential actions/decisions by the motion planner 540, may correspond to the finite number P of discrete maneuvers from which the motion planner 540 can make a selection. In various embodiments, the associated maneuver parameters may or may not be accounted for in the action space. If the parameters are accounted for, the action space may likewise be treated as a continuous space.

To accomplish the training, learning parameters may be manually set to define a number of positive/desired results/ goals, and a number of associated rewards. The positive results may be defined by a developer as any specific, suitable outcomes related to near-term or long-term driving goals, such as avoiding safety violations (e.g., crashing), achieving certain metrics (e.g., having an average or maximum G-force below a predefined threshold), and so on. In general, the reward that is defined for a particular result may determine how heavily that result is weighed in the training process. For a given set of learning parameters, the training data may include environment state data (e.g., occupancy grid(s), navigation data, etc.) that corresponds to a virtual autonomous vehicle moving through a large number of different, virtual environments, with a reward being indicated/provided (or not indicated/provided) based on whether the results defined by the learning parameters are achieved by the motion planner 540 in specific simulated scenarios. In other embodiments, the training data instead, or also, includes real-world data, e.g., generated by a real-world autonomous vehicle that includes the motion planner 540. In either case, the training process generally causes the motion planner 540 to learn to make decisions that maximize its rewards.

In some embodiments, each of the modules 548, or the maneuver executor 544 generally, may likewise include a neural network that is trained using reinforcement learning. Similar to the motion planner 540, the modules 548, or maneuver executor 542 generally, may be trained by defining learning parameters (e.g., goals and rewards), and simulated and/or real training data. The positive results and rewards may, in some embodiments, be defined differently than the results and rewards used in the training of the motion planner 540. For example, the positive results defined for training the individual modules 548 or the entire maneuver executor 544 may be at a lower level than the positive results defined for training the motion planner 540. As just one example, one result for the motion planner 540 may be avoiding a crash with another vehicle over some time window, while a result for a specific one of modules 548 may be avoiding excessive G-forces (e.g., avoiding a maximum G-force over some threshold) during a particular lane shift.

In other embodiments, the maneuver executor 544 may use other suitable techniques. For example, either the individual modules 548, or the maneuver executor 544 generally, may utilize model predictive control (MPC) to execute the maneuvers indicated by the motion planner. In such an embodiment, the individual modules 548 or the maneuver executor 544 may solve an objective equation that is defined by the desired maneuver, with different terms of the equation corresponding to various driving goals (e.g., maintaining a minimum distance to other vehicles, avoiding G-forces over a certain level, etc.).

Example Search Based Self-Driving Control Architecture

Figure 11:
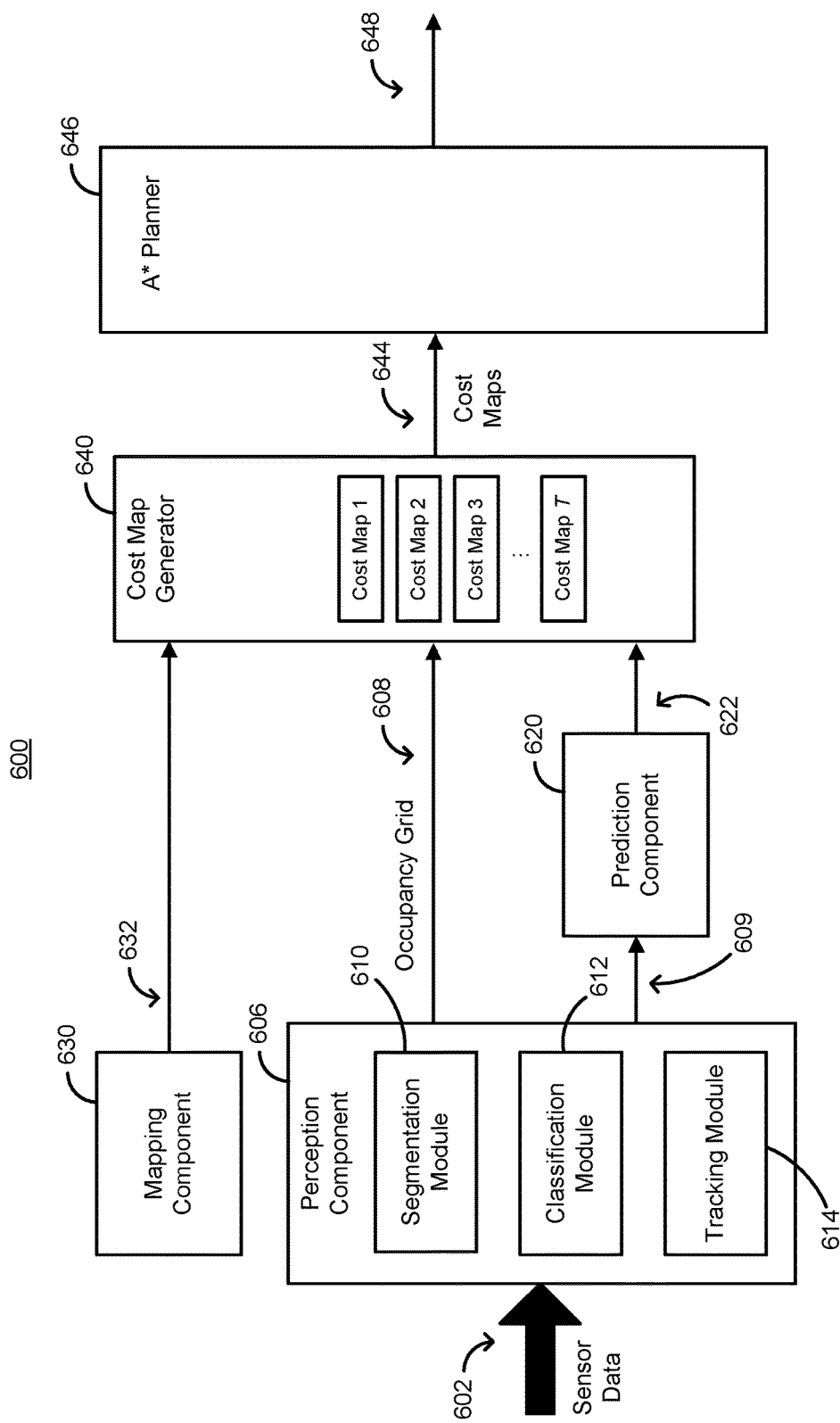
FIG. 11 is a block diagram of an example self-driving control architecture using an A* motion planner.

FIG. 11 illustrates an example SDCA 600 that utilizes a specific type of search based motion planner, i.e., an A* motion planner. The SDCA 600 may be utilized as one of the SDCAs 104 in the aggregate SDCA 100, 120 or 140 of FIG. 1, 2 or 3, respectively, as a stand-alone SDCA, or in another suitable software architecture.

The sensor data 602, perception component 606 (with segmentation module 610, classification module 612, and tracking module 614), prediction component 620, mapping component 630, and/or mapping and navigation signals 632 of FIG. 11 may be the same as, or similar to, the perception component 206 (with segmentation module 210, classification module 212, and tracking module 214), prediction component 220, mapping component 230, and/or mapping and navigation signals 232, respectively, described above in connection with FIG. 4. Moreover, the perception signals 608, 609 and prediction signals 622 of FIG. 11 may be similar to the perception signals 508, 509 and prediction signals 522 discussed above in connection with FIG. 9 (e.g., including current and future occupancy grids).

In the example SDCA 600, however, the occupancy grids of the perception signals 608 and prediction signals 622 are processed by a cost map generator 640 that outputs cost maps 644. Each cost map may in some respects be similar to an occupancy grid, e.g., an overhead view, two-dimensional representation of the environment of the autonomous vehicle. For example, each cost map may comprise a grid of "cells" that correspond to the cells of the occupancy grid(s).

Unlike occupancy grids, however, the cells of a cost map may specify numerical values representing a "cost" of the autonomous vehicle occupying certain positions at a given point in time. A higher cost may correspond to a less desirable (e.g., riskier) location for the vehicle to be in. If another vehicle is immediately in front of the autonomous vehicle, for example, cells of a current cost map that are immediately behind the leading vehicle may be associated with a high cost, while cells that trail the leading vehicle by a larger distance may be associated with lower costs. The cost map generator 640 may determine costs per cell based on the proximity of the cell to an object (e.g., an object identified by the segmentation module 610 and depicted in the current occupancy grid), the class or label for the object (e.g., a class determined by the classification module 612 and specified in the current occupancy grid), the current speed and direction of the object (e.g., as determined using the output of the tracking module 614), current operational parameters of the autonomous vehicle (e.g., speed and direction), and/or one or more other factors. In the "leading vehicle" scenario above, for instance, costs associated with cells between the autonomous vehicle and the leading vehicle may be determined based on the fact that the leading object is in fact a vehicle (e.g., is likely within a certain range of weights, is likely capable of certain behaviors, etc.), the proximity of the cell to the leading vehicle, the current speed and direction of both the autonomous vehicle and the leading vehicle, and so on. The cost map generator 640 may generate costs based at least in part on a dataset of human drivers. The dataset may be determined from the driving behavior of human drivers (e.g., costs may be determined from decisions made by human drivers during real or simulated driving trips) and/or may include information about the location of vehicles while they are being driven by human drivers. For example, a vehicle is generally located within a lane of a road and is generally not located in a bicycle lane, median, crosswalk, or on a sidewalk. Based on location information determined from a dataset of human drivers, areas within a lane may be assigned a relatively low cost, and areas where cars are generally not located may be assigned a relatively high cost.

Figure 12:
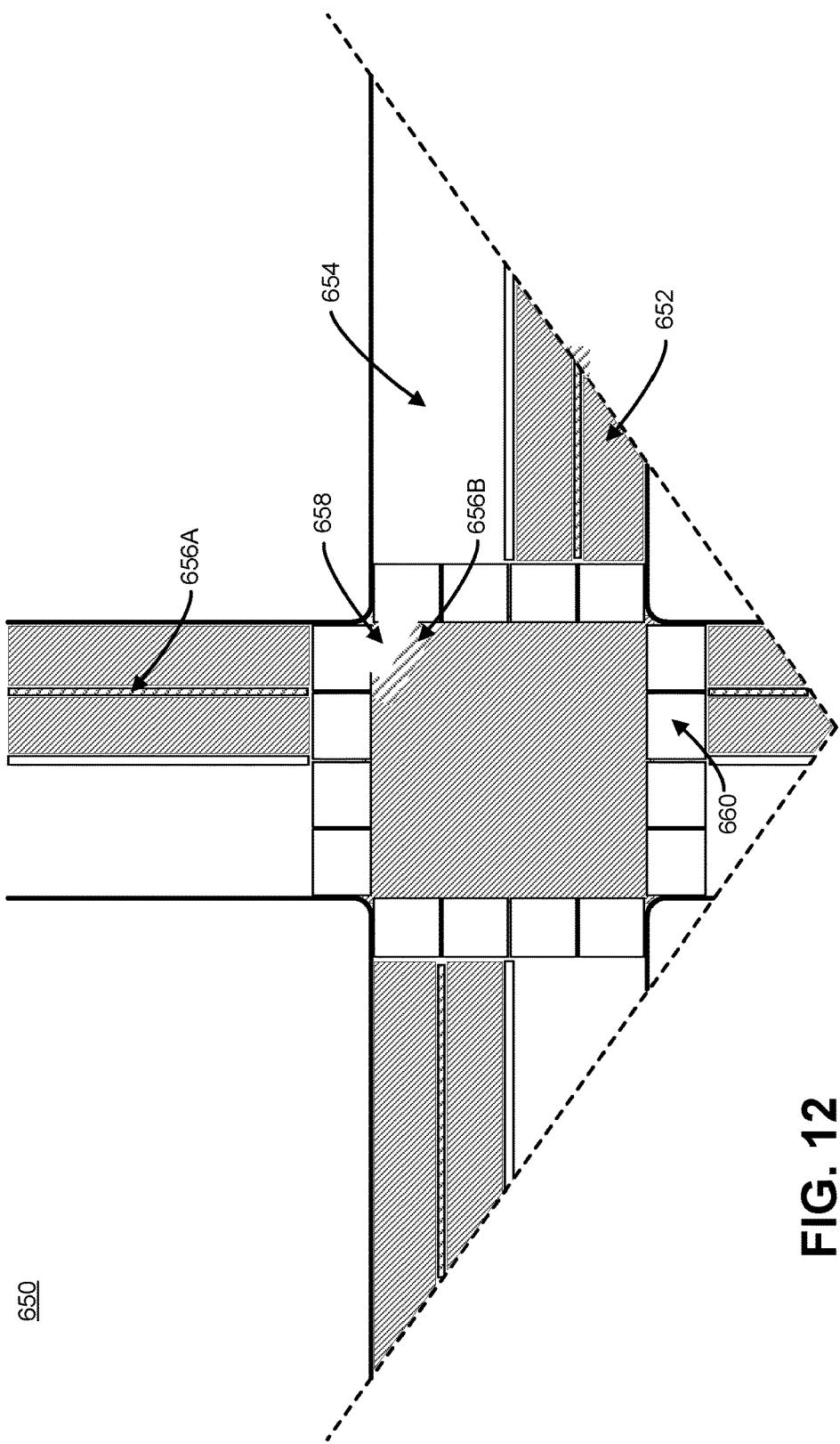
FIG. 12 illustrates an example cost map that may be generated by the cost map generator of FIG. 11 for the environment of FIG. 10.

One example cost map 650 that may be generated by the cost map generator 640 is shown in FIG. 12. The cost map 650 of FIG. 12 corresponds to the environment represented by the occupancy grid 550 of FIG. 10, and the cost map generator 640 may have generated the cost map 650 based at least in part on the occupancy grid 550. While depicted as a visual image in FIG. 12, it is understood that, in some embodiments, the cost map 650 is not actually rendered or displayed at any time.

Within the example cost map 650, heavily shaded areas 652 (i.e., areas filled with more closely spaced slanted lines) have a relatively low cost, non-shaded areas 654 have a relatively high cost, and medium-shaded areas 656 (i.e., areas filled with sparser slanted lines) have an intermediate cost. While FIG. 12 only shows three discrete cost levels for different areas for ease of explanation, it is understood that many more cost levels may be applied within a single cost map. For example, each "pixel" of the cost map 650 may be associated with its own cost level that is selected from among a virtually continuous range (e.g., 256 cost levels corresponding to 256 greyscale values, etc.).

In the simplified example of FIG. 12, lanes corresponding to the autonomous vehicle's current direction of travel (or potential direction of travel, after a single, 90-degree right or left turn) can be seen to generally have a much lower cost than lanes corresponding to the opposite direction of travel (i.e., where the autonomous vehicle would be driving straight into oncoming traffic). Moreover, the lane divider within a single direction of travel (e.g., at area 656A) may have a higher cost than the lanes on either side of the divider, but may not have a cost so high as to prevent all lane switching. The cost for locations within a lane in which the autonomous vehicle is traveling may vary across the lane (e.g., in a linear, exponential, Gaussian, or parabolic manner) so that the cost is low in the center of the lane and increases towards the edges of the lane. Areas in which other objects reside (e.g., the vehicle at area 658, which corresponds to the vehicle 556C in the occupancy grid 550 of FIG. 10) may have a very high cost to prevent collisions, with associated areas of gradually decreasing costs around the objects (e.g., the area 656B) to reflect the gradually decreasing risk of collision. The size of this "halo" around a given object, and the cost(s) associated therewith, may depend on the classification of the object (e.g., vehicle, pedestrian, infrastructure, etc.), current direction/speed/etc. of the autonomous vehicle, and/or other factors, in some embodiments. Some areas of the cost map 650 may have costs that change with time based, for example, on the presence of a pedestrian in a crosswalk, on the presence of an object in an adjacent lane, or on the state of one or more traffic signals. For example, some or all of a number of traffic signal areas 660 may change from low cost to high cost (and vice versa) based on the current state of respective traffic signals. FIG. 12 represents a scenario in which the stop light in front of (and facing) the autonomous vehicle is red, thereby causing the area 660 in front of the vehicle to have a cost that is high enough to force the autonomous vehicle to stop before entering the intersection (possibly with exceptions for certain emergency situations that could override the high cost). The cost of a crosswalk may depend on the type of crosswalk and whether other objects or pedestrians are located nearby. For example, a crosswalk with a stop sign may have a relatively high cost as the autonomous vehicle approaches the crosswalk. After the autonomous vehicle stops at the stop sign, the cost of the crosswalk may be reduced so that the autonomous vehicle may proceed. As another example, if a pedestrian is located in or near a crosswalk, the cost of the crosswalk may be assigned a relatively high value until the crosswalk is free of pedestrians. As another example, an adjacent lane (e.g., a yield lane) may have a relatively high cost if a vehicle is located in that lane, and the cost may be reduced when the vehicle moves ahead of or behind the autonomous vehicle.

Referring again now to FIG. 11, the cost map generator 640 may generate a current cost map ("Cost Map 1" in FIG. 11) as well as a number of future/predicted cost maps ("Cost Map 2" through "Cost Map T" in FIG. 11, with T being any suitable integer greater than one). In some embodiments, each cost map corresponds to a particular, different one of the occupancy grids. If the perception signals 608 include a current occupancy grid corresponding to the time t0, and if prediction signals 622 include future occupancy grids corresponding to the times t1, t2 and t3, for example, then the cost maps 644 may include a current cost map corresponding to the time t0 as well as future cost maps corresponding to the times t1, t2 and t3. In an alternative embodiment, the SDCA 600 does not include the prediction component 620 or signals 609, 622, and prediction functions are accomplished entirely by the cost map generator 640. For example, the cost map generator 640 may receive only a current occupancy grid (in signals 608), and use that to generate both the current cost map "Cost Map 1" and the future cost maps "Cost Map 2" through "Cost Map T."

In some embodiments, the costs associated with the different cells (or other regions) of a cost map may be weighted in a particular manner. If the mapping and navigation signals 632 specify a particular route for the autonomous vehicle to get to a destination (or to a next waypoint along a portion of the route), for example, the costs may be weighted based on the route or route portion. In particular, cells or regions that are further from the desired route may generally be weighted to have higher cost values than cells or regions that are closer to the desired route.

A motion planner 646 of the SDCA 600 utilizes A* planning to process the cost maps 644 and generate decisions 648. The decisions 648 represent a desired/intended trajectory or path of the autonomous vehicle as it moves through the environment represented by the cost maps 644, with the trajectory being updated or revised over time as needed (e.g., as the predicted future environment changes). The trajectory represented by decisions 648 may be provided to one or more control systems that attempt to follow the trajectory (e.g., PID control systems, or machine learning control systems, etc.), or to a decision arbiter or other intermediate stage (e.g., in an aggregate SDCA, such as one of those shown in FIGS. 1-3).

"A*" refers to a type of search algorithm, generally known in the art, that is used by the motion planner 646 to generate trajectories or paths. A continuous A* planning technique may be used to search a discrete state space and generate a substantially continuous path between a starting point and a destination or between two waypoints along a route. In alternative embodiments, the motion planner 646 may use a discrete A* algorithm to search a discrete state space, where the state space may correspond to the cells of a cost map (or otherwise be derived from the cost map cells), and the A* algorithm may generate a cell-by-cell discrete path through a grid rather than a continuous path. In either case, the current position of the autonomous vehicle may serve as the starting point or "node" for the trajectory/path determination and, in some embodiments and/or scenarios, a desired interim destination of the vehicle (e.g., a next waypoint along a route) may serve as the ending point/node for the trajectory/path determination.

Example Predictive Control Based Self-Driving Control Architecture

Figure 13:
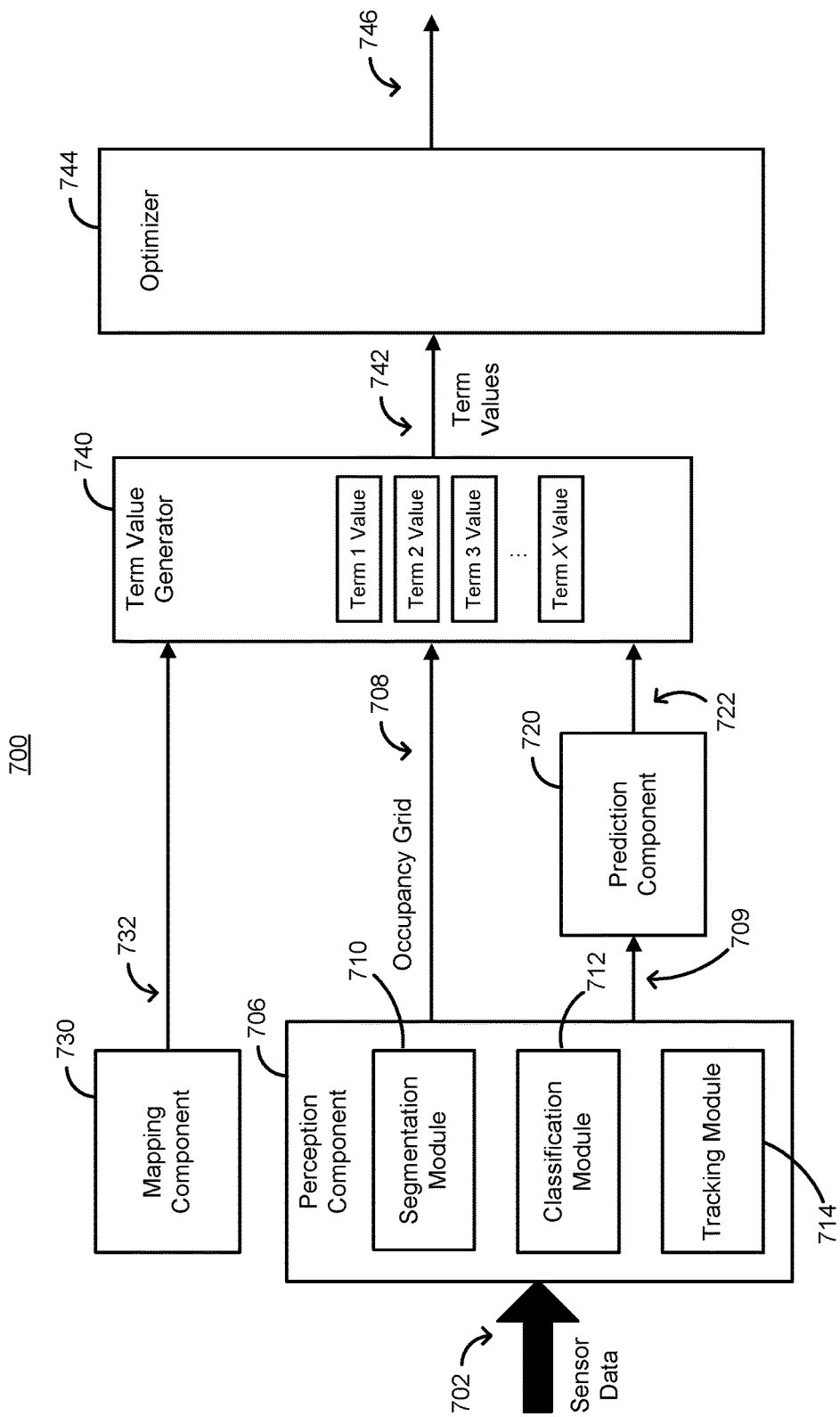
FIG. 13 is a block diagram of an example self-driving control architecture using a model predictive control motion planner.

FIG. 13 illustrates an example SDCA 700 that utilizes a specific type of predictive control based motion planner, i.e., a model predictive control (MPC) motion planner. The SDCA 700 may be utilized as one of the SDCAs 104 in the aggregate SDCA 100, 120 or 140 of FIG. 1, 2 or 3, respectively, as a stand-alone SDCA, or in another suitable software architecture.

The sensor data 702, perception component 706 (with segmentation module 710, classification module 712, and tracking module 714), prediction component 720, mapping component 730, and/or mapping and navigation signals 732 of FIG. 13 may be the same as, or similar to, the perception component 206 (with segmentation module 210, classification module 212, and tracking module 214), prediction component 220, mapping component 230, and/or mapping and navigation signals 232, respectively, described above in connection with FIG. 4. Moreover, the perception signals 708, 709 and prediction signals 722 of FIG. 13 may be similar to the perception signals 508, 509 and prediction signals 522 discussed above in connection with FIG. 9 (e.g., including current and future occupancy grids).

In the example SDCA 700, however, the occupancy grids of the perception signals 708 and prediction signals 722 are processed by a term value generator 740 to output term values 742. The term values 742 are used by an optimizer 744 to set/populate independent variables of an objective equation. The optimizer 744 then solves for one or more dependent variables of the objective equation, by solving the objective equation subject to a set of constraints. The term value generator 740 and optimizer 744 may collectively be viewed as an MPC motion planner of the SDCA 700. The set of constraints may include (i) one or more constraints that are determined using a physical model of the autonomous vehicle and/or (ii) one or more constraints that are determined from driving decisions made by one or more human drivers. The physical model is based on an understanding of the kinematics and dynamics of the autonomous vehicle. A physical model of the autonomous vehicle may include a number of parameters that affect how the vehicle operates, such as for example: the vehicle dimensions, shape, and/or weight; the number, size, and location of the tires; the forces on the tires; limits on the vehicle (e.g., acceleration, braking, and/or steering limits); the type of drivetrain (e.g., front-wheel drive, rear-wheel drive, or four-wheel drive); the type of engine (e.g., internal combustion engine, electric motor, or hybrid); the passengers or cargo in the vehicle (e.g., unloaded or fully loaded); and/or the conditions in which the vehicle is operating (e.g., hot, cold, wet, dry, icy, etc.). One or more constraints based on driving decisions made by human drivers may be determined from a dataset of human drivers driving in a real or simulated environment. This data-driven approach uses the driving behavior from human drivers to determine the constraints. The constraints may be determined by also taking into account data related to the driving conditions encountered while the human driver is operating the vehicle, such as for example, the weather (e.g., sunny, rainy, snowy), the lighting (e.g., sunny, cloudy, or nighttime), traffic conditions, the type of road, or the road condition (e.g., dry, wet, or icy). The human drivers may operate a vehicle that is similar to or the same as the autonomous vehicle.

The term value generator 740 may generate values for X different terms of the objective equation, where X is any suitable positive integer. Each term may correspond to a different driving objective over some finite time horizon. For example, "Term 1" of FIG. 13 may be a distance from a nearest object or from some predetermined perimeter surrounding that object (with larger distances generally being desired), "Term 2" may be a metric indicating how "off course" the autonomous vehicle is with respect to some waypoint or other intermediate destination (e.g., an angle, with smaller angles generally being desired), and so on. Other driving objectives may include one or more of the following: keeping the autonomous vehicle in the center of the lane in which the autonomous vehicle is traveling; keeping the autonomous vehicle within the boundaries of the road (e.g., between a curb and a center median or between a shoulder and a guardrail) on which the autonomous vehicle is traveling; maintaining the heading of the autonomous vehicle based on the curvature of the lane or road on which the autonomous vehicle is traveling (e.g., turning the autonomous vehicle based on the curvature of the lane ahead); and obeying the rules of the road on which the autonomous vehicle is traveling (e.g., maintaining the speed at or near the speed limit, stopping for stop signs and traffic lights, pulling over for emergency vehicles, merging at yield signs, stopping for pedestrians, staying out of bicycle lanes, and/or not driving on road shoulders).

The dependent variable(s) of the objective equation may correspond to any suitable type(s) of planned movement for the autonomous vehicle, such as changes to specific operational parameters of the vehicle (e.g., speed, braking force, or steering direction) or, in some embodiments, changes to the desired position and heading of the vehicle that may later be converted to specific operational parameters. The optimizer 744 may output decisions 746 that include solved-for values of the dependent variable(s), or decisions 746 that are derived from the value(s). The decisions 746 may be provided to one or more operational subsystems of the autonomous vehicle (e.g., accelerator 440, brakes 442, and steering mechanism 446 of FIG. 7A) to effectuate maneuvering of the vehicle in accordance with the generated decisions 746, or to a decision arbiter or other intermediate stage in an aggregate SDCA.

The optimizer 744 may solve the objective equation, using the term values 742 and known constraints, at each of a plurality of times (e.g., t0, t1, t2, etc.). Each solution generated by the optimizer 744 may provide operational parameters or other decisions over the entire finite time horizon. That is, MPC motion planning is used to plan driving actions for some finite number of time steps into the future. As the perception signals 708 and/or prediction signals 722 change, however, the decisions 746 may change at any time to reflect the new situation. Thus, for example, the optimizer 744 may at time t0 calculate decisions eight time steps into the future (up to t7), but only use the first (t0) decision to generate the current one of the decisions 746. At time t1, the decisions 746 may correspond to the first of eight new decisions generated by the optimizer 744 at time t1, regardless of whether that decision matches the second (a) decision that was generated by the optimizer 744 at time t0.

In some embodiments, the optimizer 744 can change the relative importance of certain driving objectives by dynamically adjusting weighting coefficients of the respective terms in the objective equation. The coefficients may be adjusted based on various factors, depending on the embodiment. As one example, the optimizer 744 adjusts one or more terms based on a specific, desired driving style (e.g., as selected by a passenger, or as automatically selected by a portion of the SDCA 700 or an aggregate SDCA that includes the SDCA 700). For instance, an "aggressive" driving style may cause the optimizer 744 to more heavily weight terms relating to the time required to complete certain maneuvers, while more lightly weighting terms relating to the minimization of G-forces or jerk within the vehicle. As another example, a driving style that prioritizes ride comfort or smoothness of ride (rather than speed or aggressiveness) may more heavily weight terms relating to the minimization of speed, acceleration, and/or jerk.

Alternatively, or in addition, the coefficients may be adjusted based on observed and/or expected circumstances (e.g., conditions and/or situations). For example, the optimizer 744 may adjust coefficients based on the current weather (sunny, overcast, rainy, snowy, foggy, etc.), and/or current road conditions (e.g., dry, icy, wet, gravel or potholes, etc.), as determined by the perception component 706 (or another component of the SDCA 700, etc.). As another example, the optimizer 744 may adjust coefficients based on a maneuver that the autonomous vehicle is executing (e.g., lane shift, freeway merge, etc.) or is planning to execute, and/or based on observed (past and/or current) and/or expected behaviors of other vehicles or pedestrians, etc. In other embodiments, all coefficients are fixed.

Example Computing System for Controlling an Autonomous Vehicle

Figure 14:
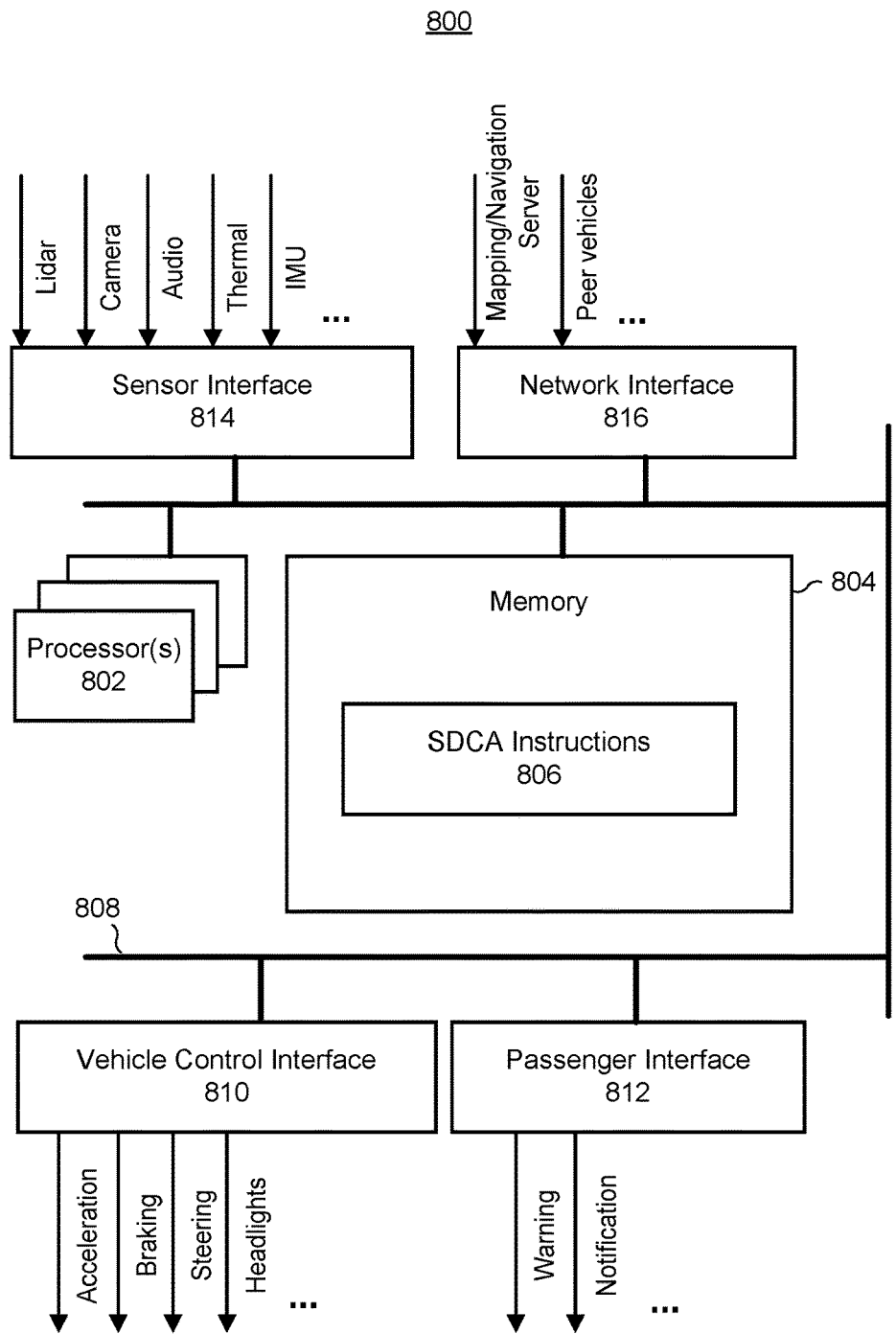
FIG. 14 is a block diagram of an example computing system for controlling an autonomous vehicle, which may be used to implement the aggregate self-driving control architecture of FIG. 1, 2 or 3, or an individual self-driving control architecture of FIG. 4, 9, 11 or 13.

FIG. 14 is a block diagram of an example computing system 800 for controlling an autonomous vehicle. The computing system 800 may be integrated within an autonomous vehicle in any suitable manner, and at any suitable location or locations within the vehicle. The computing system 800 may be included, or partially included, within the vehicle controller 422 of FIG. 7A, for example. The computing system 800 includes one or more processors 802, and one or more memories 804 storing SDCA instructions 806. Depending on the embodiment, the SDCA instructions 806 may correspond to an aggregate SDCA (e.g., if the computing system 800 is used to implement/run the aggregate SDCA of FIG. 1, 2 or 3), or to an individual SDCA (e.g., if used to implement/run the SDCA of FIG. 4, 9, 11 or 13), for example.

In embodiments where the processor(s) 802 include more than a single processor, each processor may be a different programmable microprocessor that executes software instructions stored in the one or more memories 804. Alternatively, each of the processor(s) 802 may be a different set of such microprocessors, or a set that includes one or more microprocessors and one or more other processor types (e.g., ASICs, FPGAs, etc.) for certain functions (e.g., relatively simple functions of the safety watchdog 112 of FIG. 1, 2 or 3).

The one or more memories 804 may include one or more physical memory devices with non-volatile memory. Any suitable memory type or types may be used, such as ROM, solid-state drives (SSDs), hard disk drives (HDDs), and so on. The processor(s) 802 are coupled to the memory 804 via a bus or other network 808. The network 808 may be a single wired network, or may include any suitable number of wired and/or wireless networks. For example, the network 808 may be or include a controller area network (CAN) bus, a Local Interconnect Network (LIN) bus, and so on.

In some embodiments where the SDCA instructions 806 correspond to an aggregate SDCA, each of the processors 802 runs a different one of the individual SDCAs (e.g., a different one of the SDCA 104 of FIG. 1, 2 or 3), and a different memory 804 or a different portion of the memory 804 stores the instructions to implement each SDCA. For instance, each SDCA may correspond to a different integrated circuit, which includes the respective one of the processors 802 and the respective instructions stored in the memory 804. In other embodiments, a single one of processor(s) 802 may run two or more (e.g., all) of the individual SDCAs, and/or a single integrated circuit may include both processor and memory/instructions for two or more (e.g., all) of the individual SDCAs. Other portions of the aggregate SDCA (e.g., the decision arbiter 108 of FIG. 1, 2 or 3) may be run by the same processor(s) that run some or all of the individual SDCAs, or may be run by one or more other processors of the processors 802.

Also coupled to the network 808 are a vehicle control interface 810, a passenger interface 812, a sensor interface 814, and a network interface 816. Each of the interfaces 810, 812, 814 and 816 may include one or more processors (e.g., ASICs, FPGAs, microprocessors, etc.) and/or other hardware, firmware and/or software to enable communication with systems, subsystems, devices, etc., that are external to the computing system 800.

The vehicle control interface 810 is generally configured to provide control data generated by the processor(s) 802 to the appropriate operational subsystems of the autonomous vehicle, such that the appropriate subsystems can effectuate driving decisions made by the processor(s) 802. Referring to FIGS. 1-3, for example, the vehicle control interface 810 may provide the control signals 110 to the appropriate subsystem(s) (e.g., accelerator 440, brakes 442, and steering mechanism 446 of FIG. 7A). As another example, referring to FIGS. 4, 9, 11 and 13, the vehicle control interface 810 may provide the motion planner output (or maneuver executor output) to the appropriate subsystem(s). In some embodiments, the vehicle control interface 810 includes separate interface hardware, firmware and/or software for different operational subsystems.

The passenger interface 812 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 812 may specifically provide such information to the driver (e.g., via dashboard indicators, etc.). As just one example, the passenger interface 812 may cause a display and/or speaker in the vehicle to generate an alert when the processor(s) 802 (executing the SDCA instructions 806) determine that a collision with another object is likely. As another example, the passenger interface 802 may cause a display in the vehicle to show an estimated time of arrival (ETA) to passengers. In some embodiments, the passenger interface 812 also permits certain user inputs. If the vehicle supports passenger selection of specific driving styles (e.g., as discussed above in connection with FIG. 3), for example, the passenger interface 812 may cause a display to present a virtual control (e.g., button) that a passenger may activate (e.g., touch, scroll through, etc.) to select a particular driving style. Additionally, the passenger interface 812 may allow the passenger to input or select a destination.

The sensor interface 814 is generally configured to convert raw sensor data from one or more sensor devices (e.g., lidar, camera, microphones, thermal imaging units, IMUs, GPS units, etc.) to a format that is consistent with a protocol of the network 808 and is recognized by one or more of the processor(s) 802. The sensor interface 814 may be coupled to the lidar system 300 of FIG. 5 or the lidar system 402 of FIG. 7A, for example, with the sensor interface 814 converting point cloud data to an appropriate format. In some embodiments, the sensor interface 814 includes separate interface hardware, firmware and/or software for each sensor device and/or each sensor type.

The network interface 816 is generally configured to convert data received from one or more devices or systems external to the autonomous vehicle to a format that is consistent with a protocol of the network 808 and is recognized by one or more of the processor(s) 802. In some embodiments, the network interface 816 includes separate interface hardware, firmware and/or software for different external sources. For example, a remote mapping/navigation server may send mapping and navigation/route data (e.g., mapping and navigation signals 232, 532, 632 or 732 of FIG. 4, 9, 11 or 13) to the computing system 800 via a cellular network interface of the network interface 816, while one or more peer vehicles (e.g., other autonomous vehicles) may send data (e.g., current positions of the other vehicles) to the computing system 800 via a WiFi network interface of the network interface 816. Other types of external data may also, or instead, be received via the network interface 816. For example, the computing system 800 may use the network interface 816 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 814. Instead, the processor(s) 802 execute the SDCA instructions 806 using, as input, only (or primarily) data that is received by the network interface 816 from other vehicles, infrastructure, and/or other external devices/systems. In such an embodiment, the external data may include raw sensor data that is indicative of the vehicle environment (but was generated off-vehicle), and/or may include higher-level information that was generated externally using raw sensor data (e.g., occupancy grids, as discussed above in connection with FIGS. 9 and 10).

The network 808 may also couple to other types of interfaces and/or components, and/or some of the interfaces shown in FIG. 14 may be omitted (e.g., the sensor interface 814, as discussed above). Moreover, it is understood that the computing system 800 represents just one possible configuration for supporting the software architectures, functions, features, etc., described herein, and that others are also within the scope of this disclosure.

Example Methods of Controlling an Autonomous Vehicle Using an Aggregate SDCA

Figure 15:
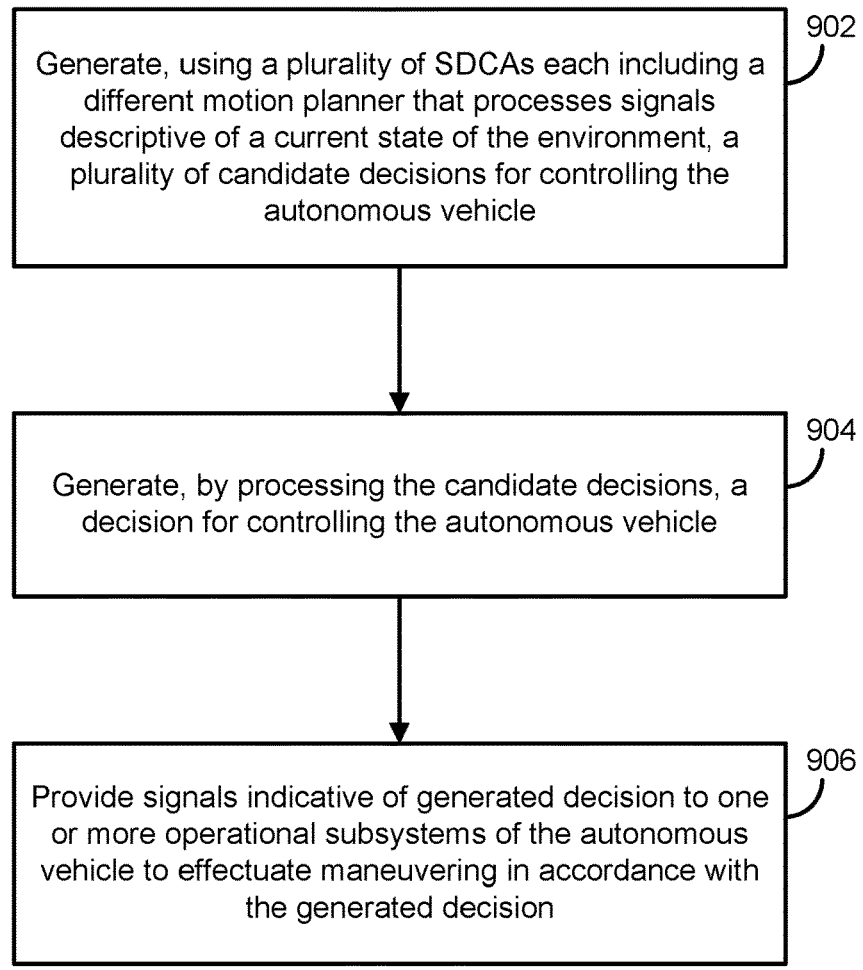
FIG. 15 is a flow diagram of an example method for controlling an autonomous vehicle using a plurality of different self-driving control architectures.
Figure 16:
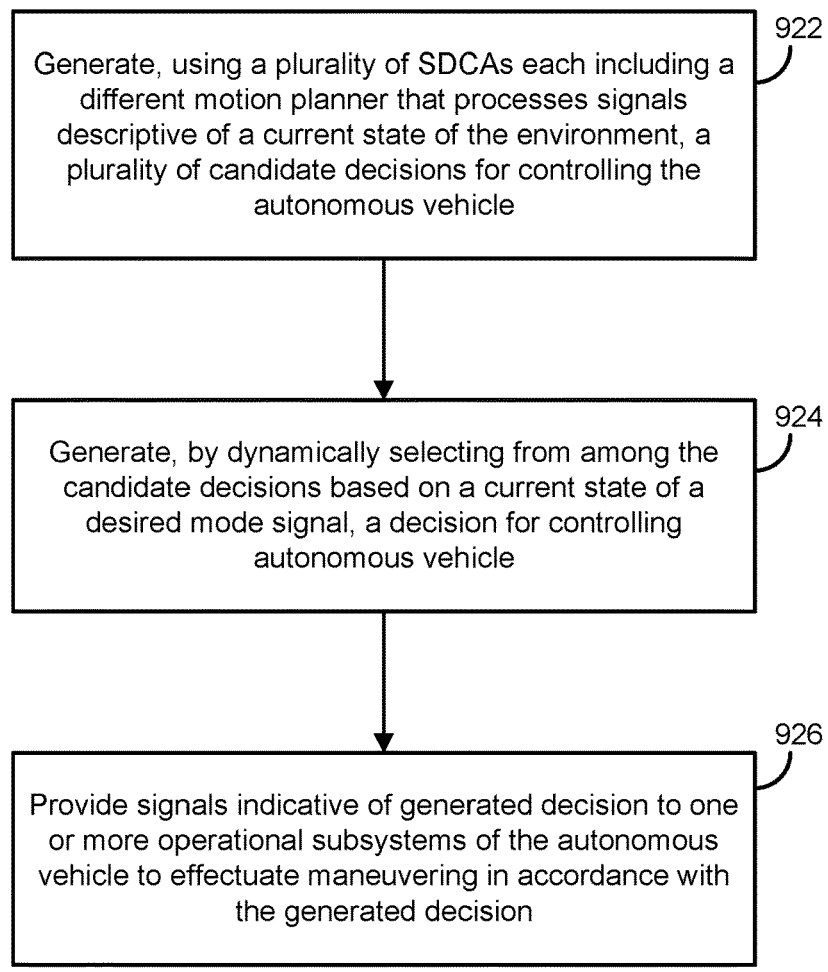
FIG. 16 is a flow diagram of another example method for controlling an autonomous vehicle using a plurality of different self-driving control architectures.

FIGS. 15 and 16 depict example methods 900 and 920, respectively, for controlling an autonomous vehicle using multiple different SDCAs in an "aggregate" SDCA architecture. The method 900 of FIG. 15 relates to embodiments that consider/process the candidate decisions from multiple SDCAs before generating a final decision in a given situation, while the method 920 of FIG. 16 relates to embodiments that utilize a priori knowledge of the individual SDCAs to dynamically select which candidate decision should be used as a final decision in a given situation. It is understood, however, that some embodiments corresponding to the method of FIG. 15 may also utilize a priori knowledge of the SDCAs (e.g., to instead select a particular SDCA in specific, limited scenarios, or to weight the candidate decision, etc.), and that some embodiments of FIG. 16 may, in specific, limited scenarios, consider/process the candidate decisions from multiple SDCAs before generating a final decision. Either of the methods 900, 920 may be implemented/performed by the computing system 800 of FIG. 14 (e.g., by the processor(s) 802 when executing the SDCA instructions 806 stored in memory 804), for example, or by another suitable computing device or system.

Referring first to the method 900 of FIG. 15, candidate decisions for controlling the autonomous vehicle are generated at block 902. The candidate decisions are generated using multiple SDCAs that each include a different motion planner, with each motion planner processing signals descriptive of the current state of the environment through which the autonomous vehicle is moving (and possibly also other data, such as map data indicating a final destination or waypoints en route to the destination, etc.). The state of the environment through which the autonomous vehicle is moving may include the location and/or motion of other vehicles, the location and/or type of objects near the autonomous vehicle, lighting conditions (e.g., daytime, sunset, or nighttime), the weather (e.g., sunny, rainy, cloudy, or snowy), a road condition (e.g., dry, wet, or icy), and/or road type (e.g., freeway, expressway, boulevard, city street, residential street, or dirt road). The SDCAs used to generate the candidate decisions may be the SDCAs 104 of any of FIGS. 1-3, for example. Each candidate decision may specify an operational parameter (e.g., speed or change in speed, direction or change in direction, etc.), a set of operational parameters (e.g., speed and direction, or acceleration, braking, and direction, etc.), or a maneuver (e.g., move left one lane, stay in lane, turn right, etc.), for example. In some embodiments, different candidate decisions specify different types of driving decisions (e.g., two decisions specifying maneuvers, while two other decisions specify ranges of allowed operational parameters, etc.).

The different motion planners of the SDCAs may include two or more different general types of motion planners. For example, the motion planners may include all of (or just two of, or just three of) a machine learning based planner (e.g., the reinforcement learning planner 540 of FIG. 9, or a planner trained using supervised learning), a search based planner (e.g., the A* planner 646 of FIG. 11), a sampling based planner (e.g., a probabilistic roadmap planner), and a predictive control based planner (e.g., an MPC planner including the term value generator 740 and optimizer 744 of FIG. 13). In some embodiments, some of the motion planners are of the same general type (e.g., any of the four types listed above), but differ in other respects. For example, the motion planners may include two or more MPC planners, but with the MPC planners solving different objective equations (e.g., solving objective equations having terms corresponding to different sets of driving goals, and/or utilizing different weightings of coefficients, etc.).

In one embodiment, at least one of the candidate decisions indicates one or more ranges of disallowed operational parameters, or disallowed maneuvers, for the autonomous vehicle. For example, a first SDCA that is generally adept at making good driving decisions may be used to generate a specific set of operational parameters (e.g., increase speed by 2 mph and turn 1.5 degrees to the right), while a second SDCA that is particularly adept at identifying or predicting high risk driving situations may generate a candidate decision indicating a range (or ranges) of disallowed speeds and/or directions (e.g., do not exceed 38 mph and do not turn more than 3 degrees in either direction, and/or do not let the ratio of the absolute mph speed to the degrees of turn exceed 0.75, etc.).

At block 904, a decision for controlling the autonomous vehicle is generated by processing the candidate decisions generated at block 902. In some embodiments and/or scenarios, the candidate decisions processed at block 904 do not include all of the available candidate decisions. For example, the SDCAs discussed in connection with block 902 may only be a subset of a larger collection of SDCAs, and the method 900 may further include selecting the subset (e.g., preemptively ruling out decisions associated with all other SDCAs in the larger collection) based on known information about the SDCAs and one or more other factors (e.g., current or expected circumstances of the vehicle, a preferred driving style, etc.).

Generally, any of the techniques or models for generating a decision (based on candidate decisions) that are described above in connection with FIG. 2, and/or any other suitable techniques, may be used at block 904. If at least some of the candidate decisions specify particular maneuvers, for example, block 904 may include determining which maneuver is indicated by the most candidate decisions (e.g., a pure voting technique). As another example, if at least some of the candidate decisions specify particular operational parameters, block 904 may include performing a mathematical operation on the operational parameters (e.g., determining the geometric mean, arithmetic mean, median, or weighted average of each operational parameter). In some embodiments, block 904 includes determining that one or more candidate decisions are statistical outliers relative to other candidate decisions, and removing the outlier(s) from further consideration (e.g., prior to tallying votes or calculating a geometric mean, etc.). Moreover, a safety module/watchdog (e.g., the safety watchdog 112 of any of FIGS. 1-3) may be used as a check on the results. For example, block 904 may include generating a "provisional" decision based on the candidate decisions, and then comparing the provisional decision to one or more "safety signals" generated by the watchdog (e.g., signals indicating allowable or disallowed maneuvers and/or operational parameters). More generally, block 904 may include processing of multiple SDCA outputs/decisions (as discussed above) to identify a provisional decision or decisions, and then applying one or more rules to determine whether to select/apply the provisional decision, or to determine which provisional decision to select/apply. In one embodiment, these rules may forbid the selection of any provisional decision that would cause the vehicle to enter an area that another, rules-based SDCA (or safety watchdog 112, etc.) identifies as a restricted area, for example.

In some embodiments, the decision at block 904 is made by an "arbitration" machine learning model that is trained to dynamically weight candidate decisions of different SDCAs based on observed or expected circumstances of the autonomous vehicle (and/or, in limited situations, to dynamically select the candidate decisions of specific SDCAs based on observed or expected circumstances of the vehicle). The arbitration model may be trained using reinforcement learning, for example, with rewards for avoiding safety violations (e.g., crashes, and/or disobeying rules of the road, etc.), rewards for executing a particular driving style (e.g., aggressive/fast, or smooth with low G-force levels, etc.), and/or any other suitable type or types of rewards.

In some embodiments, at least some training sets for the arbitration model are created in a simulator, through which a large number of random situations are simulated. A large, rich set of data for challenging situations can be generated by finding situations where the decision generator fails (e.g., results in a simulated crash or other undesired outcome), and manually building data with the correct decision in each such situation. Variations on this failure situation may also be generated in the simulator, with manual correction of each variation also being added to the data set. Similarly, if reinforcement learning is used, running a large number of variations on any failure situation may improve performance.

Alternatively, the arbitration machine learning model may be trained using supervised learning, with labels, weights, or scores indicating which SDCA generated the "best" candidate decisions in various situations, according to some suitable criteria. For example, the labels may have been generated by comparing decisions made by expert human drivers during real or simulated driving trips with candidate decisions generated by the SDCAs during the same trips. That is, the labels may indicate the SDCAs that generated the candidate decisions most closely resembling the human driving decisions in different conditions and/or situations. The labels for supervised learning may also have been generated in other suitable ways, such as determining which SDCAs generated candidate decisions that most closely adhered to a particular driving style (e.g., aggressive or smooth) in different conditions and/or situations. Regardless of how the labels were generated, the trained arbitration machine learning model may be used to more heavily weight candidate decisions of SDCAs that are more adept at decision-making in a particular observed or expected circumstance (e.g., weather conditions, road conditions, and/or other environmental conditions, or an upcoming maneuver, etc.), and/or to filter out the candidate decisions of SDCAs that are less adept at decision-making in the observed or expected circumstance (e.g., prior to processing the remaining candidate decisions).

At block 906, signals that are indicative of the decision generated at block 904 are provided to one or more operational subsystems of the autonomous vehicle, in order to effectuate maneuvering of the vehicle in accordance with the generated decision. The operational subsystem(s) may include a throttle subsystem and braking subsystem that jointly control speed/acceleration and a steering subsystem that controls direction (e.g., accelerator 440, brakes 442, and steering mechanism 446 of FIG. 7A), for example. The signals may be provided directly to the operational subsystem(s), or indirectly via one or more intermediate stages (e.g., via a software component that converts maneuvers to specific operational parameters, or, in an embodiment with hierarchical levels of decision arbiters, via a processor or module that implements a higher-level decision arbiter).

In some embodiments and/or scenarios, the method 900 includes one or more additional blocks not shown in FIG. 15. For example, the method 900 may include a first additional block in which sensor data is received. The sensor data may include data from one or more types of sensor devices and/or systems. For example, the sensor data may include, or may have been generated based on, data generated by one or more lidar devices (e.g., the lidar system 300 of FIGS. 5 and 6 or the lidar system 402 of FIG. 7A), one or more camera devices, one or more radar devices, one or more thermal sensor devices (e.g., thermal imaging units), one or more IMUs, one or more GPS units, one or more acoustic or ultrasonic sensors, and/or one or more other sensor types. The sensor data may be similar to the sensor data 102 of FIGS. 1-3, for example, and/or may be divided among the different SDCAs (or collectively processed by all of the SDCAs) in any of the ways discussed above in connection with FIG. 1.

The method 900 may also include a second additional block in which some or all of the signals descriptive of the current state of the environment (i.e., the signals later processed by the motion planners at block 902) are generated based on the received sensor data. Such a block may include performing various perception functions (e.g., as described above in connection with perception component 206 of FIG. 4, perception component 506 of FIG. 9, perception component 606 of FIG. 11, or perception component 706 of FIG. 13). For example, the block may include segmenting the received sensor data into objects, classifying the segmented objects according to object types, tracking movement of the classified objects over time, and generating, based on the classified and tracked objects, at least some of the signals descriptive of the current state of the environment. The perception functions may be performed independently for each SDCA, or some or all of the SDCAs may share a perception component.

Referring next to the method 920 of FIG. 16, candidate decisions for controlling the autonomous vehicle are generated at block 922. The candidate decisions are generated using multiple SDCAs that each include a different motion planner, with each motion planner processing signals descriptive of the current state of the environment through which the autonomous vehicle is moving (and possibly also other data, such as map data indicating a final destination or waypoints en route to the destination, etc.). The SDCAs used to generate the candidate decisions may be the SDCAs 104 of any of FIGS. 1-3, for example. Block 922 may be the same as or similar to block 902 of the method 900.

At block 924, a decision for controlling the autonomous vehicle is generated by dynamically selecting from among the candidate decisions (generated at block 922) based on the current state of a signal indicating a desired mode. The desired mode signal may explicitly or implicitly indicate, via its current state, which driving styles, "skills," strengths, weaknesses, and/or other characteristics are desired in particular conditions and/or situations, for example. A mode signal may be based on a user selection of a particular driving style (e.g., aggressive or smooth), a weather condition (e.g., rain or snow), a traffic condition (e.g., uninterrupted traffic flow or stop-and-go traffic flow), or a road condition. A road condition may include a road type or environment (e.g., highway, urban, rural, or residential), a construction-zone mode, a school-zone mode, or an emergency-vehicle-nearby mode (e.g., pull over to let an emergency vehicle pass). Generally, any of the techniques or models for dynamically selecting a candidate decision that are described above in connection with FIG. 3, and/or any other suitable techniques, may be used at block 924.

In one embodiment, for example, block 924 includes dynamically selecting from among the candidate decisions based on the current state of a signal indicating a particular driving style (e.g., aggressive/fast, or smooth with low G-force levels, etc.). The current state may be determined or set by a user (e.g., a passenger) manually selecting that driving style, or by way of an automated selection or setting. In such embodiments, block 924 may include selecting the candidate decision generated by an SDCA that is known to make driving decisions in accordance with the driving style (e.g., based on testing of G-force levels in a vehicle controlled entirely by that single SDCA, or based on a known design strategy for the SDCA).

In another example embodiment, block 924 includes dynamically selecting from among the candidate decisions based on the current state of a signal indicating a particular set of environmental conditions. For example, knowledge of current weather conditions (e.g., foggy, snowy, rainy, clear, overcast, etc.) and/or current road conditions (e.g., dirt road, paved road, paved road with cracks, icy road, etc.) and/or availability of map data may be used to select a candidate decision generated by an SDCA that is known to make good driving decisions in those conditions (e.g., based on testing in a vehicle controlled entirely by that single SDCA, while driving in the relevant conditions). The current conditions may be determined from camera or other sensor data collected by the autonomous vehicle, for example, or may be determined by other means (e.g., data received via an interface, such as network interface 816 of FIG. 14, from a remote server that provides a weather service or other suitable service).

In still another example embodiment, block 924 includes dynamically selecting from among the candidate decisions based on the current state of a signal indicating a maneuver that the autonomous vehicle is currently performing, or is expected to perform in the near future. If the autonomous vehicle has decided to execute a merging maneuver when moving from an on-ramp to a highway, for example, a candidate decision that is generated by an SDCA that tends to perform the operation in a particularly safely and/or efficient manner (e.g., based on testing in a vehicle controlled entirely by that single SDCA, while performing the relevant maneuver) may be selected. As another example, if the autonomous vehicle has identified a current circumstance as a high-risk scenario, a candidate decision generated by an SDCA known to perform evasive maneuvers in a relatively safe manner (or that generally weighs safety even more heavily than other SDCAs, etc.) may be selected.

In some embodiments, the method 920 includes filtering out certain candidate decisions before making a selection among the remaining candidate decisions. For example, one or more candidate decisions that are statistical outliers relative to other candidate decisions may be identified and removed from further consideration, prior to the selection at block 924. Moreover, a safety module/watchdog (e.g., the safety watchdog 112 of any of FIGS. 1-3) may be used as a check on the results. For example, the selection of a particular candidate decision at block 924 may only be a "provisional" decision, which is then compared to one or more "safety signals" generated by the watchdog (e.g., signals indicating allowable or disallowed maneuvers and/or operational parameters) prior to being provided to any operational subsystems of the vehicle.

In some embodiments, the selection at block 924 is made by an "arbitration" machine learning model that is trained to dynamically select from among the candidate decisions of different SDCAs based on observed or expected circumstances of the autonomous vehicle. The arbitration model may be trained using reinforcement learning, for example, using rewards for avoiding safety violations (e.g., crashes, and/or disobeying rules of the road, etc.), rewards for executing a particular driving style (e.g., aggressive/fast, or smooth with low G-force levels, etc.), and/or any other suitable type or types of rewards.

Alternatively, the arbitration machine learning model may be trained using supervised learning, with labels, weights, or scores indicating which SDCA generated the "best" candidate decisions in various situations, according to some suitable criteria. For example, the labels may have been generated by comparing decisions made by expert human drivers during real or simulated driving trips with candidate decisions generated by the SDCAs during the same trips. That is, the labels may indicate which SDCAs generated candidate decisions most closely resembling the human driving decisions in different conditions and/or situations. The labels for supervised learning may also have been generated in other suitable ways, such as determining which SDCAs generated candidate decisions that most closely adhered to a particular driving style (e.g., aggressive or smooth) in different conditions and/or situations. Regardless of how the labels were generated, the trained arbitration machine learning model may be used to select the candidate decisions of those SDCAs that are more adept at decision-making in a particular observed or expected circumstance (e.g., weather conditions, road conditions, and/or other environmental conditions, or an upcoming maneuver, etc.).

At block 926, signals that are indicative of the decision generated at block 924 are provided to one or more operational subsystems of the autonomous vehicle, in order to effectuate maneuvering of the vehicle in accordance with the generated decision. Block 926 may be the same as or similar to block 906 of the method 900.

In some embodiments and/or scenarios, the method 920 includes one or more additional blocks not shown in FIG. 16. For example, the method 920 may include a first additional block in which sensor data is received. The sensor data may include data from one or more types of sensor devices and/or systems. For example, the sensor data may include, or may have been generated based on, data generated by one or more lidar devices (e.g., the lidar system 300 of FIGS. 5 and 6 or the lidar system 402 of FIG. 7A), one or more camera devices, one or more radar devices, one or more thermal sensor devices, one or more IMUs, one or more GPS units, one or more acoustic or ultrasonic sensors, and/or one or more other sensor types. The sensor data may be similar to the sensor data 102 of FIGS. 1-3, for example, and/or may be divided among the different SDCAs (or collectively processed by all of the SDCAs) in any of the ways discussed above in connection with FIG. 1.

The method 920 may also include a second additional block in which some or all of the signals descriptive of the current state of the environment (i.e., the signals later processed by the motion planners at block 922) are generated based on the received sensor data. Such a block may include performing various perception functions (e.g., as described above in connection with perception component 206 of FIG. 4, perception component 506 of FIG. 9, perception component 606 of FIG. 11, or perception component 706 of FIG. 13). For example, the block may include segmenting the received sensor data into objects, classifying the segmented objects according to object types, tracking movement of the classified objects over time, and generating, based on the classified and tracked objects, at least some of the signals descriptive of the current state of the environment. The perception functions may be performed independently for each SDCA, or some or all of the SDCAs may share a perception component.

Figure 17:
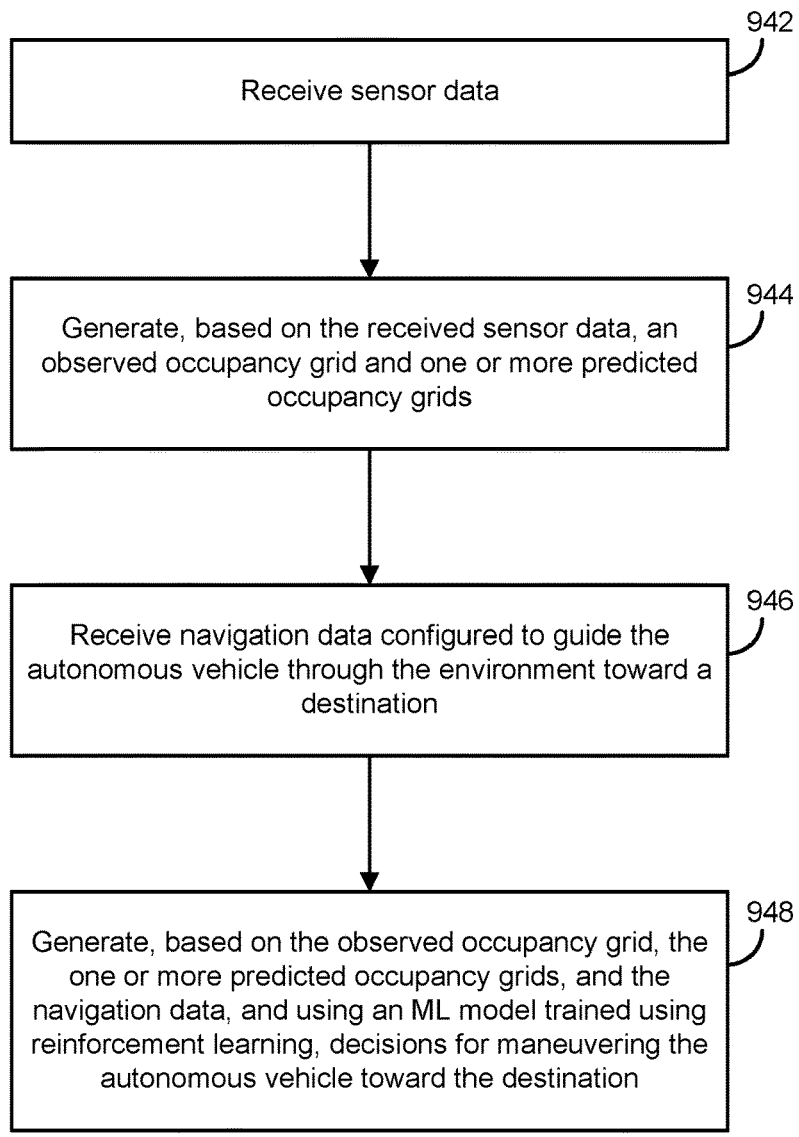
FIG. 17 is a flow diagram of an example method for generating decisions for maneuvering an autonomous vehicle using a motion planner trained with reinforcement learning.

Example Method of Controlling an Autonomous Vehicle Using a Learning Based Planner FIG. 17 depicts an example method 940 for controlling an autonomous vehicle using a learning based planner of an SDCA. The SDCA may be the SDCA 500 of FIG. 9, for example, and/or one of the SDCAs 104 of FIG. 1, 2 or 3 within an "aggregate" SDCA architecture. The method 940 may be implemented/performed by the computing system 800 of FIG. 14 (e.g., by the processor(s) 802 when executing the SDCA instructions 806 stored in memory 804), for example, or by another suitable computing device or system.

At block 942, sensor data is received. The sensor data may include lidar point cloud data (e.g., generated by the lidar system 300 of FIGS. 5 and 6, or the lidar system 402 of FIG. 7A), camera data, and/or any other type of sensor data discussed above in connection with the sensor data 102 of FIG. 1 or the sensor data 502 of FIG. 9, for example.

At block 944, an observed occupancy grid, and one or more predicted occupancy grids, are generated based on the sensor data received at block 942. The observed occupancy grid may be indicative of which cells are currently occupied in a two-dimensional representation of an environment through the autonomous vehicle is moving, and the predicted occupancy grid(s) may be indicative of which cells are currently expected to be occupied at one or more future instances of time in the two-dimensional representation of the environment, for example. In one embodiment, the occupancy grids may have the general format of the occupancy grid 550 of FIG. 10.

In some embodiments where the sensor data received at block 942 includes a point cloud (e.g., lidar data, or radar data, etc.), block 944 includes partitioning the point cloud into portions in accordance with probable boundaries between separate physical objects, determining object types/classes for at least some of those portions, and tracking movement of classified objects over time. Further, the block 944 may include estimating future positions of the tracked objects, and generating the predicted occupancy grid(s) using the estimated future positions.

At block 946, navigation data is received. The navigation data is configured to guide the autonomous vehicle through the environment toward a particular destination. The navigation data may be received from a remote server via an interface (e.g., network interface 816 of FIG. 14), possibly in response to a user-generated request for directions or a user command to go to the destination.

At block 948, decisions for maneuvering the autonomous vehicle toward the destination are generated using a machine learning model that is trained using reinforcement learning. To generate the decisions, the machine learning model may operate on (i.e., use as inputs) the observed occupancy grid, the predicted occupancy grid(s), and the navigation data. In some embodiments, the "decisions" constitute control data that, if input to one or more operational subsystems of the autonomous vehicle, cause the autonomous vehicle to execute particular maneuvers.

For example, block 948 may include selecting maneuvers from a pre-defined list of maneuvers (e.g., turn left, turn right, move one lane left, emergency stop, etc.), and generating the appropriate control data to execute the selected maneuvers. The control data may be generated by another machine learning model that receives the selected maneuvers as input. This second machine learning model may, like the motion planner, use reinforcement learning. In other embodiments, the control data is generated without using a machine learning model (e.g., using model predictive control, with objective equation terms corresponding to different driving goals).

In some embodiments, the method 940 includes one or more additional blocks not shown in FIG. 17. For example, the method 940 may include an additional block in which the decisions generated at block 948 are provided to one or more operational subsystems of the autonomous vehicle (e.g., accelerator 440, brakes 442, and steering mechanism 446 of FIG. 7A). The operational subsystem(s) may utilize proportional-integral-derivative (PID) controllers to effectuate maneuvering of the autonomous vehicle in accordance with the generated decisions, for example. In some embodiments, the decisions generated at block 948 are provided to the operational subsystem(s) in an indirect manner, via one or more intermediate stages (e.g., a decision arbiter such as the decision arbiter 108 of FIG. 1, 2 or 3).

Figure 18:
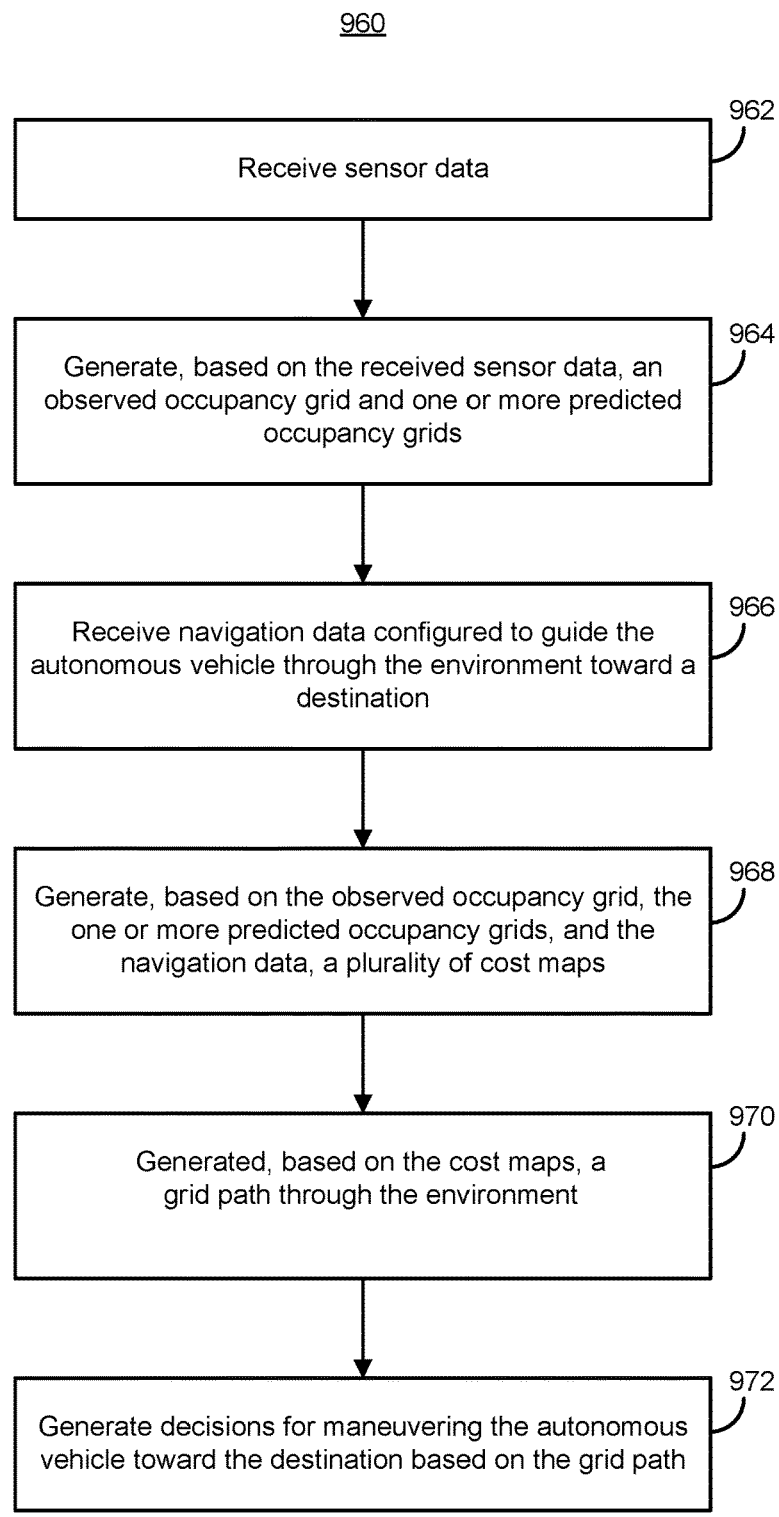
FIG. 18 is a flow diagram of an example method for generating decisions for maneuvering an autonomous vehicle using an A* motion planner.

Example Method of Controlling an Autonomous Vehicle Using a Search Based Planner FIG. 18 depicts an example method 960 for controlling an autonomous vehicle using a search based planner of an SDCA. The SDCA may be the SDCA 600 of FIG. 11, for example, and/or one of the SDCAs 104 of FIG. 1, 2 or 3 within an "aggregate" SDCA architecture. The method 960 may be implemented/performed by the computing system 800 of FIG. 14 (e.g., by the processor(s) 802 when executing the SDCA instructions 806 stored in memory 804), for example, or by another suitable computing device or system.

At block 962, sensor data is received; at block 964 an observed occupancy grid, and one or more predicted occupancy grids, are generated based on the received sensor data; and at block 966 navigation data that is configured to guide the autonomous vehicle through the environment toward a destination is received. Blocks 962, 964 and 966 may be similar to blocks 942, 944 and 946, respectively, of the method 940 in FIG. 17.

At block 968, cost maps are generated based on the observed occupancy grid, the predicted occupancy grid(s), and the navigation data. Each cost map specifies numerical values representing a cost, at a respective instance of time, of occupying certain cells in a two-dimensional representation of the environment (e.g., in an overhead view). The numerical value, or "cost," for a given cell of the cost map grid (for a cost map corresponding to time t) may represent a risk associated with the autonomous vehicle being in the area of the environment represented by that cell at time t. In some embodiments, the value/cost may also represent a deviation from some desired "target" location (e.g., from a waypoint along the intended route of the vehicle). The deviation may correspond to a distance from the target location, and the value/cost may increase with distance from the target location. In some embodiments, the value/cost may represent multiple deviations from multiple respective target locations (e.g., the target locations may represent waypoints along a route). For example, the numerical value of a cell may be determined from a sum of multiple values corresponding to multiple respective deviations from multiple respective target locations. The numerical values/risks for particular cells may be determined based on the occupancy grids (e.g., current and expected object positions, object types, etc.), the received navigation data (e.g., waypoints indicating the desired route of the autonomous vehicle), and possibly other information (e.g., operational parameters of the autonomous vehicle, detected or predicted behaviors of other objects, etc.). In an alternative embodiment, the numerical values/risks for particular cells are not determined using any navigation data (e.g., if the navigation data is instead used at a later stage, by the motion planner and in conjunction with the cost maps).

Each cost map may correspond to the same area of the environment (e.g., the same area as the current observed and predicted occupancy grids). In some embodiments, one cost map is generated at block 968 for each occupancy grid that was generated at block 962. At a given time t0, for example, and in an embodiment where four occupancy grids are generated at block 962 (corresponding to times t0, t1, t2, and t3), four cost maps may be generated: a current cost map (corresponding to time t0 and generated based at least in part on the observed occupancy grid), and predicted cost maps (corresponding to times t1, t2 and t3 and generated based at least in part on three predicted occupancy grids). Thereafter, at time t1, four new cost maps may be generated: a current cost map (corresponding to time t1 and generated based at least in part on the observed occupancy grid), and predicted cost maps (corresponding to times t2, t3 and t4 and generated based at least in part on three predicted occupancy grids). In other embodiments, some or all of the cost maps do not correspond to the same times t as the occupancy grids (e.g., cost maps may be generated only at every other occupancy grid time interval, or at times in between occupancy grid time intervals, etc.). The current and predicted cost maps may be configured according to any of the embodiments discussed above in connection with FIG. 12, for example.

At block 970, a grid path through the environment of the autonomous vehicle is generated based on the cost maps generated at block 968, and using a motion planner (e.g., a machine learning based planner, a search based planner, a sampling based planner, or a predictive control based planner). For example, a motion planner (e.g., the motion planner 646 of FIG. 11) may be a search based planner that uses an A* planning technique to determine a grid path through a space corresponding to at least the current cost map grid. The grid path may correspond to a path through the cost map that minimizes the cost of traversing the cost map.

At block 972, decisions for maneuvering the autonomous vehicle toward the destination are generated based on the grid path generated at block 970. For example, block 972 may include selecting pre-defined maneuvers that enable the autonomous vehicle to follow the grid path, and/or determining a sequence of operational parameters (or sets of operational parameters) that enables the autonomous vehicle to follow the grid path.

In some embodiments, the method 960 includes one or more additional blocks not shown in FIG. 18. For example, the method 960 may include an additional block in which the decisions generated at block 972 are provided to one or more operational subsystems of the autonomous vehicle (e.g., accelerator 440, brakes 442, and steering mechanism 446 of FIG. 7A). The operational subsystem(s) may utilize proportional-integral-derivative (PID) controllers to effectuate maneuvering of the autonomous vehicle in accordance with the generated decisions, for example. In some embodiments, the decisions generated at block 972 are provided to the operational subsystem(s) in an indirect manner, via one or more intermediate stages (e.g., a decision arbiter such as the decision arbiter 108 of FIG. 1, 2 or 3).

Figure 19:
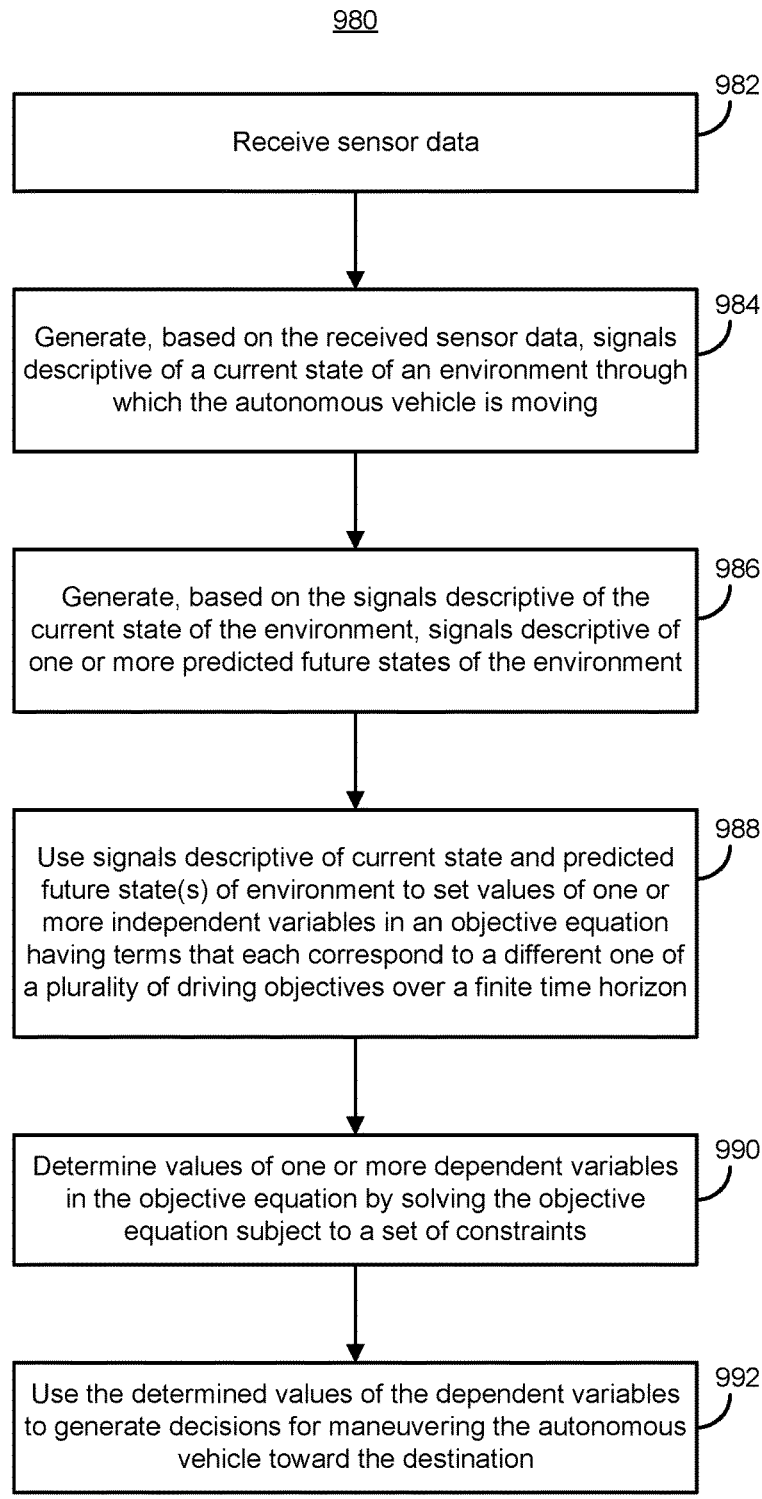
FIG. 19 is a flow diagram of an example method for generating decisions for maneuvering an autonomous vehicle using a model predictive control motion planner.

Example Method of Controlling an Autonomous Vehicle Using a Predictive Control Based Planner FIG. 19 depicts an example method 980 for controlling an autonomous vehicle using a predictive control based planner of an SDCA. The SDCA may be the SDCA 700 of FIG. 13, for example, and/or one of the SDCAs 104 of FIG. 1, 2 or 3 within an "aggregate" SDCA architecture. The method 980 may be implemented/performed by the computing system 800 of FIG. 14 (e.g., by the processor(s) 802 when executing the SDCA instructions 806 stored in memory 804), for example, or by another suitable computing device or system.

At block 982, sensor data is received. Block 982 may be similar to block 942 of the method 940 in FIG. 17. At block 984, signals that are descriptive of a current state of an environment through which the autonomous vehicle is moving (e.g., current object positions and possibly types, etc.) are generated based on the sensor data received at block 982. In some embodiments where the sensor data received at block 982 includes a point cloud (e.g., lidar data, or radar data, etc.), for example block 984 includes partitioning the point cloud into portions in accordance with probable boundaries between separate physical objects, determining object types/classes for at least some of those portions, and tracking movement of classified objects over time.

At block 986, signals descriptive of one or more predicted future states of the environment (e.g., future object positions and possibly types, etc.) are generated based on the signals descriptive of the current environment state generated at block 984. Block 986 may include estimating future positions of objects that are identified, classified and/or tracked at block 982, for example.

At block 988, the signals descriptive of the current environment state generated at block 984 and the signals descriptive of the predicted future environment state(s) are used to set values of one or more independent variables in an objective equation. The objective equation may have terms that each correspond to a different one of a number of driving objectives/goals over a finite time horizon (e.g., eight time steps each 0.5 seconds apart, or ten time steps each 0.25 seconds apart, etc.). For example, a first term may reflect the objective of staying at least some predetermined distance (e.g., 5 m, 10 m, etc.) away from a particular vehicle (e.g., a specific vehicle that was identified at block 984), a second term may reflect the objective of staying at least some predetermined distance (e.g., 10 m, 20 m, etc.) away from another particular vehicle that is behaving erratically, a third term may reflect the objective of staying at least some predetermined distance (e.g., 0.25 m, 0.5 m, etc.) away from any observed lane markings, a fourth term may reflect the objective of staying under two miles per hour over the speed limit, and so on. In some embodiments, the method 980 further includes receiving navigation data for guiding the autonomous vehicle through the environment toward the destination, and at least one of the terms may correspond to the goal of reaching one or more waypoints included in the navigation data (e.g., GPS coordinates, landmarks, road features, or map points corresponding to physical locations to be traversed by the vehicle en route to the destination). For example, road-feature waypoints may include intersections, turns, tunnels, bridges, exit ramps, or on-ramps. The navigation data may be received from a remote server via an interface (e.g., network interface 816 of FIG. 14), possibly in response to a user-generated request for directions or a user command to go to the destination, for example.

In some embodiments, the objective equation includes, for one or more of its terms, weighting coefficients that may be dynamically adjusted based on particular desired driving styles, and/or based on observed or expected circumstances (conditions and/or situations) of the autonomous vehicle. For example, a user (e.g., passenger) selection of a "smooth" driving style may cause a term associated with the goal of preventing G-forces (or acceleration) or jerk over a certain threshold to be weighted more heavily, while selection of an "aggressive" driving style may cause the term to be weighted less heavily. As another example, if rainy or icy roads or weather are detected (which may indicate reduced road friction and/or greater stopping distances), a term associated with driving at a reduced speed or maintaining a threshold distance from leading vehicles may be weighted more heavily than for dry roads or sunny weather.

At block 990, values of one or more dependent variables in the objective equation are determined by solving the objective equation (with the set independent variable values plugged into the terms) subject to a set of constraints. The dependent variables may correspond to any suitable type(s) of planned movement for the autonomous vehicle, such as changes to specific operational parameters of the vehicle (e.g., speed, braking force, or steering direction) or, in some embodiments, changes to the desired position and heading of the vehicle that may later be converted to specific operational parameters.

At block 992, the values of the dependent variables determined at block 990 are used to generate decisions for maneuvering the autonomous vehicle toward the destination. The decisions may include the value(s) determined at block 990, or be derived from the value(s). For example, one dependent variable may be a change in relative position of the autonomous vehicle, and a decision generated at block 992 may include speed and direction changes needed to accomplish that change in position.

In some embodiments, the method 980 includes one or more additional blocks not shown in FIG. 19. For example, the method 980 may include an additional block in which the decisions generated at block 992 are provided to one or more operational subsystems of the autonomous vehicle (e.g., accelerator 440, brakes 442, and steering mechanism 446 of FIG. 7A). The operational subsystem(s) may utilize proportional-integral-derivative (PID) controllers to effectuate maneuvering of the autonomous vehicle in accordance with the generated decisions, for example. In some embodiments, the decisions generated at block 992 are provided to the operational subsystem(s) in an indirect manner, via one or more intermediate stages (e.g., a decision arbiter such as the decision arbiter 108 of FIG. 1, 2 or 3).

Example Aspects Of The Invention

Various example aspects of the invention are described below.

1. A non-transitory computer-readable medium storing thereon instructions executable by one or more processors to implement an aggregate self-driving control architecture for controlling an autonomous vehicle, the aggregate self-driving control architecture comprising: (A) a plurality of self-driving control architectures each including a different one of a plurality of motion planners, wherein each of the motion planners is configured to receive signals descriptive of a current state of an environment through which the autonomous vehicle is moving, and wherein each of the plurality of self-driving control architectures is configured to generate candidate decisions for controlling the autonomous vehicle by using the respective motion planner to process the received signals; and (B) a decision arbiter configured to (i) receive the candidate decisions generated by the self-driving control architectures, (ii) generate decisions for controlling the autonomous vehicle by processing the received candidate decisions, and (iii) provide signals indicative of the generated decisions to one or more operational subsystems of the autonomous vehicle to effectuate maneuvering of the autonomous vehicle in accordance with the generated decisions.

2. The non-transitory computer-readable medium of aspect 1, wherein the candidate decisions generated by one or more of the self-driving control architectures indicate one or both of: desired operational parameters for the autonomous vehicle, the desired operational parameters including one or more of (i) braking parameters, (ii) acceleration parameters, (iii) speed parameters, or (iv) direction parameters; and desired maneuvers for the autonomous vehicle.

3. The non-transitory computer-readable medium of aspect 2, wherein the candidate decisions generated by another one or more of the self-driving control architectures indicate one or both of: one or more ranges of disallowed operational parameters for the autonomous vehicle; and one or more disallowed maneuvers for the autonomous vehicle.

4. The non-transitory computer-readable medium of aspect 3, wherein the candidate decisions generated by a further one or more of the self-driving control architectures indicate one or both of: one or more ranges of allowed operational parameters for the autonomous vehicle; and one or more allowed maneuvers for the autonomous vehicle.

5. The non-transitory computer-readable medium of aspect 1, wherein the self-driving control architectures include motion planners of two or more different types, the types selected from the group consisting of: a machine learning based planner; a search based planner; a sampling based planner; and a predictive control based planner.

6. The non-transitory computer-readable medium of aspect 5, wherein at least one of the self-driving control architectures includes a machine learning based planner.

7. The non-transitory computer-readable medium of aspect 6, wherein the machine learning based planner is trained to generate candidate decisions using a reinforcement learning technique.

8. The non-transitory computer-readable medium of aspect 6, wherein the machine learning based planner is trained to generate candidate decisions using a supervised learning technique.

9. The non-transitory computer-readable medium of aspect 5, wherein at least one of the self-driving control architectures includes a search based planner.

10. The non-transitory computer-readable medium of aspect 9, wherein the search based planner is an A* planner.

11. The non-transitory computer-readable medium of aspect 5, wherein at least one of the self-driving control architectures includes a predictive control based planner.

12. The non-transitory computer-readable medium of aspect 5, wherein at least one of the self-driving control architectures includes a sampling based planner.

13. The non-transitory computer-readable medium of aspect 1, wherein the plurality of self-driving control architectures further includes one or more perception components each configured to: receive sensor data; segment the received sensor data into objects; classify the segmented objects according to object types; track movement of the classified objects over time; and generate, based on the classified and tracked objects, at least a portion of the signals descriptive of the current state of the environment through which the autonomous vehicle is moving.

14. The non-transitory computer-readable medium of aspect 13, wherein: segmenting the received sensor data comprises segmenting lane markings located in the environment through which the autonomous vehicle is moving; classifying the segmented objects comprises classifying the segmented lane markings into lane-marking types; and tracking the movement of the classified lane markings comprises tracking a geometric property of the lane markings over time.

15. The non-transitory computer-readable medium of aspect 13, wherein: segmenting the received sensor data comprises segmenting at least a portion of a road on which the autonomous vehicle is moving; and tracking the movement of the classified objects comprises tracking a geometric property of the road portion over time.

16. The non-transitory computer-readable medium of aspect 13, wherein the sensor data includes, or is generated based on, one or more of (i) data generated by one or more lidar devices, (ii) data generated by one or more camera devices, (iii) data generated by one or more radar devices, (iv) data generated by one or more thermal sensor devices, (v) data generated by one or more inertial measurement units (IMUs), and (vi) data generated by one or more global positioning system (GPS) units.

17. The non-transitory computer-readable medium of aspect 13, wherein the one or more perception components include a plurality of perception components, and wherein each of the self-driving control architectures includes a different one of the plurality of perception components.

18. The non-transitory computer-readable medium of aspect 17, wherein the plurality of perception components includes: a first perception component configured to receive sensor data generated by a first set of one or more sensor devices; and a second perception component configured to receive sensor data generated by a second set of one or more sensor devices, the second set of sensor devices including at least one sensor device that is not included in the first set of sensor devices.

19. The non-transitory computer-readable medium of aspect 13, wherein the one or more perception components include a single perception component that is shared by all of the self-driving control architectures.

20. The non-transitory computer-readable medium of aspect 1, wherein one or more of the self-driving control architectures include a mapping component configured to provide navigation data for guiding the autonomous vehicle through the environment toward a destination.

21. The non-transitory computer-readable medium of aspect 1, wherein one or more of the self-driving control architectures include a prediction component configured to estimate future positions of tracked objects.

22. The non-transitory computer-readable medium of aspect 1, wherein: the candidate decisions generated by two or more of the self-driving control architectures are indicative of desired maneuvers for the autonomous vehicle; and the decision arbiter is configured to generate decisions for controlling the autonomous vehicle at least by determining which desired maneuver is indicated by more of the self-driving control architectures than any other desired maneuver.

23. The non-transitory computer-readable medium of aspect 1, wherein: the candidate decisions generated by two or more of the self-driving control architectures are indicative of desired operational parameters for the autonomous vehicle, the desired operational parameters including one or more of (i) braking parameters, (ii) acceleration parameters, (iii) speed parameters, or (iv) direction parameters; and the decision arbiter is configured to generate decisions for controlling the autonomous vehicle at least by performing a mathematical operation on the desired operational parameters.

24. The non-transitory computer-readable medium of aspect 23, wherein the mathematical operation is configured to combine or reduce the desired operational parameters into a single set of operational parameters.

25. The non-transitory computer-readable medium of aspect 1, wherein: each of the self-driving control architectures is further configured to generate one or more confidence values for each associated candidate decision; and the decision arbiter is configured to process the received candidate decisions according to their respective confidence values.

26. The non-transitory computer-readable medium of aspect 1, wherein the decision arbiter is configured to generate decisions for controlling the autonomous vehicle at least by removing from consideration one or more candidate decisions that are statistical outliers relative to other candidate decisions.

27. The non-transitory computer-readable medium of aspect 1, wherein: the decision arbiter includes a safety module configured to provide safety signals indicative of one of both of (i) allowable maneuvers for the autonomous vehicle, and (ii) allowable operational parameters for the autonomous vehicle; and the decision arbiter is configured to generate decisions for controlling the autonomous vehicle by (i) generating provisional decisions for controlling the autonomous vehicle by processing the received candidate decisions, and (ii) comparing the provisional decisions to the safety signals.

28. The non-transitory computer-readable medium of aspect 1, wherein the decision arbiter includes an arbitration machine learning (ML) model trained to dynamically weight the candidate decisions of different self-driving control architectures based on observed or expected circumstances of the autonomous vehicle, and (ii) in some instances, dynamically select the candidate decisions of specific self-driving control architectures based on observed or expected circumstances of the autonomous vehicle.

29. The non-transitory computer-readable medium of aspect 28, wherein the arbitration ML model is trained using reinforcement learning.

30. The non-transitory computer-readable medium of aspect 29, wherein the arbitration ML model is trained using rewards for a lack of safety violations.

31. The non-transitory computer-readable medium of aspect 29, wherein the arbitration ML model is trained using rewards for executing a particular style of driving.

32. The non-transitory computer-readable medium of aspect 31, wherein the rewards for executing a particular style of driving include rewards dependent upon G-force levels.

33. The non-transitory computer-readable medium of aspect 28, wherein the arbitration ML model is a neural network trained using a scored data set, the scored data set including scores generated by: comparing (i) decisions made by a human driver during a real or simulated driving trip to (ii) candidate decisions generated by the self-driving control architectures during the real or simulated driving trip; determining, for each of a plurality of times during the real or simulated driving trip, differences between the candidate decisions and the decisions made by the human driver; and determining scores for each of the self-driving control architectures based on the differences between the candidate decisions and the decisions made by the human driver.

34. The non-transitory computer-readable medium of aspect 28, wherein two or more of the self-driving control architectures are configured to implement specific driving styles.

35. The non-transitory computer-readable medium of aspect 34, wherein the two or more self-driving control architectures include: one or more self-driving control architectures configured to implement an aggressive driving style that prioritizes time to destination above ride comfort; and one or more self-driving control architectures configured to implement a smooth driving style that prioritizes ride comfort above time to destination.

36. The non-transitory computer-readable medium of aspect 34, wherein the decision arbiter is configured to, in at least some instances, generate decisions for controlling the autonomous vehicle based on a signal indicating selection of a specific driving style.

37. The non-transitory computer-readable medium of aspect 36, wherein the decision arbiter is configured to select candidate decisions generated by one of the self-driving control architectures that is known to correspond to the specific driving style.

38. The non-transitory computer-readable medium of aspect 36, wherein the signal indicating selection of a particular driving style is a signal indicating that a passenger of the autonomous vehicle has manually selected the specific driving style.

39. The non-transitory computer-readable medium of aspect 36, wherein the decision arbiter is configured to, in at least some instances, generate decisions for controlling the autonomous vehicle based on (i) the signal indicating selection of a specific driving style, and (ii) a signal indicating observed or expected circumstances of the autonomous vehicle.

40. The non-transitory computer-readable medium of aspect 39, wherein the observed or expected circumstances include an environmental condition.

41. The non-transitory computer-readable medium of aspect 39, wherein the observed or expected circumstances include a maneuver that the autonomous vehicle is or will be executing.

42. The non-transitory computer-readable medium of aspect 28, wherein: two or more of the self-driving control architectures are configured to drive in specific environmental conditions; and the decision arbiter is configured to, in at least some instances, generate decisions for controlling the autonomous vehicle based on a signal indicating observed or expected environmental conditions.

43. The non-transitory computer-readable medium of aspect 42, wherein the environmental conditions include weather conditions.

44. The non-transitory computer-readable medium of aspect 42, wherein the environmental conditions include road conditions.

45. The non-transitory computer-readable medium of aspect 28, wherein the arbitration ML model is a neural network trained using a scored data set, the scored data set including scores generated by: comparing (i) decisions made by a human driver during a real or simulated driving trip occurring in the observed or expected environmental conditions to (ii) candidate decisions generated by the self-driving control architectures during the real or simulated driving trip; and determining, for each of a plurality of times during the real or simulated driving trip, differences between the candidate decisions and the decisions made by the human driver; and determining scores for each of the self-driving control architectures based on the differences between the candidate decisions and the decisions made by the human driver.

46. The non-transitory computer-readable medium of aspect 1, wherein each of the self-driving control architectures is run on a different one of the one or more processors.

47. The non-transitory computer-readable medium of aspect 1, wherein at least some of the self-driving control architectures are further configured to receive map data corresponding to geographic locations, and are configured to generate the candidate decisions by using the respective motion planners to process both the signals descriptive of the current state of the environment and the map data.

48. The non-transitory computer-readable medium of aspect 41, wherein the map data includes digital maps of the geographic locations and routing data indicating a desired path of the autonomous vehicle.

49. A method of controlling an autonomous vehicle, the method comprising: generating, using a plurality of self-driving control architectures each of which includes a different one of a plurality of motion planners, a plurality of candidate decisions for controlling the autonomous vehicle, wherein each of the candidate decisions is generated by a different one of the motion planners processing signals descriptive of a current state of an environment through which the autonomous vehicle is moving; generating, by processing the candidate decisions, a decision for controlling the autonomous vehicle; and providing signals indicative of the generated decision to one or more operational subsystems of the autonomous vehicle to effectuate maneuvering of the autonomous vehicle in accordance with the generated decision.

50. The method of aspect 49, wherein generating the candidate decisions includes: generating a first candidate decision indicating (i) one or more ranges of disallowed operational parameters for the autonomous vehicle, or (ii) one or more disallowed maneuvers for the autonomous vehicle; and generating a second candidate decision indicating (i) one or more ranges of allowed operational parameters for the autonomous vehicle, or (ii) one or more allowed maneuvers for the autonomous vehicle.

51. The method of aspect 49, wherein generating the candidate decisions includes generating candidate decisions generated by two or more different types of motion planners, the types of motion planners selected from the group consisting of: a machine learning based planner; a search based planner; a sampling based planner; and a predictive control based planner.

52. The method of aspect 49, further comprising: receiving sensor data that includes, or is generated based on, one or more of (i) data generated by one or more lidar devices, (ii) data generated by one or more camera devices, (iii) data generated by one or more radar devices, (iv) data generated by one or more thermal sensor devices, (v) data generated by one or more inertial measurement units (IMUs), and (vi) data generated by one or more global positioning system (GPS) units; and generating at least a portion of the signals descriptive of the current state of the environment based on the received sensor data.

53. The method of aspect 49, wherein generating a decision for controlling the autonomous vehicle includes: determining which maneuver is indicated by more of the candidate decisions than any other maneuver.

54. The method of aspect 49, wherein generating a decision for controlling the autonomous vehicle includes: performing a mathematical operation on operational parameters indicated by at least two of the candidate decisions.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A non-transitory computer-readable medium storing thereon instructions executable by one or more processors to implement an aggregate self-driving control architecture for controlling an autonomous vehicle, the aggregate self-driving control architecture comprising:
a plurality of self-driving control architectures each including a different one of a plurality of motion planners, wherein each of the motion planners is configured to receive signals descriptive of a current state of an environment through which the autonomous vehicle is moving, and wherein each of the plurality of self-driving control architectures is configured to generate candidate decisions for controlling the autonomous vehicle by using the motion planner included in the self-driving control architecture to process the received signals; and
a decision arbiter configured to (i) receive the candidate decisions generated by the self-driving control architectures, (ii) generate decisions for controlling the autonomous vehicle by processing the received candidate decisions, and (iii) provide signals indicative of the generated decisions to one or more operational subsystems of the autonomous vehicle to maneuver the autonomous vehicle in accordance with the generated decisions, wherein the decision arbiter includes an arbitration machine learning (ML) model trained to dynamically weight the candidate decisions of different self-driving control architectures based on observed or expected circumstances of the autonomous vehicle.

2. The non-transitory computer-readable medium of claim 1, wherein the candidate decisions generated by one or more of the self-driving control architectures indicate one or both of:
desired operational parameters for the autonomous vehicle, the desired operational parameters including one or more of (i) braking parameters, (ii) acceleration parameters, (iii) speed parameters, or (iv) direction parameters; and
desired maneuvers for the autonomous vehicle.

3. The non-transitory computer-readable medium of claim 2, wherein the candidate decisions generated by another one or more of the self-driving control architectures indicate one or both of:
one or more ranges of disallowed operational parameters for the autonomous vehicle; and
one or more disallowed maneuvers for the autonomous vehicle.

4. The non-transitory computer-readable medium of claim 3, wherein the candidate decisions generated by a further one or more of the self-driving control architectures indicate one or both of:
one or more ranges of allowed operational parameters for the autonomous vehicle; and
one or more allowed maneuvers for the autonomous vehicle.

5. The non-transitory computer-readable medium of claim 1, wherein the self-driving control architectures include two or more of:
a machine learning based planner;
a search based planner;
a sampling based planner; and
a predictive control based planner.

6. The non-transitory computer-readable medium of claim 5, wherein at least one of the self-driving control architectures includes the machine learning based planner.

7. The non-transitory computer-readable medium of claim 1, wherein the plurality of self-driving control architectures further includes one or more perception components each configured to:
receive sensor data;
segment the received sensor data into objects;
classify the segmented objects according to object types;
track movement of the classified objects over time; and
generate, based on the classified and tracked objects, at least a portion of the signals descriptive of the current state of the environment through which the autonomous vehicle is moving.

8. The non-transitory computer-readable medium of claim 7, wherein:
segmenting the received sensor data comprises segmenting lane markings located in the environment through which the autonomous vehicle is moving;

classifying the segmented objects comprises classifying the segmented lane markings into lane-marking types; and tracking the movement of the classified lane markings comprises tracking a geometric property of the lane markings over time.

9. The non-transitory computer-readable medium of claim 7, wherein the sensor data includes, or is generated based on, one or more of (i) data generated by one or more lidar devices, (ii) data generated by one or more camera devices, (iii) data generated by one or more radar devices, (iv) data generated by one or more thermal sensor devices, (v) data generated by one or more inertial measurement units (IMUs), and (vi) data generated by one or more global positioning system (GPS) units.

10. The non-transitory computer-readable medium of claim 7, wherein the one or more perception components include a plurality of perception components, and wherein each of the self-driving control architectures includes a different one of the plurality of perception components.

11. The non-transitory computer-readable medium of claim 1, wherein one or more of the self-driving control architectures include a prediction component configured to estimate future positions of tracked objects.

12. The non-transitory computer-readable medium of claim 1, wherein:

the candidate decisions generated by two or more of the self-driving control architectures are indicative of desired maneuvers for the autonomous vehicle; and the decision arbiter is configured to generate decisions for controlling the autonomous vehicle at least by determining which desired maneuver is indicated by more of the self-driving control architectures than any other desired maneuver.

13. The non-transitory computer-readable medium of claim 1, wherein:

the candidate decisions generated by two or more of the self-driving control architectures are indicative of desired operational parameters for the autonomous vehicle, the desired operational parameters including one or more of (i) braking parameters, (ii) acceleration parameters, (iii) speed parameters, or (iv) direction parameters; and the decision arbiter is configured to generate decisions for controlling the autonomous vehicle at least by performing a mathematical operation on the desired operational parameters.

14. The non-transitory computer-readable medium of claim 13, wherein the mathematical operation is configured to combine or reduce the desired operational parameters into a single set of operational parameters.

15. The non-transitory computer-readable medium of claim 1, wherein the decision arbiter is configured to generate decisions for controlling the autonomous vehicle at least by removing from consideration one or more candidate decisions that are statistical outliers relative to other candidate decisions.

16. The non-transitory computer-readable medium of claim 1, wherein:

the decision arbiter includes a safety module configured to provide safety signals indicative of one of both of (i) allowable maneuvers for the autonomous vehicle, and (ii) allowable operational parameters for the autonomous vehicle; and the decision arbiter is configured to generate decisions for controlling the autonomous vehicle by (i) generating provisional decisions for controlling the autonomous vehicle by processing the received candidate decisions, and (ii) comparing the provisional decisions to the safety signals.

17. The non-transitory computer-readable medium of claim 1, wherein the arbitration ML model is trained to, in some instances, dynamically select the candidate decisions of specific self-driving control architectures based on observed or expected circumstances of the autonomous vehicle.

18. The non-transitory computer-readable medium of claim 1, wherein the arbitration ML model is trained using reinforcement learning with rewards for a lack of safety violations.

19. The non-transitory computer-readable medium of claim 1, wherein the arbitration ML model is trained using reinforcement learning with rewards for executing a particular style of driving.

20. The non-transitory computer-readable medium of claim 1, wherein the arbitration ML model is a neural network trained using a scored data set, the scored data set including scores generated by:

comparing (i) decisions made by a human driver during a real or simulated driving trip to (ii) candidate decisions generated by the self-driving control architectures during the real or simulated driving trip;

determining, for each of a plurality of times during the real or simulated driving trip, differences between the candidate decisions and the decisions made by the human driver; and determining scores for each of the self-driving control architectures based on the differences between the candidate decisions and the decisions made by the human driver.

21. The non-transitory computer-readable medium of claim 1, wherein two or more of the self-driving control architectures are configured to implement specific driving styles.

22. The non-transitory computer-readable medium of claim 21, wherein the two or more self-driving control architectures include:

one or more self-driving control architectures configured to implement an aggressive driving style that prioritizes time to destination above ride comfort; and one or more self-driving control architectures configured to implement a smooth driving style that prioritizes ride comfort above time to destination.

23. The non-transitory computer-readable medium of claim 21, wherein the decision arbiter is configured to, in at least some instances, generate decisions for controlling the autonomous vehicle based on a signal indicating selection of a specific driving style.

24. The non-transitory computer-readable medium of claim 23, wherein the decision arbiter is configured to, in at least some instances, generate decisions for controlling the autonomous vehicle based on (i) the signal indicating selection of a specific driving style, and (ii) a signal indicating observed or expected circumstances of the autonomous vehicle.

25. The non-transitory computer-readable medium of claim 24, wherein the observed or expected circumstances include an environmental condition.

26. The non-transitory computer-readable medium of claim 1, wherein:

two or more of the self-driving control architectures are configured to drive in specific environmental conditions; and the decision arbiter is configured to, in at least some instances, generate decisions for controlling the autonomous vehicle based on a signal indicating observed or expected environmental conditions.

27. The non-transitory computer-readable medium of claim 26, wherein the environmental conditions include weather conditions.

28. The non-transitory computer-readable medium of claim 1, wherein the arbitration ML model is a neural network trained using a scored data set, the scored data set including scores generated by:
  comparing (i) decisions made by a human driver during a real or simulated driving trip occurring in the observed or expected environmental conditions to (ii) candidate decisions generated by the self-driving control architectures during the real or simulated driving trip; and
  determining, for each of a plurality of times during the real or simulated driving trip, differences between the candidate decisions and the decisions made by the human driver; and
  determining scores for each of the self-driving control architectures based on the differences between the candidate decisions and the decisions made by the human driver.

29. A method of controlling an autonomous vehicle, the method comprising:
  generating, using a plurality of self-driving control architectures each of which includes a different one of a plurality of motion planners, a plurality of candidate decisions for controlling the autonomous vehicle, wherein each of the candidate decisions is generated by a different one of the motion planners processing signals descriptive of a current state of an environment through which the autonomous vehicle is moving;
  generating, by processing the candidate decisions, a decision for controlling the autonomous vehicle, wherein generating the decision for controlling the autonomous vehicle includes using an arbitration machine learning (ML) model trained to dynamically weight the candidate decisions of different self-driving control architectures based on observed or expected circumstances of the autonomous vehicle; and
  providing signals indicative of the generated decision to one or more operational subsystems of the autonomous vehicle to maneuver the autonomous vehicle in accordance with the generated decision.

* * * * *